United States Patent
Vishakhadatta et al.

(10) Patent No.: US 7,031,683 B2
(45) Date of Patent: Apr. 18, 2006

(54) APPARATUS AND METHODS FOR CALIBRATING SIGNAL-PROCESSING CIRCUITRY

(75) Inventors: G. Diwakar Vishakhadatta, Austin, TX (US); Donald A. Kerth, Austin, TX (US); Russell Croman, Austin, TX (US); Jeffrey W. Scott, Austin, TX (US); Richard T. Behrens, Lafayette, CO (US); G. Tyson Tuttle, Austin, TX (US); Vishnu S. Srinivasan, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 596 days.

(21) Appl. No.: 10/083,633

(22) Filed: Feb. 26, 2002

(65) Prior Publication Data

US 2002/0168952 A1    Nov. 14, 2002

Related U.S. Application Data

(63) Continuation-in-part of application No. 09/821,342, filed on Mar. 29, 2001.

(60) Provisional application No. 60/261,506, filed on Jan. 12, 2001, provisional application No. 60/273,119, filed on Mar. 2, 2001.

(51) Int. Cl.
    *H04B 1/26* (2006.01)

(52) U.S. Cl. .............. 455/197.2; 455/195.1; 455/254; 455/259; 455/262; 341/120; 341/121

(58) Field of Classification Search ........ 455/423–425, 455/63.1, 67.11, 13, 67.16, 68, 226.1, 259, 455/262, 334, 340, 197.1–3, 194.2, 195.1, 455/254–256, 323, 333, 198.1, 118; 375/224–228; 341/120–121; 327/538–543; 323/315–316
See application file for complete search history.

(56) References Cited

U.S. PATENT DOCUMENTS

| | | | |
|---|---|---|---|
| 4,070,632 A | 1/1978 | Tuttle | |
| 4,236,252 A | 11/1980 | Kominami et al. | |
| 4,468,790 A | 8/1984 | Hofelt | |
| 4,562,591 A | 12/1985 | Stikvoort | |
| 4,584,659 A | 4/1986 | Stikvoort | |
| 4,604,720 A | 8/1986 | Stikvoort | |

(Continued)

FOREIGN PATENT DOCUMENTS

GB    2233518 A    1/1991

(Continued)

OTHER PUBLICATIONS

Stephen Jantzi et al., "Quadrature Bandpass ΔΣ Modulation for Digital Radio," IEEE Journal of Solid-State Circuits, vol. 32, No. 12, Dec. 1997, pp. 1935-1950.

(Continued)

*Primary Examiner*—Nick Corsaro
*Assistant Examiner*—Tuan Tran
(74) *Attorney, Agent, or Firm*—O'Keefe, Egan & Peterman, LLP

(57) ABSTRACT

A calibration circuitry includes an adjustable capacitor, a voltage generator, a reference voltage generator, and a controller. The reference voltage generator provides a reference voltage. The voltage generator provides a measurement voltage that depends on the capacitance of the adjustable capacitor. The capacitance of the adjustable capacitor varies in response to a control signal. The controller provides the control signal based on the relative values of the reference voltage and the measurement voltage.

32 Claims, 26 Drawing Sheets

U.S. PATENT DOCUMENTS

| | | | |
|---|---|---|---|
| 4,623,926 A | 11/1986 | Sakamoto | |
| 4,627,021 A | 12/1986 | Persoon et al. | |
| 4,680,588 A | 7/1987 | Cantwell | |
| 4,692,737 A | 9/1987 | Stikvoort et al. | |
| 4,713,563 A | 12/1987 | Marshall et al. | |
| 4,797,845 A | 1/1989 | Stikvoort | |
| 4,857,928 A | 8/1989 | Gailus et al. | |
| 4,912,729 A | 3/1990 | Van Rens et al. | |
| 4,989,074 A | 1/1991 | Matsumoto | |
| 5,012,247 A * | 4/1991 | Dillman | 341/172 |
| 5,050,192 A | 9/1991 | Nawata | |
| 5,083,304 A | 1/1992 | Cahill | |
| 5,124,705 A | 6/1992 | Voorman | |
| 5,142,695 A | 8/1992 | Roberts et al. | |
| 5,157,343 A | 10/1992 | Voorman | |
| 5,194,826 A | 3/1993 | Huusko | |
| 5,235,410 A | 8/1993 | Hurley | |
| 5,241,310 A | 8/1993 | Tiemann | |
| 5,243,345 A | 9/1993 | Naus et al. | |
| 5,267,272 A | 11/1993 | Cai et al. | |
| 5,283,578 A | 2/1994 | Ribner et al. | |
| 5,341,135 A | 8/1994 | Pearce | |
| 5,345,406 A | 9/1994 | Williams | |
| 5,430,890 A | 7/1995 | Vogt et al. | |
| 5,442,353 A | 8/1995 | Jackson | |
| 5,451,948 A | 9/1995 | Jekel | |
| 5,469,475 A | 11/1995 | Voorman | |
| 5,493,710 A * | 2/1996 | Takahara et al. | 455/192.2 |
| 5,500,645 A | 3/1996 | Ribner et al. | |
| 5,557,642 A | 9/1996 | Williams | |
| 5,668,551 A * | 9/1997 | Garavan et al. | 341/120 |
| 5,712,628 A | 1/1998 | Phillips et al. | |
| 5,740,524 A | 4/1998 | Pace et al. | |
| 5,742,189 A | 4/1998 | Yoshida et al. | |
| 5,758,276 A | 5/1998 | Shirakawa et al. | |
| 5,764,171 A | 6/1998 | Stikvoort | |
| 5,828,955 A | 10/1998 | Lipowski et al. | |
| 5,859,878 A | 1/1999 | Phillips et al. | |
| 5,862,465 A | 1/1999 | Ou | |
| 5,973,601 A | 10/1999 | Campana | |
| 6,002,925 A | 12/1999 | Vu et al. | |
| 6,035,186 A | 3/2000 | Moore et al. | |
| 6,075,979 A | 6/2000 | Holtvoeth et al. | |
| 6,101,369 A * | 8/2000 | Takahashi | 455/182.2 |
| 6,130,635 A * | 10/2000 | Jones, III | 341/172 |
| 6,148,048 A | 11/2000 | Kerth et al. | |
| 6,167,245 A | 12/2000 | Welland et al. | |
| 6,268,813 B1 * | 7/2001 | de Wit | 341/120 |
| 6,275,090 B1 * | 8/2001 | Burger et al. | 327/334 |
| 6,323,735 B1 | 11/2001 | Welland et al. | |
| 6,343,207 B1 | 1/2002 | Hessel et al. | |
| 6,448,845 B1 * | 9/2002 | Davies | 327/540 |
| 6,476,751 B1 * | 11/2002 | Krymski et al. | 341/155 |
| 6,539,066 B1 | 3/2003 | Heinen | |
| 6,735,422 B1 * | 5/2004 | Baldwin et al. | 455/232.1 |
| 2002/0000871 A1 * | 1/2002 | Davies | 327/540 |
| 2002/0025788 A1 * | 2/2002 | Nitta | 455/115 |

FOREIGN PATENT DOCUMENTS

| | | |
|---|---|---|
| GB | 0643477 A2 | 3/1995 |
| JP | 11274401 * | 10/1999 |
| WO | WO 99/22456 | 5/1999 |
| WO | WO 00/01074 | 1/2000 |
| WO | WO 00/11794 | 3/2000 |
| WO | WO 00/22735 | 4/2000 |

OTHER PUBLICATIONS

Stephen Jantzi et al, "A Complex Bandpass ΔΣ Converter For Digital Radio," ISCAS, May/Jun. 1994, pp. 453-456.

"Analog Devices Delivers World's First Open Market GSM Direct Conversion Radio Chipset," Analog Devices Corporate Information Press Release, http:/contentanalog.com/pressrelease/prdisplay/0,1622,102,00.html. Sep. 13, 1999, pp. 1-4.

Data Sheet, CX74017, "RF Transceiver for Single, Dual, or Tri-Band GSM/GPRS Applications," Conexant, Jan. 2, 2001, pp. 1-16.

Jacques C. Rudell et al, "A 1.9-GHz Wide-Band IF Double Conversion CMOS Receiver for Cordless Telephone Applications," IEEE Journal of Solid-State Circuits, vol. 32, No. 12, Dec. 1997, pp. 2071-2088.

Jan Crols et al., "Low-IF Topologies for High-Performance Analog Front Ends of Fully Integrated Receivers," IEEE Transactions on Circuits and Systems-II: Analog and Digital Signal Processing, vol. 45, No. 3, Mar. 1998, pp. 269-282.

Jacques C. Rudell et al., "Recent Developments In High Integration Multi-Standard CMOS Transceiver for Presonal Communication Systems," invited paper at the 1998 International Symposium on Low Power Electronics, Monterey, California, 6 pgs.

Asad Abidi, "CMOS Wireless Transceivers: The New Wave," IEEE Communications Magazine, Aug. 1999, pp. 119-124.

Data Sheet, UAA353HL, "Low Power GSM/DCS/PCS Multi-band Transcevier," Philips Semiconductors, Feb. 17, 2000, pp. 1-24.

Stephen Jantzi et al., "FP 13.5: A Quadrature Bandpass ΔΣ Modulator for Digital Radio," Digest of Technical Papers, 1997 IEEE International Solid-State Circuits Conference, First Edition, Feb. 1997, pp. 216-217, 460.

S. A. Jantzi et al., "The Effects of Mismatch In Complex Bandpass ΔΣ Modulators," IEEE, 1996, pp. 227-230.

Qiuting Huang, "CMOS RF Design-The Low Power Dimension," IEEE 2000 Custom Integrated Circuits Conference, pp. 161-166.

Paolo Orsatti et al., "A 20-mR-Receive, 55-mA-Transmit, Single-Chip GSM Transcevier in 0.25-μm CMOS," IEEE Journal of Solid-State Circuits, vol. 34, No. 12, Dec. 1999, pp. 1869-1880.

Qiuting Huang et al., "The Impact of Scaling Down to Deep Submicron on CMOS RF Circuits," IEEE Journal of Solid-State Circuits, vol. 33, No. 7, Jul. 1998, pp. 1023-1036.

Behzad Razavi, "Design Considerations for Direct-Conversion Receivers," IEEE Transactions on Circuits and Systems-II: Analog and Digital Signal Processing, vol. 44, No. 6, Jun. 1997, pp. 428-435.

Farbod Behbahani et al., "CMOS Mixers and Polyphase Filters for Large Image Rejection," IEEE Journal of Solid-State Circuits, vol. 36, No. 6, Jun. 2001, pp. 873-887.

Jan Crols et al., "A Single-Chip 900 MHz CMOS Receiver Front-End With A High Performance Low-IF Topolgy," IEEE Journal of Solid-State Circuits, vol. 30, No. 12, Dec. 1995, pp. 1483-1492.

Analog Devices, Single-Chip Direct-Conversion GSM/GPRS/EDGE RFIC, Othello One, www.analog.com, 2 pgs.

Analog Devices, AD6523/AD6524, GSM Direct Conversion Radio Chip, Set, www.analog.com, 2 pgs.

Analog Devices, GSM 3 V Transceiver IF Subsystem, AD6432, www.analog.com, pp. 1-20.

Hitachi, "RF Transceiver IC For GSM And PCN Dual Band Cellular Systems," HD155121F, ADE-207-265(Z), 1st Edition, Nov. 1998, pp. 1-56.

Analog Devices, AD7002 Specification, LC2MOS, GSM Baseband I/O Port, Rev. B, 1997, pp. 1-16.

Analog Devices, AD20msp415, GSM/DCS1800/PCS1900, Baseband Processing Chipset, Rev. O, 1997, pp. 1-7.

Kwentus et al., "A Single-Chip Universal Digital Satellite Receiver With 480-MHz IF Input," IEEE Journal of Solid-State Circuits, vol. 34, No. 11, Nov. 1999, pp. 1634-1646.

Minnis et al., "A Low-If Polyphase Receiver For GSM Using Low-Domain Signal Processing," IEEE Radio Frequency Integrated Circuits Symposium, 2000, pp. 83-86.

Atkinson et al., "A Novel Approach To Direct Conversion RF Receivers for TDMA Applications," Analog Devices, 1999, pp. 1-5.

Crochiere et al., "Optimum FIR Digital Filter Implementatiosn For Decimation, Interpolation, And Narrow-Band Filtering," IEEE Transactiosn On Acoustics, Speech, And Signal Processing, vol. ASSP-23, No. 5, Oct. 1975, pp. 444-456.

Hogenauer, "An Economical Class Of Digital Filters For Decimation And Interpolation," IEEE, 1981, pp. 155-162.

Brandt et al., "A Low-Power, Area-Efficient Digital Filter For Decimation And Interpolation," IEEE Journal Of Solid-State Circuits, vol. 29, No. 6, Jun. 1994, pp. 679-687.

Philips Semiconductors, "uaa3535-Low-Power GSm GPRS Triple-Band Near-Zero IF Transcevier," Oct. 1999, 4 pgs.

D'Avella et al., "An Adaptive MLSE Receiver For TDMA Digital Mobile Radio, IEEE Journal On Selected Areas In Communications," vol. 7, No. 1, Jan. 1989, pp. 122-129.

Razavi, "CMOS RF Receiver Design For Wireless LAN Applications," IEEE, 1999, pp. 275-280.

Lucent Technologies, "W3020 GSM Multiband RF Transceiver," Advabce Data Sheet, Dec. 1999, pp. 1-44.

Lucent Technologies, "DSP1620 Digital Signal Processor," Data Sheet, Jun. 1998, pp. 1-178.

Steyaert et al., "A 2-V CMOS Cellular Transceiver Front-End," IEEE Journal of Solid-State Circuits, vol. 35, No. 12, Dec. 2000, pp. 1895-1907.

Paulus et al., "A CMOS IF Transceiver With Reduced Analog Complexity," IEEE Journal Of Solid-State Circuits, vol. 33, No. 12, Dec. 1998, pp. 2154-2159.

Analog Devices, "Analog Devices Delivers World's First Open Market GSM Direct Conversion Radio Chipset," Nov. 1999, 4 pgs.

"Digest Of Technical Papers," 1997 IEEE International Solid-State Circuits Conference, First Edition, Feb. 1997, 5 pgs.

RF Micro Devices, RF2968, Product Description, Blue Tooth Transceiver, Rev A19, pp. 11-199-11-222.

Texas Instruments, TRF6901, "Single Chip RF Transceiver," Mar. 2002, pp. 1-29.

Texas Instruments, TRF6900A, "Single Chip RF Transceiver," Sep. 2001, pp. 1-34.

Texas Instruments, TRF6900, Single Chip RF Transceiver, Oct. 1999, pp. 1-32.

Philips Semiconductor, "Bluetooth RF Transceiver," Data Sheet, UAA3558, Dec. 21, 2000, pp. 1-5.

Philips Semiconductor, "Image Reject 1 800 MHz Transceiver For DECT Applications," Data Sheet, UAA2067G, Oct. 22, 1996, pp. 1-24.

Philips Semiconductor, "Analog Cordless Telephone IC", Data Sheet, UAA2062, Aug. 10, 2000, pp. 1-40.

Philips Semiconductor, "900 MHz Analog Cordless Telephone IC," Data Sheet, UAA3515A, Dec. 12, 2001, pp. 1-44.

Philips Semiconductor, "Low Voltage IF I/Q Transceiver," Data Sheet, SA 1638, Sep. 3, 1997, pp. 1-26.

Texas Instruments, "TCS2100 GPRS Chipset Solution," Product Bulletin, 2001, 4 pgs.

Fague, "Othello; A New Direct-Conversion Radio Chip Set Eliminates IF Stage," Analog Dialogue 33-10, 1999, pp. 1-3.

Analog Devices, AD6523/AD6524, "GSM Direct Conversion Radio Chip Set," 1992, 2 pgs.

Lucent Technologies, "Lucent CSP1089 GSM Conversion Signal Processor For Cellular Handset And Modem Applications," Product Brief, Feb. 2001, 2 pgs.

Lucent Technologies, "Lucent CSP1099 GSM Conversion Signal Processor For Cellular Handset And Modem Applications," Product Brief, Feb. 2001, 2 pgs.

Lucent Technologies, "Trident," Product Brief, Feb. 2001, 2 pgs.

Ericsson, "RF Transceiver Circuit For The Digital Enhanced Cordless Telecommunications (DECT) System," PBL40215, Jan. 2001, pp. 1-22.

Micro Linear, "ML2712 2.4GHz Transceiver," Datasheet, Aug. 2001, pp. 1-21.

Analog Devices, "GSM/GPRS/DCS1800.PCS1900 SoftFone Baseband Chipset," AD20msp430, 2000, 2 pgs.

RF Micro Devices, "Polaris Total Radio Solution," Press Release, 2002, 1 pg.

Tuttle, "Introduction To Wireless Receiver Design," Tutorial, 2002, pp. 2-58.

Rael et al., "Design Methodology Used In A Single-Chip CMOS 900 MHz Spread-Spectrum Wireless Transceiver," 35th Design Automation Conference, Jun. 1998, 6 pgs.

Troster et al., "A Interpolative Bandpass Converter On A 1.2-µm BiCMOS Analog/Digital Array," IEEE Journal Of Solid-State Circuits, vol. 28, No. 4, Apr. 1993, pp. 471-477.

Schreier et al., "Decimation For Bandpass Sigma-Delta Analog-To-Digital Conversion," IEEE, 1990, pp. 1801-1804.

Shoaei et al., "Optimal (Bandpass) Continuous-Time $\Delta\Sigma$ Modulator," pp. 489-492.

Schreier et al., "Bandpass Sigma-Delta Modulation," Electronics Letters, vol. 25, No. 23, Nov. 9, 1989, pp. 1560-1561.

Jantzi et al., "Bandpass Sigma-Delta Analog-To-Digital Conversion," IEEE Transactions On Circuits And Systems, vol. 38, No. 11, Nov. 1991, pp. 1406-1409.

Crols et al., "An Analog Integrated Polyphase Filter For A High Performance Low-IF Receiver," Symposium On VLSI Circuits Digest Of Technical Papers, 1995, pp. 87-88.

Aziz et al., "Performance Of Complex Noise Transfer Functions In Bandpass And Multi Band Sigma Delta Systems," IEEE, 1995, pp.; 641-644.

Jantzi, "A Fourth-Order Bandpass Sigma-Delta Modulator," IEEE Journal Of Solid-State Circuits, vol. 28, No. 3, Mar. 1993, pp. 282-291.

Liu et al., "Switched-Capacitor Implementation Of Complex Filters," IEEE International Symposium On Circuits And Systems, vol. 3, 1986, 5 pgs.

Sedra et al., "Complex Analog Bandpass Filters Designed By Linearly Shifting Real Low-Pass Prototypes," IEEE International Symposium On Circuits And Systems, vol. 3, 1985, 5 pgs.

Thurston et al., "Bandpass Implementation Of The Sigma-Delta A-D Conversion Technique," International Conference On Analogue To Digital And Digital To Analogue Conversion, Sep. 1991, 7 pgs.

Rudell, et al., "*Second Generation Multi-Standard Monolithic CMOS RF Transceiver*," University of California, Berkelely, Slides 1 through 9 (Jun. 1996).

Cho, et al., "*Multi-Standard Monolithic CMOS RF Transceiver*," University of California, Berkeley, Slides 1 through 26 (Jun. 1996).

Copending U.S. Appl. No. 09/821,342, filed Mar. 29, 2001, "Partitioned Radio-Frequency Apparatus And Associated Method" (SilA:072).

Copending U.S. Appl. No. 09/821,340, filed Mar. 29, 2001, "Digital Interface In Radio-Frequency Apparatus And Associated Methods" (SilA:073).

Copending U.S. Appl. No. 10/075,094, filed Feb. 13, 2002, "Radio-Frequency Communication Apparatus And Associated Methods" (Sila:074).

Copending U.S. Appl. No. 10/075,098, filed Feb. 13, 2002, "Apparatus And Methods for Generating Radio Frequencies In Communication Circuitry" (Sila:075).

Copending U.S. Appl. No. 10/075,122, filed Feb. 12, 2002, "Digital Architecture For Radio-Frequency Apparatus And Associated Methods" (Sila:078).

Copending U.S. Appl. No. 10/083,633, filed Feb. 26, 2002, "Apparatus And Methods for Calibrating Signal-Processing Circuitry" (Sila:080).

Copending U.S. Appl. No. 10/081,121, filed Feb. 22, 2002, "Calibrated Low-Noise Current And Voltage References And Associated Methods" (Sila:095).

Copending U.S. Appl. No. 10/074,591, filed Feb. 13, 2002, "Apparatus For Generating Multiple Radio Frequencies In Communication Circuitry And Associated Methods" (Sila:096).

Copending U.S. Appl. No. 10/075,099, filed Feb. 12, 2002, "Notch Filter For DC Offset Reduction In Radio-Frequency Apparatus And Associated Methods" (Sila:097).

Copending U.S. Appl. No. 10/076,676, filed Feb. 12, 2002, "DC Offset Reduction In Radio-Frequency Apparatus and Associated Methods" (Sila:098).

Copending U.S. Appl. No. 10/079,058, filed Feb. 19, 2002, "Apparatus And Methods For Output Buffer Circuitry With Constant Output Power In Radio-Frequency Circuitry" (Sila:099).

Copending U.S. Appl. No. 10/081,730, filed Feb. 22, 2002, "Method And Apparatus For Synthesizing High-Frequency Signals For Wireless Communications" (Sila:106).

Copending U.S. Appl. No. 10/079,057, filed Feb. 19, 2002, "Apparatus And Method For Front-End Circuitry In Radio-Frequency Apparatus" (Sila:107).

Allen, "Complex Analog Filters Obtained From Shifted Lowpass Prototypes," Sep. 1985, 118 pgs.

Motorola Communications Semiconductor Product Division, "A 1.9 GHz Chipset For PCS Applications," Microwave Journal, No. 6, Jun. 1995, 3 pgs.

Search Report for PCT/US02/00896; Oct. 4, 2002; 7 pgs.

Copending U.S. Appl. No. 09/708,339, filed Nov. 8, 2000, "Method And Apparatus For Operating A PPL With A Phase Detector/Sample Hold Circuit For Synthesizing High-Frequency Signals For Wireless Communications" (Sila: 035C1).

Copending U.S. Appl. No. 09/999,702, filed Oct. 31, 2001, "Method And Apparatus For Synthesizing Dual Band High-Frequency Signals For Wireless Communications" (Sila: 060C1).

Search Report for PCT/US02/00895; Nov. 11, 2002; 6 pgs.

* cited by examiner

APPARATUS AND METHODS FOR CALIBRATING SIGNAL-PROCESSING CIRCUITRY

CROSS REFERENCE TO RELATED APPLICATIONS

This patent application is a continuation-in-part of U.S. patent application Ser. No. 09/821,342, titled "Partitioned Radio-Frequency Apparatus and Associated Methods," and filed on Mar. 29, 2001. This patent application claims priority to: Provisional U.S. Patent Application Ser. No. 60/261,506, filed on Jan. 12, 2001; and Provisional U.S. Patent Application Ser. No. 60/273,119, titled "Partitioned RF Apparatus with Digital Interface and Associated Methods."

Furthermore, this patent application incorporates by reference the following patent documents: U.S. patent application Ser. No. 10/075,122, titled "Digital Architecture for Radio-Frequency Apparatus and Associated Methods"; U.S. patent application Ser. No. 10/075,099, titled "Notch Filter for DC Offset Reduction in Radio-Frequency Apparatus and Associated Methods"; U.S. patent application Ser. No. 10/074,676, titled "DC Offset Reduction in Radio-Frequency Apparatus and Associated Methods"; U.S. patent application Ser. No. 10/075,094, titled "Radio-Frequency Communication Apparatus and Associated Methods"; U.S. patent application Ser. No. 10/075,098, titled "Apparatus and Methods for Generating Radio Frequencies in Communication Circuitry"; U.S. patent application Ser. No. 10/074,591, titled "Apparatus for Generating Multiple Radio Frequencies in Communication Circuitry and Associated Methods"; U.S. patent application Ser. No. 10/079,058, titled "Apparatus and Methods for Output Buffer Circuitry with Constant Output Power in Radio-Frequency Circuitry"; U.S. patent application Ser. No. 10/081,730, titled "Method and Apparatus for Synthesizing High-Frequency Signals for Wireless Communications"; U.S. patent application Ser. No. 10/079,057, titled "Apparatus and Method for Front-End Circuitry in Radio-Frequency Apparatus"; and U.S. patent application Ser. No. 10/081,121, titled "Calibrated Low-Noise Current and Voltage References and Associated Methods."

TECHNICAL FIELD OF THE INVENTION

This invention relates to calibration circuitry. More particularly, the invention concerns calibration circuitry and associated methods in analog signal processing within radio frequency (RF) apparatus, such as transmitters, receivers, and transceivers.

BACKGROUND

The proliferation and popularity of mobile radio and telephony applications has led to market demand for communication systems with low cost, low power, and small form-factor radio-frequency transceivers. As a result, recent research has focused on providing monolithic transceivers using low-cost complementary metal-oxide semiconductor (CMOS) technology. One aspect of research efforts has focused on providing an RF transceiver within a single integrated circuit (IC). The integration of transceiver circuits is not a trivial problem, as it must take into account the requirements of the transceiver's circuitry and the communication standards governing the transceiver's operation. From the perspective of the transceiver's circuitry, RF transceivers typically include sensitive components susceptible to noise and interference with one another and with external sources. Integrating the transceiver's circuitry into one integrated circuit may exacerbate interference among the various blocks of the transceiver's circuitry. Moreover, communication standards governing RF transceiver operation outline a set of requirements for noise, inter-modulation, blocking performance, output power, and spectral emission of the transceiver.

Unfortunately, no technique for addressing all of the above issues in high-performance RF receivers or transceivers, for example, RF transceivers used in cellular and telephony applications, has been developed. A need therefore exists for techniques of partitioning and integrating RF receivers or transceivers that would provide low-cost, low form-factor RF transceivers for high-performance applications, for example, in cellular handsets.

A further aspect of the invention relates to calibration of signal-processing circuitry. Typical analog signal-processing circuitry uses resistors and capacitors. The variation of resistor and capacitor values as a function of physical and environmental changes causes variations in the characteristics or attributes of the signal-processing circuitry. Changes in the characteristics or attributes of the signal-processing circuitry may cause degraded performance of the circuitry or even of the system that includes the signal-processing circuitry. A need therefore exists for calibration of signal-processing circuitry to avoid undesired or detrimental changes in the circuitry's or system's characteristics.

SUMMARY OF THE INVENTION

This invention relates to calibration circuitry for calibrating analog signal-processing circuitry. One may use calibration circuitry according to the invention in a variety of applications, for example, in analog signal processing circuitry within RF apparatus, such as receivers, transmitters, and transceivers.

One aspect of the invention concerns apparatus for circuit calibration. In one embodiment, a calibration circuitry includes an adjustable capacitor, a voltage generator, a reference voltage generator, and a controller. The reference voltage generator provides a reference voltage. The voltage generator provides a measurement voltage that depends on the capacitance of the adjustable capacitor. The capacitance of the adjustable capacitor varies in response to a control signal. The controller provides the control signal based on the relative values of the reference voltage and the measurement voltage.

DESCRIPTION OF THE DRAWINGS

The appended drawings illustrate only exemplary embodiments of the invention and therefore should not be considered as limiting its scope. The disclosed inventive concepts lend themselves to other equally effective embodiments. In the drawings, the same numeral designators used in more than one drawing denote the same, similar, or equivalent functionality, components, or blocks.

DETAILED DESCRIPTION OF THE INVENTION

This invention in part contemplates partitioning RF apparatus so as to provide highly integrated, high-performance, low-cost, and low form-factor RF solutions. One may use RF apparatus according to the invention in high-performance communication systems. More particularly, the invention in part relates to partitioning RF receiver or transceiver circuitry in a way that minimizes, reduces, or overcomes interference effects among the various blocks of the RF receiver or transceiver, while simultaneously satisfying the requirements of the standards that govern RF receiver or transceiver performance. Those standards include the Global System for Mobile (GSM) communication, Personal Communication Services (PCS), Digital Cellular System (DCS), Enhanced Data for GSM Evolution (EDGE), and General Packet Radio Services (GPRS). RF receiver or transceiver circuitry partitioned according to the invention therefore overcomes interference effects that would be present in highly integrated RF receivers or transceivers while meeting the requirements of the governing standards at low cost and with a low form-factor. The description of the invention refers to circuit partition and circuit block interchangeably.

Figure 1:
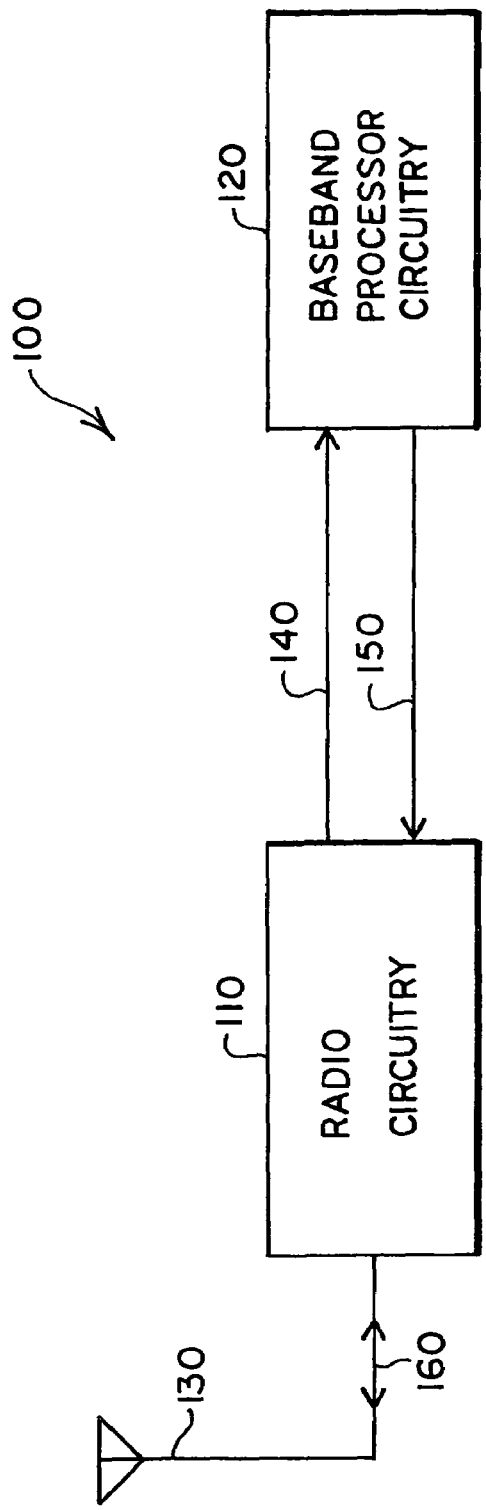
FIG. 1 illustrates the block diagram of an RF transceiver that includes radio circuitry that operates in conjunction with a baseband processor circuitry.

FIG. 1 shows the general block diagram of an RF transceiver circuitry 100 according to the invention. The RF transceiver circuitry 100 includes radio circuitry 110 that couples to an antenna 130 via a bi-directional signal path 160. The radio circuitry 110 provides an RF transmit signal to the antenna 130 via the bi-directional signal path 160 when the transceiver is in transmit mode. When in the receive mode, the radio circuitry 110 receives an RF signal from the antenna 130 via the bi-directional signal path 160.

The radio circuitry 110 also couples to a baseband processor circuitry 120. The baseband processor circuitry 120 may comprise a digital-signal processor (DSP). Alternatively, or in addition to the DSP, the baseband processor circuitry 120 may comprise other types of signal processor, as persons skilled in the art understand. The radio circuitry 110 processes the RF signals received from the antenna 130 and provides receive signals 140 to the baseband processor circuitry 120. In addition, the radio circuitry 110 accepts transmit input signals 150 from the baseband processor 120 and provides the RF transmit signals to the antenna 130.

Figure 2A:
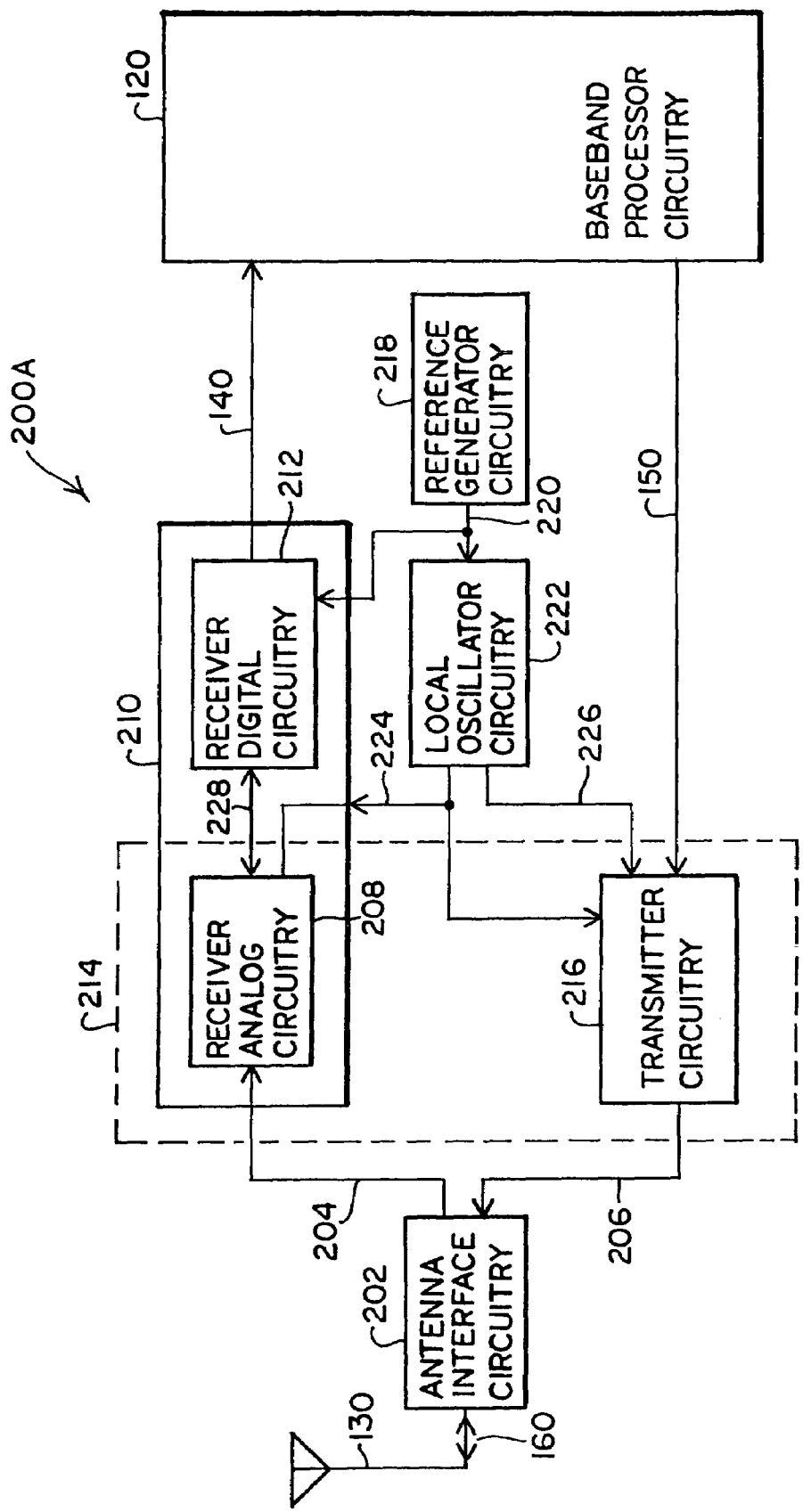
FIG. 2A shows RF transceiver circuitry partitioned according to the invention.

FIGS. 2A–2D show various embodiments of RF transceiver circuitry partitioned according to the invention. FIG. 3 and its accompanying description below make clear the considerations that lead to the partitioning of the RF transceiver circuitry as shown in FIGS. 2A–2D. FIG. 2A illustrates an embodiment 200A of an RF transceiver circuitry partitioned according to the invention. In addition to the elements described in connection with FIG. 1, the RF transceiver 200A includes antenna interface circuitry 202, receiver circuitry 210, transmitter circuitry 216, reference generator circuitry 218, and local oscillator circuitry 222.

The reference generator circuitry 218 produces a reference signal 220 and provides that signal to the local oscillator circuitry 222 and to receiver digital circuitry 212. The reference signal 220 preferably comprises a clock signal, although it may include other signals, as desired. The local oscillator circuitry 222 produces an RF local oscillator signal 224, which it provides to receiver analog circuitry 208 and to the transmitter circuitry 216. The local oscillator circuitry 222 also produces a transmitter intermediate-frequency (IF) local oscillator signal 226 and provides that signal to the transmitter circuitry 216. Note that, in RF transceivers according to the invention, the receiver analog circuitry 208 generally comprises mostly analog circuitry in addition to some digital or mixed-mode circuitry, for example, analog-to-digital converter (ADC) circuitry and circuitry to provide an interface between the receiver analog circuitry and the receiver digital circuitry, as described below.

The antenna interface circuitry 202 facilitates communication between the antenna 130 and the rest of the RF transceiver. Although not shown explicitly, the antenna interface circuitry 202 may include a transmit/receive mode switch, RF filters, and other transceiver front-end circuitry, as persons skilled in the art understand. In the receive mode, the antenna interface circuitry 202 provides RF receive signals 204 to the receiver analog circuitry 208. The receiver analog circuitry 208 uses the RF local oscillator signal 224 to process (e.g., down-convert) the RF receive signals 204 and produce a processed analog signal. The receiver analog circuitry 208 converts the processed analog signal to digital format and supplies the resulting digital receive signals 228 to the receiver digital circuitry 212. The receiver digital circuitry 212 further processes the digital receive signals 228 and provides the resulting receive signals 140 to the baseband processor circuitry 120.

In the transmit mode, the baseband processor circuitry 120 provides transmit input signals 150 to the transmitter circuitry 216. The transmitter circuitry 216 uses the RF local oscillator signal 224 and the transmitter IF local oscillator signal 226 to process the transmit input signals 150 and to provide the resulting transmit RF signal 206 to the antenna interface circuitry 202. The antenna interface circuitry 202 may process the transmit RF signal further, as desired, and provide the resulting signal to the antenna 130 for propagation into a transmission medium.

The embodiment 200A in FIG. 2A comprises a first circuit partition, or circuit block, 214 that includes the receiver analog circuitry 208 and the transmitter circuitry 216. The embodiment 200A also includes a second circuit partition, or circuit block, that includes the receiver digital circuitry 212. The embodiment 200A further includes a third circuit partition, or circuit block, that comprises the local oscillator circuitry 222. The first circuit partition 214, the second circuit partition 212, and the third circuit partition 222 are partitioned from one another so that interference effects among the circuit partitions tend to be reduced. The first, second, and third circuit partitions preferably each reside within an integrated circuit device. In other words, preferably the receiver analog circuitry 208 and the transmitter circuitry 216 reside within an integrated circuit device, the receiver digital circuitry 212 resides within another integrated circuit device, and the local oscillator circuitry 222 resides within a third integrated circuit device.

Figure 2B:
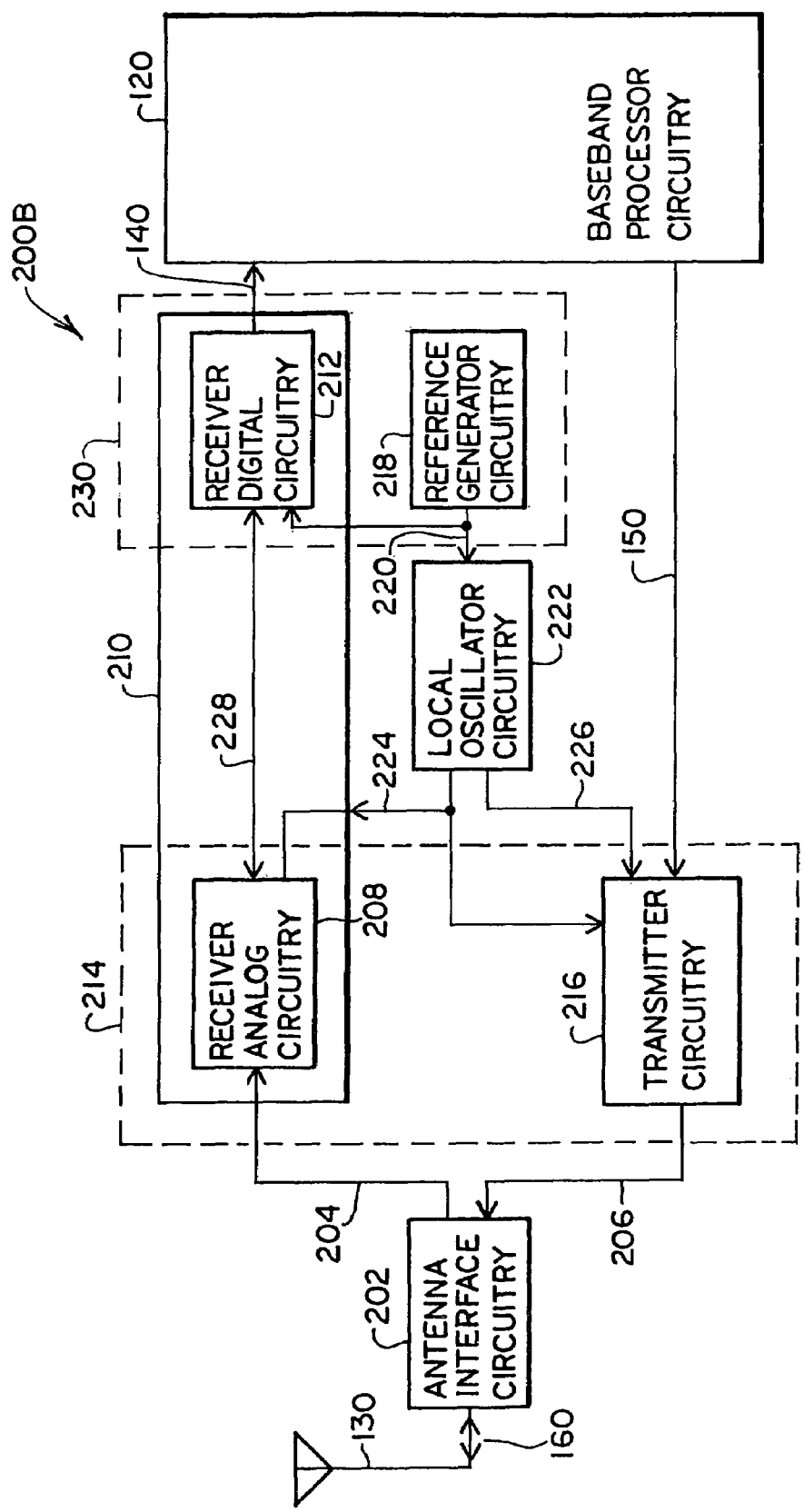
FIG. 2B depicts another embodiment of RF transceiver circuitry partitioned according to the invention, in which the reference generator circuitry resides within the same circuit partition, or circuit block, as does the receiver digital circuitry.
Figure 3:
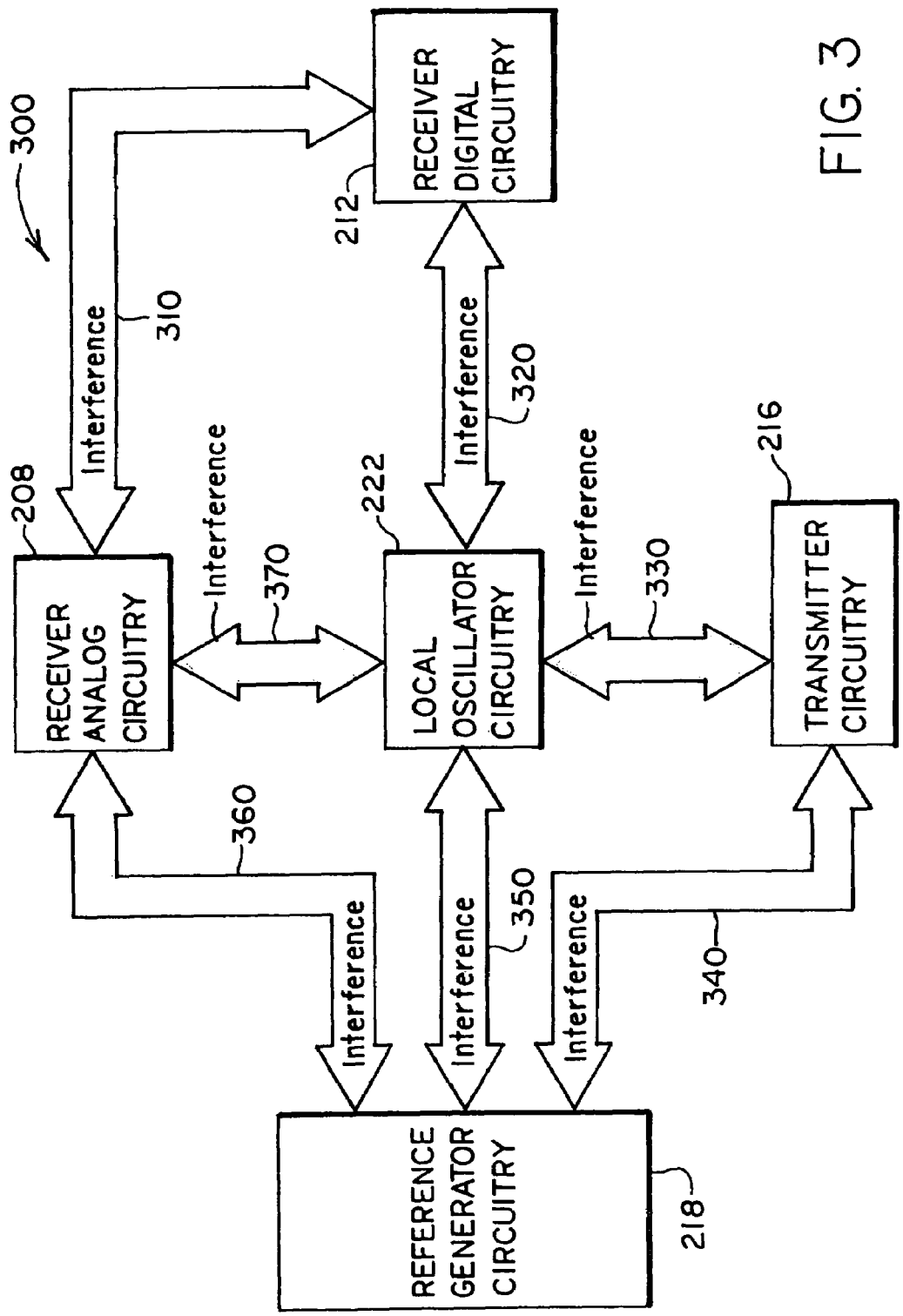
FIG. 3 illustrates interference mechanisms among the various blocks of an RF transceiver, which the embodiments of the invention in FIGS. 2A–2D, depicting RF transceivers partitioned according to the invention, seek to overcome, reduce, or minimize.

FIG. 2B shows an embodiment 200B of an RF transceiver circuitry partitioned according to the invention. The embodiment 200B has the same circuit topology as that of embodiment 200A in FIG. 2A. The partitioning of embodiment 200B, however, differs from the partitioning of embodiment 200A. Like embodiment 200A, embodiment 200B has three circuit partitions, or circuit blocks. The first and the third circuit partitions in embodiment 200B are similar to the first and third circuit partitions in embodiment 200A. The second circuit partition 230 in embodiment 200B, however, includes the reference signal generator 218 in addition to the receiver digital circuitry 212. As in embodiment 200A, embodiment 200B is partitioned so that interference effects among the three circuit partitions tend to be reduced.

Figure 2C:
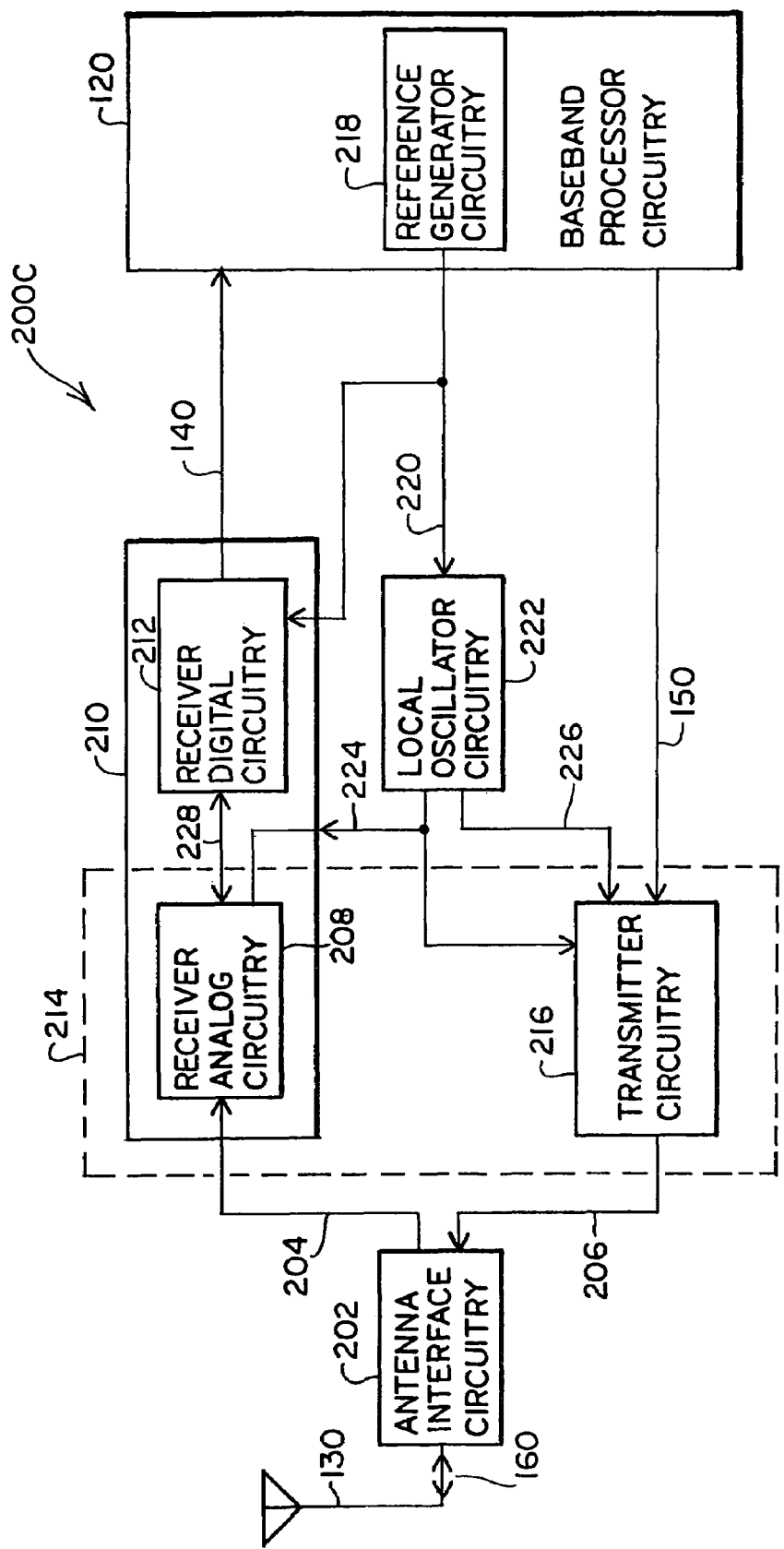
FIG. 2C illustrates yet another embodiment of RF transceiver circuitry partitioned according to invention, in which the reference generator circuitry resides within the baseband processor circuitry.

FIG. 2C illustrates an embodiment 200C, which constitutes a variation of embodiment 200A in FIG. 2A. Embodiment 200C shows that one may place the reference signal generator 218 within the baseband processor circuitry 120, as desired. Placing the reference signal generator 218 within the baseband processor circuitry 120 obviates the need for either discrete reference signal generator circuitry 218 or an additional integrated circuit or module that includes the reference signal generator 218. Embodiment 200C has the same partitioning as embodiment 200A, and operates in a similar manner.

Note that FIGS. 2A–2C show the receiver circuitry 210 as a block to facilitate the description of the embodiments shown in those figures. In other words, the block containing the receiver circuitry 210 in FIGS. 2A–2C constitutes a conceptual depiction of the receiver circuitry within the RF transceiver shown in FIGS. 2A–2C, not a circuit partition or circuit block.

Figure 2D:
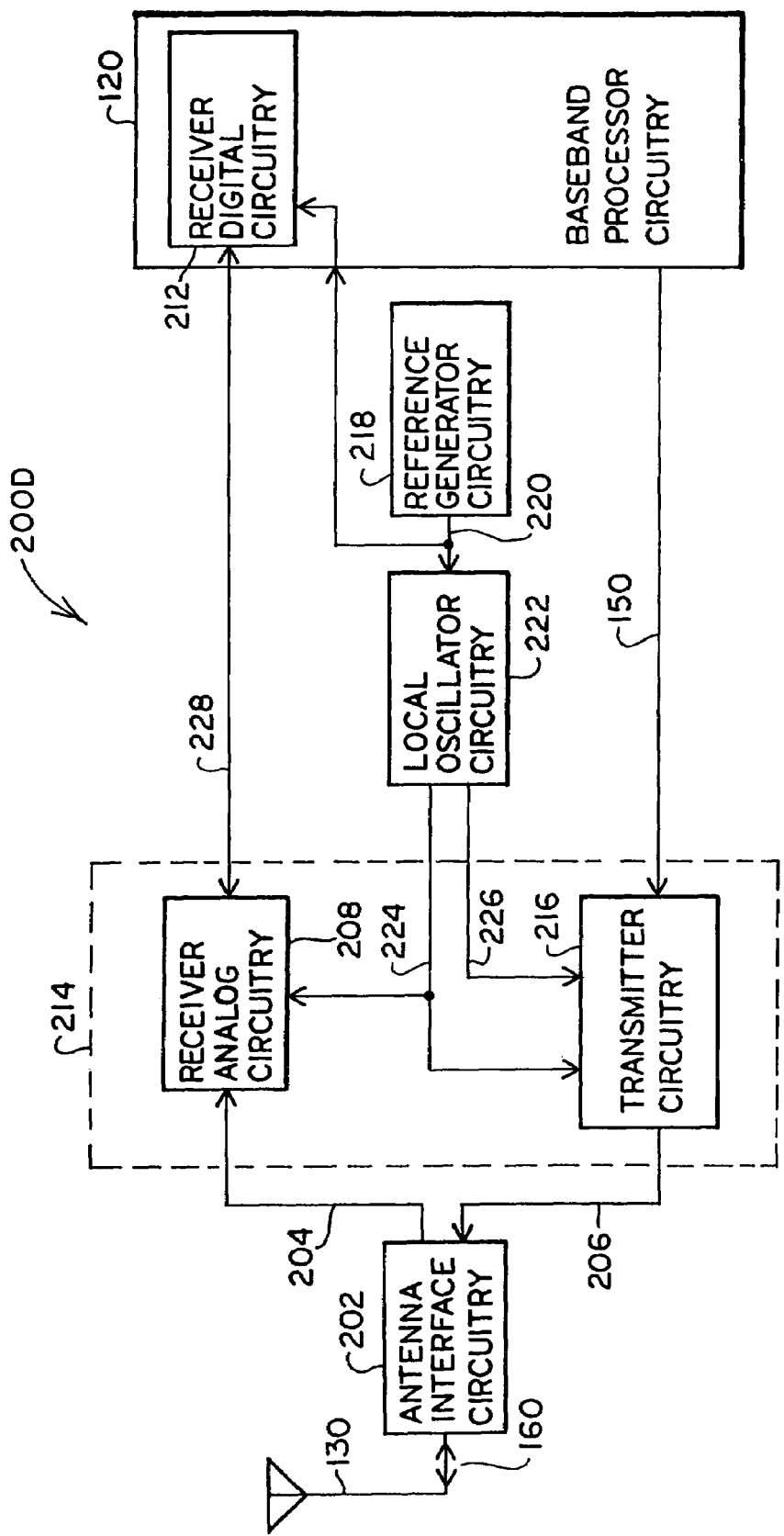
FIG. 2D shows another embodiment of RF transceiver circuitry partitioned according to the invention, in which the receiver digital circuitry resides within the baseband processor circuitry.

FIG. 2D shows an embodiment 200D of an RF transceiver partitioned according to the invention. The RF transceiver in FIG. 2D operates similarly to the transceiver shown in FIG. 2A. The embodiment 200D, however, accomplishes additional economy by including the receiver digital circuitry 212 within the baseband processor circuitry 120. As one alternative, one may integrate the entire receiver digital circuitry 212 on the same integrated circuit device that includes the baseband processor circuitry 120. Note that one may use software (or firmware), hardware, or a combination of software (or firmware) and hardware to realize the functions of the receiver digital circuitry 212 within the baseband processor circuitry 120, as persons skilled in the art who have the benefit of the description of the invention understand. Note also that, similar to the embodiment 200C in FIG. 2C, the baseband processor circuitry 120 in embodiment 200D may also include the reference signal generator 218, as desired.

The partitioning of embodiment 200D involves two circuit partitions, or circuit blocks. The first circuit partition 214 includes the receiver analog circuitry 208 and the transmitter circuitry 216. The second circuit partition includes the local oscillator circuitry 222. The first and second circuit partitions are partitioned so that interference effects between them tend to be reduced.

FIG. 3 shows the mechanisms that may lead to interference among the various blocks or components in a typical RF transceiver, for example, the transceiver shown in FIG. 2A. Note that the paths with arrows in FIG. 3 represent interference mechanisms among the blocks within the transceiver, rather than desired signal paths. One interference mechanism results from the reference signal 220 (see FIGS. 2A–2D), which preferably comprises a clock signal. In the preferred embodiments, the reference generator circuitry produces a clock signal that may have a frequency of 13 MHz (GSM clock frequency) or 26 MHz. If the reference generator produces a 26 MHz clock signal, RF transceivers according to the invention preferably divide that signal by two to produce a 13 MHz master system clock. The clock signal typically includes voltage pulses that have many Fourier series harmonics. The Fourier series harmonics extend to many multiples of the clock signal frequency. Those harmonics may interfere with the receiver analog circuitry 208 (e.g., the low-noise amplifier, or LNA), the local oscillator circuitry 222 (e.g., the synthesizer circuitry), and the transmitter circuitry 216 (e.g., the transmitter's voltage-controlled oscillator, or VCO). FIG. 3 shows these sources of interference as interference mechanisms 360, 350, and 340.

The receiver digital circuitry 212 uses the output of the reference generator circuitry 218, which preferably comprises a clock signal. Interference mechanism 310 exists because of the sensitivity of the receiver analog circuitry 208 to the digital switching noise and harmonics present in the receiver digital circuitry 212. Interference mechanism 310 may also exist because of the digital signals (for example, clock signals) that the receiver digital circuitry 212 communicates to the receiver analog circuitry 208. Similarly, the digital switching noise and harmonics in the receiver digital circuitry 212 may interfere with the local oscillator circuitry 222, giving rise to interference mechanism 320 in FIG. 3.

The local oscillator circuitry 222 typically uses an inductor in an inductive-capacitive (LC) resonance tank (not shown explicitly in the figures). The resonance tank may circulate relatively large currents. Those currents may couple to the sensitive circuitry within the transmitter circuitry 216 (e.g., the transmitter's VCO), thus giving rise to interference mechanism 330. Similarly, the relatively large currents circulating within the resonance tank of the local oscillator circuitry 222 may saturate sensitive components within the receiver analog circuitry 208 (e.g., the LNA circuitry). FIG. 3 depicts this interference source as interference mechanism 370.

The timing of the transmit mode and receive mode in the GSM specifications help to mitigate potential interference between the transceiver's receive-path circuitry and its transmit-path circuitry. The GSM specifications use time-division duplexing (TDD). According to the TDD protocol, the transceiver deactivates the transmit-path circuitry while in the receive mode of operation, and vice-versa. Consequently, FIG. 3 does not show potential interference mechanisms between the transmitter circuitry 216 and either the receiver digital circuitry 212 or the receiver analog circuitry 208.

As FIG. 3 illustrates, interference mechanisms exist between the local oscillator circuitry 222 and each of the other blocks or components in the RF transceiver. Thus, to reduce interference effects, RF transceivers according to the invention preferably partition the local oscillator circuitry 222 separately from the other transceiver blocks shown in FIG. 3. Note, however, that in some circumstances one may include parts or all of the local oscillator circuitry within the same circuit partition (for example, circuit partition 214 in FIGS. 2A–2D) that includes the receiver analog circuitry and the transmitter circuitry, as desired. Typically, a voltage-controlled oscillator (VCO) within the local oscillator circuitry causes interference with other sensitive circuit blocks (for example, the receiver analog circuitry) through undesired coupling mechanisms. If those coupling mechanisms can be mitigated to the extent that the performance characteristics of the RF transceiver are acceptable in a given application, then one may include the local oscillator circuitry within the same circuit partition as the receiver analog circuitry and the transmitter circuitry. Alternatively, if the VCO circuitry causes unacceptable levels of interference, one may include other parts of the local oscillator circuitry within the circuit partition that includes the receiver analog circuitry and the transmitter circuitry, but exclude the VCO circuitry from that circuit partition.

To reduce the effects of interference mechanism 310, RF transceivers according to the invention partition the receiver analog circuitry 208 separately from the receiver digital circuitry 212. Because of the mutually exclusive operation of the transmitter circuitry 216 and the receiver analog circuitry 208 according to GSM specifications, the transmitter circuitry 216 and the receiver analog circuitry 208 may reside within the same circuit partition, or circuit block. Placing the transmitter circuitry 216 and the receiver analog circuitry 208 within the same circuit partition results in a more integrated RF transceiver overall. The RF transceivers shown in FIGS. 2A–2D employ partitioning techniques that take advantage of the above analysis of the interference mechanisms among the various transceiver components. To reduce interference effects among the various circuit partitions or circuit blocks even further, RF transceivers according to the invention also use differential signals to couple the circuit partitions or circuit blocks to one another.

Figure 4:
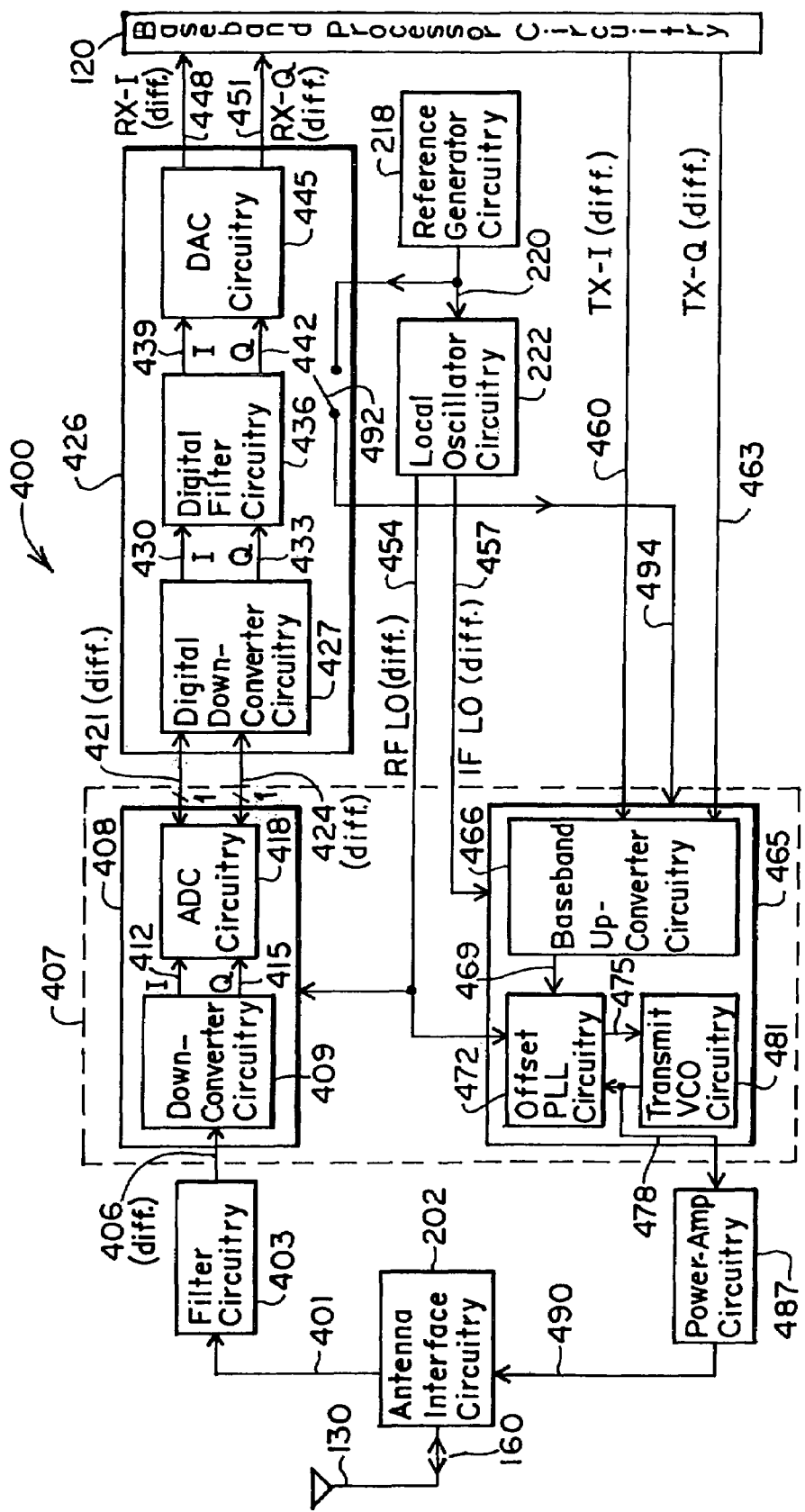
FIG. 4 shows a more detailed block diagram of RF transceiver circuitry partitioned according to the invention.

FIG. 4 shows a more detailed block diagram of an embodiment 400 of an RF transceiver partitioned according to the invention. The transceiver includes receiver analog circuitry 408, receiver digital circuitry 426, and transmitter circuitry 465. In the receive mode, the antenna interface circuitry 202 provides an RF signal 401 to a filter circuitry 403. The filter circuitry 403 provides a filtered RF signal 406 to the receiver analog circuitry 408. The receiver analog circuitry 408 includes down-converter (i.e., mixer) circuitry 409 and analog-to-digital converter (ADC) circuitry 418. The down-converter circuitry 409 mixes the filtered RF signal 406 with an RF local oscillator signal 454, received from the local oscillator circuitry 222. The down-converter circuitry 409 provides an in-phase analog down-converted signal 412 (i.e., I-channel signal) and a quadrature analog down-converted signal 415 (i.e., Q-channel signal) to the ADC circuitry 418.

The ADC circuitry 418 converts the in-phase analog down-converted signal 412 and the quadrature analog down-converted signal 415 into a one-bit in-phase digital receive signal 421 and a one-bit quadrature digital receive signal 424. (Note that FIGS. 4–8 illustrate signal flow, rather than specific circuit implementations; for more details of the circuit implementation, for example, more details of the circuitry relating to the one-bit in-phase digital receive signal 421 and the one-bit quadrature digital receive signal 424, see FIGS. 9–14.) Thus, The ADC circuitry 418 provides the one-bit in-phase digital receive signal 421 and the one-bit quadrature digital receive signal 424 to the receiver digital circuitry 426. As described below, rather than, or in addition to, providing the one-bit in-phase and quadrature digital receive signals to the receiver digital circuitry 426, the digital interface between the receiver analog circuitry 408 and the receiver digital circuitry 426 may communicate various other signals. By way of illustration, those signals may include reference signals (e.g., clock signals), control signals, logic signals, hand-shaking signals, data signals, status signals, information signals, flag signals, and/or configuration signals. Moreover, the signals may constitute single-ended or differential signals, as desired. Thus, the interface provides a flexible communication mechanism between the receiver analog circuitry and the receiver digital circuitry.

The receiver digital circuitry 426 includes digital down-converter circuitry 427, digital filter circuitry 436, and digital-to-analog converter (DAC) circuitry 445. The digital down-converter circuitry 427 accepts the one-bit in-phase digital receive signal 421 and the one-bit quadrature digital receive signal 424 from the receiver analog circuitry 408. The digital down-converter circuitry 427 converts the received signals into a down-converted in-phase signal 430 and a down-converted quadrature signal 433 and provides those signals to the digital filter circuitry 436. The digital filter circuitry 436 preferably comprises an infinite impulse response (IIR) channel-select filter that performs various filtering operations on its input signals. The digital filter circuitry 436 preferably has programmable response characteristics. Note that, rather than using an IIR filter, one may use other types of filter (e.g., finite impulse-response, or FIR, filters) that provide fixed or programmable response characteristics, as desired.

The digital filter circuitry 436 provides a digital in-phase filtered signal 439 and a digital quadrature filtered signal 442 to the DAC circuitry 445. The DAC circuitry 445 converts the digital in-phase filtered signal 439 and the digital quadrature filtered signal 442 to an in-phase analog receive signal 448 and a quadrature analog receive signal 451, respectively. The baseband processor circuitry 120 accepts the in-phase analog receive signal 448 and the quadrature analog receive signal 451 for further processing.

The transmitter circuitry 465 comprises baseband up-converter circuitry 466, offset phase-lock-loop (PLL) circuitry 472, and transmit voltage-controlled oscillator (VCO) circuitry 481. The transmit VCO circuitry 481 typically has low-noise circuitry and is sensitive to external noise. For example, it may pick up interference from digital switching because of the high gain that results from the resonant LC-tank circuit within the transmit VCO circuitry 481. The baseband up-converter circuitry 466 accepts an intermediate frequency (IF) local oscillator signal 457 from the local oscillator circuitry 222. The baseband up-converter circuitry 466 mixes the IF local oscillator signal 457 with an analog in-phase transmit input signal 460 and an analog quadrature transmit input signal 463 and provides an up-converted IF signal 469 to the offset PLL circuitry 472.

The offset PLL circuitry 472 effectively filters the IF signal 469. In other words, the offset PLL circuitry 472 passes through it signals within its bandwidth but attenuates other signals. In this manner, the offset PLL circuitry 472 attenuates any spurious or noise signals outside its bandwidth, thus reducing the requirement for filtering at the antenna 130, and reducing system cost, insertion loss, and power consumption. The offset PLL circuitry 472 forms a feedback loop with the transmit VCO circuitry 481 via an offset PLL output signal 475 and a transmit VCO output signal 478. The transmit VCO circuitry 481 preferably has a constant-amplitude output signal.

The offset PLL circuitry 472 uses a mixer (not shown explicitly in FIG. 4) to mix the RF local oscillator signal 454 with the transmit VCO output signal 478. Power amplifier circuitry 487 accepts the transmit VCO output signal 478, and provides an amplified RF signal 490 to the antenna interface circuitry 202. The antenna interface circuitry 202 and the antenna 130 operate as described above. RF transceivers according to the invention preferably use transmitter circuitry 465 that comprises analog circuitry, as shown in FIG. 4. Using such circuitry minimizes interference with the transmit VCO circuitry 481 and helps to meet emission specifications for the transmitter circuitry 465.

The receiver digital circuitry 426 also accepts the reference signal 220 from the reference generator circuitry 218. The reference signal 220 preferably comprises a clock signal. The receiver digital circuitry 426 provides to the transmitter circuitry 465 a switched reference signal 494 by using a switch 492. Thus, the switch 492 may selectively provide the reference signal 220 to the transmitter circuitry 465. Before the RF transceiver enters its transmit mode, the receiver digital circuitry 426 causes the switch 492 to close, thus providing the switched reference signal 494 to the transmitter circuitry 465.

The transmitter circuitry 465 uses the switched reference signal 494 to calibrate or adjust some of its components. For example, the transmitter circuitry 465 may use the switched reference signal 494 to calibrate some of its components, such as the transmit VCO circuitry 481, for example, as described in commonly owned U.S. Pat. No. 6,137,372, incorporated by reference here in its entirety. The transmitter circuitry 465 may also use the switched reference signal 494 to adjust a voltage regulator within its output circuitry so as to transmit at known levels of RF radiation or power.

While the transmitter circuitry 465 calibrates and adjusts its components, the analog circuitry within the transmitter circuitry 465 powers up and begins to settle. When the transmitter circuitry 465 has finished calibrating its internal circuitry, the receiver digital circuitry 426 causes the switch 492 to open, thus inhibiting the supply of the reference signal 220 to the transmitter circuitry 465. At this point, the transmitter circuitry may power up the power amplifier circuitry 487 within the transmitter circuitry 465. The RF transceiver subsequently enters the transmit mode of operation and proceeds to transmit.

Note that FIG. 4 depicts the switch 492 as a simple switch for conceptual, schematic purposes. One may use a variety of devices to realize the function of the controlled switch 492, for example, semiconductor switches, gates, or the like, as persons skilled in the art who have the benefit of the disclosure of the invention understand. Note also that, although FIG. 4 shows the switch 492 as residing within the receiver digital circuitry 426, one may locate the switch in other locations, as desired. Placing the switch 492 within the receiver digital circuitry 426 helps to confine to the receiver digital circuitry 426 the harmonics that result from the switching circuitry.

The embodiment 400 in FIG. 4 comprises a first circuit partition 407, or circuit block, that includes the receiver analog circuitry 408 and the transmitter circuitry 465. The embodiment 400 also includes a second circuit partition, or circuit block, that includes the receiver digital circuitry 426. Finally, the embodiment 400 includes a third circuit partition, or circuit block, that comprises the local oscillator circuitry 222. The first circuit partition 407, the second circuit partition, and the third circuit partition are partitioned from one another so that interference effects among the circuit partitions tend to be reduced. That arrangement tends to reduce the interference effects among the circuit partitions by relying on the analysis of interference effects provided above in connection with FIG. 3. Preferably, the first, second, and third circuit partitions each reside within an integrated circuit device. To further reduce interference effects among the circuit partitions, the embodiment 400 in FIG. 4 uses differential signals wherever possible. The notation "(diff.)" adjacent to signal lines or reference numerals in FIG. 4 denotes the use of differential lines to propagate the annotated signals.

Note that the embodiment 400 shown in FIG. 4 uses an analog-digital-analog signal path in its receiver section. In other words, the ADC circuitry 418 converts analog signals into digital signals for further processing, and later conversion back into analog signals by the DAC circuitry 445. RF transceivers according to the invention use this particular signal path for the following reasons. First, the ADC circuitry 418 obviates the need for propagating signals from the receiver analog circuitry 408 to the receiver digital circuitry 426 over an analog interface with a relatively high dynamic range. The digital interface comprising the one-bit in-phase digital receive signal 421 and the one-bit quadrature digital receive signal 424 is less susceptible to the effects of noise and interference than would be an analog interface with a relatively high dynamic range.

Second, the RF transceiver in FIG. 4 uses the DAC circuitry 445 to maintain compatibility with interfaces commonly used to communicate with baseband processor circuitry in RF transceivers. According to those interfaces, the baseband processor accepts analog, rather than digital, signals from the receive path circuitry within the RF transceiver. In an RF transceiver that meets the specifications of those interfaces, the receiver digital circuitry 426 would provide analog signals to the baseband processor circuitry 120. The receiver digital circuitry 426 uses the DAC circuitry 445 to provide analog signals (i.e., the in-phase analog receive signal 448 and the quadrature analog receive signal 451) to the baseband processor circuitry 120. The DAC circuitry 445 allows programming the common-mode level and the full-scale voltage, which may vary among different baseband processor circuitries.

Third, compared to an analog solution, the analog-digital-analog signal path may result in reduced circuit size and area (for example, the area occupied within an integrated circuit device), thus lower cost. Fourth, the digital circuitry provides better repeatability, relative ease of testing, and more robust operation than its analog counterpart. Fifth, the digital circuitry has less dependence on supply voltage variation, temperature changes, and the like, than does comparable analog circuitry.

Sixth, the baseband processor circuitry 120 typically includes programmable digital circuitry, and may subsume the functionality of the digital circuitry within the receiver digital circuitry 426, if desired. Seventh, the digital circuitry allows more precise signal processing, for example, filtering, of signals within the receive path. Eighth, the digital circuitry allows more power-efficient signal processing. Finally, the digital circuitry allows the use of readily programmable DAC circuitry and PGA circuitry that provide for more flexible processing of the signals within the receive path. To benefit from the analog-digital-analog signal path, RF transceivers according to the invention use a low-IF signal (for example, 100 KHz for GSM applications) in their receive path circuitry, as using higher IF frequencies may lead to higher performance demands on the ADC and DAC circuitry within that path. The low-IF architecture also eases image-rejection requirements, and allows on-chip integration of the digital filter circuitry 436. Moreover, RF transceivers according to the invention use the digital down-converter circuitry 427 and the digital filter circuitry 436 to implement a digital-IF path in the receive signal path. The digital-IF architecture facilitates the implementation of the digital interface between the receiver digital circuitry 426 and the receiver analog circuitry 408.

If the receiver digital circuitry 426 need not be compatible with the common analog interface to baseband processors, one may remove the DAC circuitry 445 and use a digital interface to the baseband processor circuitry 120, as desired. In fact, similar to the RF transceiver shown in FIG. 2D, one may realize the function of the receiver digital circuitry 426 within the baseband processor circuitry 120, using hardware, software, or a combination of hardware and software. In that case, the RF transceiver would include two circuit partitions, or circuit blocks. The first circuit partition, or circuit block, 407 would include the receiver analog circuitry 408 and the transmitter circuitry 465. A second circuit partition, or circuit block, would comprise the local oscillator circuitry 222. Note also that, similar to the RF transceiver shown in FIG. 2C, one may include within the baseband processor circuitry 120 the functionality of the reference generator circuitry 218, as desired.

Figure 5:
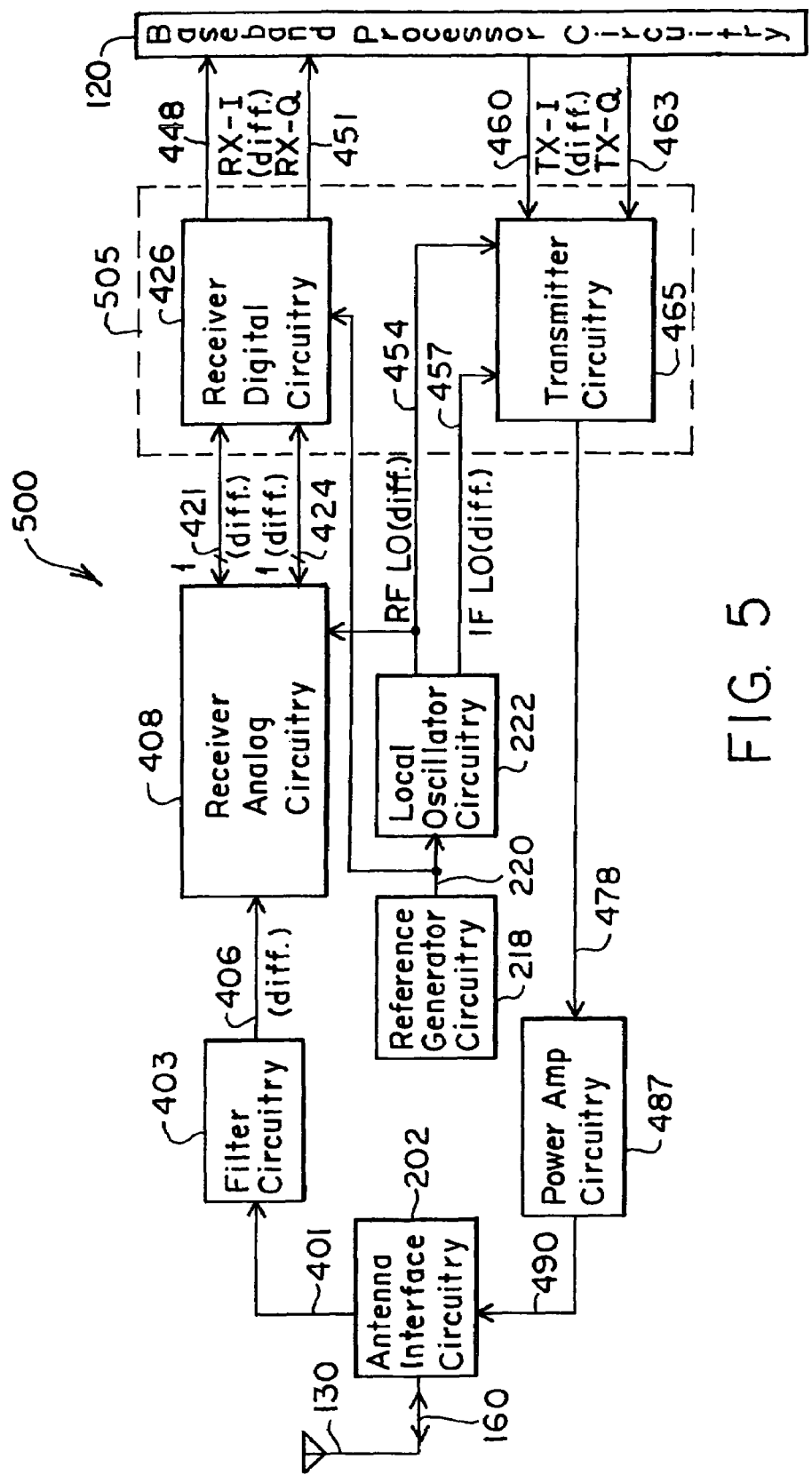
FIG. 5 illustrates an alternative technique for partitioning RF transceiver circuitry.
Figure 6:
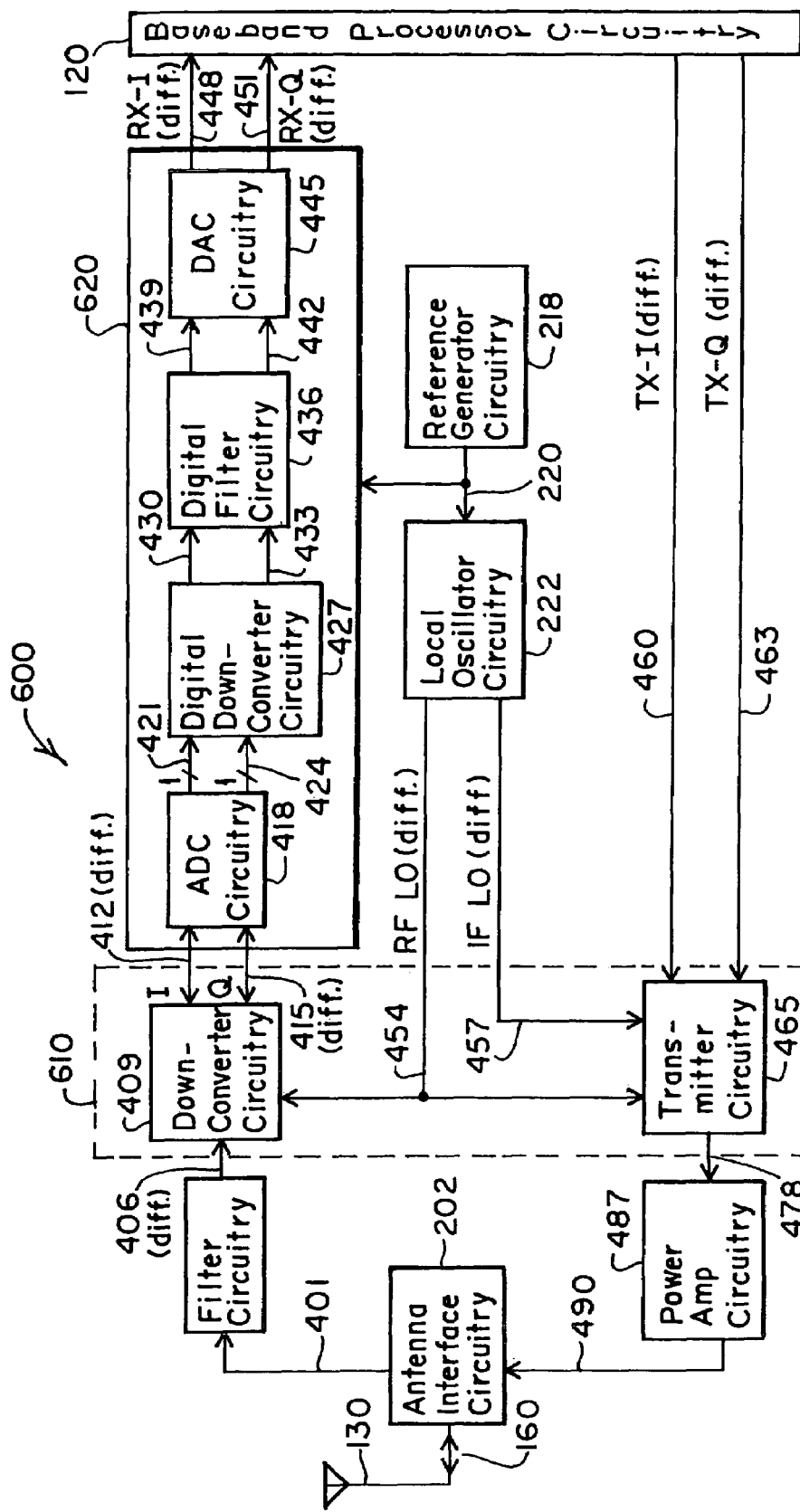
FIG. 6 shows yet another alternative technique for partitioning RF transceiver circuitry.

One may partition the RF transceiver shown in FIG. 4 in other ways. FIGS. 5 and 6 illustrate alternative partitioning of the RF transceiver of FIG. 4. FIG. 5 shows an embodiment 500 of an RF transceiver that includes three circuit partitions, or circuit blocks. A first circuit partition includes the receiver analog circuitry 408. A second circuit partition 505 includes the receiver digital circuitry 426 and the transmitter circuitry 465. As noted above, the GSM specifications provide for alternate operation of RF transceivers in receive and transmit modes. The partitioning shown in FIG. 5 takes advantage of the GSM specifications by including the receiver digital circuitry 426 and the transmitter circuitry 465 within the second circuit partition 505. A third circuit partition includes the local oscillator circuitry 222. Preferably, the first, second, and third circuit partitions each reside within an integrated circuit device. Similar to embodiment 400 in FIG. 4, the embodiment 500 in FIG. 5 uses differential signals wherever possible to further reduce interference effects among the circuit partitions.

FIG. 6 shows another alternative partitioning of an RF transceiver. FIG. 6 shows an embodiment 600 of an RF transceiver that includes three circuit partitions, or circuit blocks. A first circuit partition 610 includes part of the receiver analog circuitry, i.e., the down-converter circuitry 409, together with the transmitter circuitry 465. A second circuit partition 620 includes the ADC circuitry 418, together with the receiver digital circuitry, i.e., the digital down-converter circuitry 427, the digital filter circuitry 436, and the DAC circuitry 445. A third circuit partition includes the local oscillator circuitry 222. Preferably, the first, second, and third circuit partitions each reside within an integrated circuit device. Similar to embodiment 400 in FIG. 4, the embodiment 600 in FIG. 6 uses differential signals wherever possible to further reduce interference effects among the circuit partitions.

Figure 7:
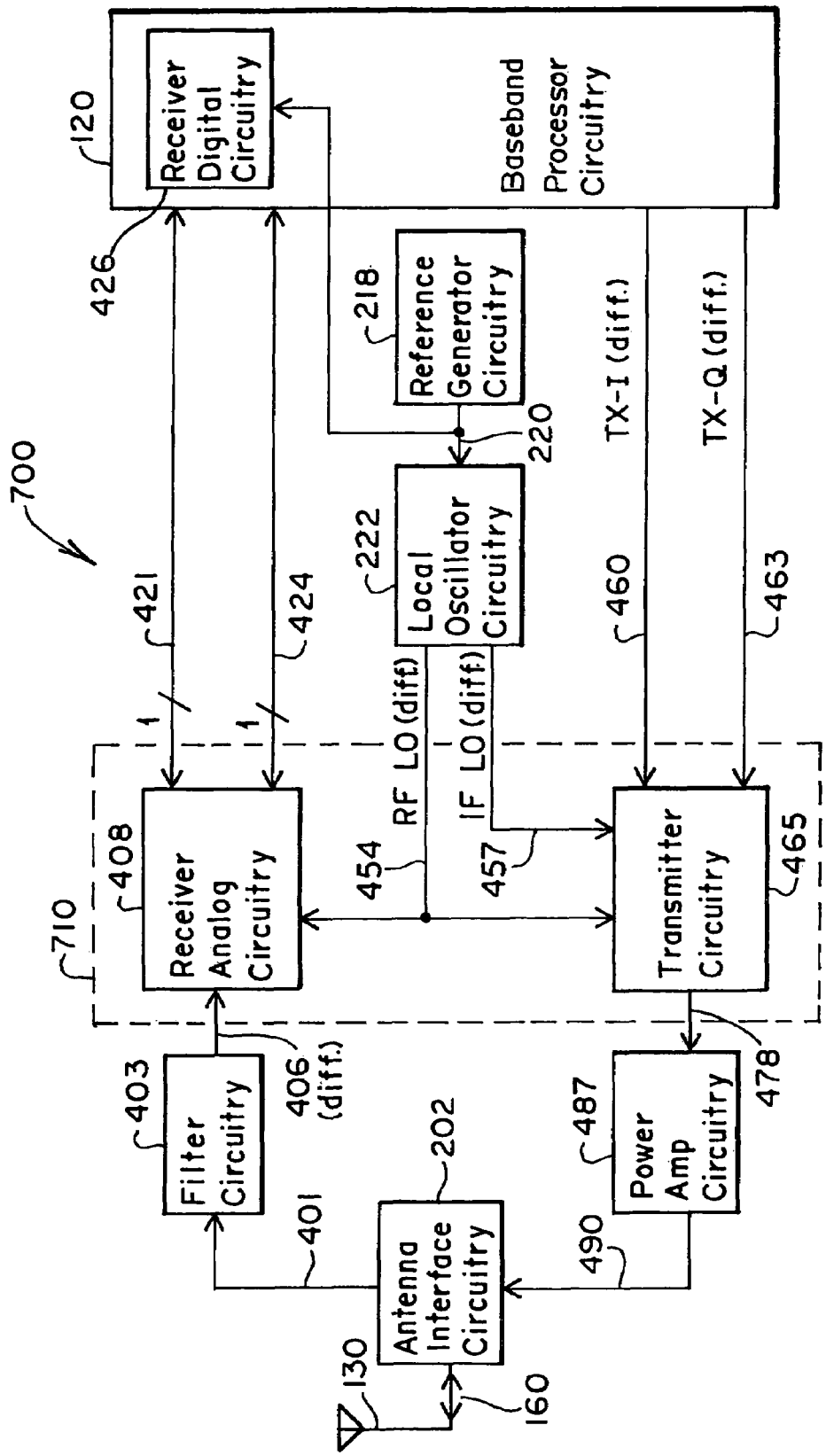
FIG. 7 depicts a more detailed block diagram of RF transceiver circuitry partitioned according to the invention, in which the receiver digital circuitry resides within the baseband processor circuitry.

FIG. 7 shows a variation of the RF transceiver shown in FIG. 4. FIG. 7 illustrates an embodiment 700 of an RF transceiver partitioned according to the invention. Note that, for the sake of clarity, FIG. 7 does not explicitly show the details of the receiver analog circuitry 408, the transmitter circuitry 465, and the receiver digital circuitry 426. The receiver analog circuitry 408, the transmitter circuitry 465, and the receiver digital circuitry 426 include circuitry similar to those shown in their corresponding counterparts in FIG. 4. Similar to the RF transceiver shown in FIG. 2D, the embodiment 700 in FIG. 7 shows an RF transceiver in which the baseband processor 120 includes the function of the receiver digital circuitry 426. The baseband processor circuitry 120 m ay realize the function of the receiver digital circuitry 426 using hardware, software, or a combination of hardware and software.

Because the embodiment 700 includes the function of the receiver digital circuitry 426 within the baseband processor circuitry 120, it includes two circuit partitions, or circuit blocks. A first circuit partition 710 includes the receiver analog circuitry 408 and the transmitter circuitry 465. A second circuit partition comprises the local oscillator circuitry 222. Note also that, similar to the RF transceiver shown in FIG. 2C, one may also include within the baseband processor circuitry 120 the functionality of the reference generator circuitry 218, as desired.

Figure 8:
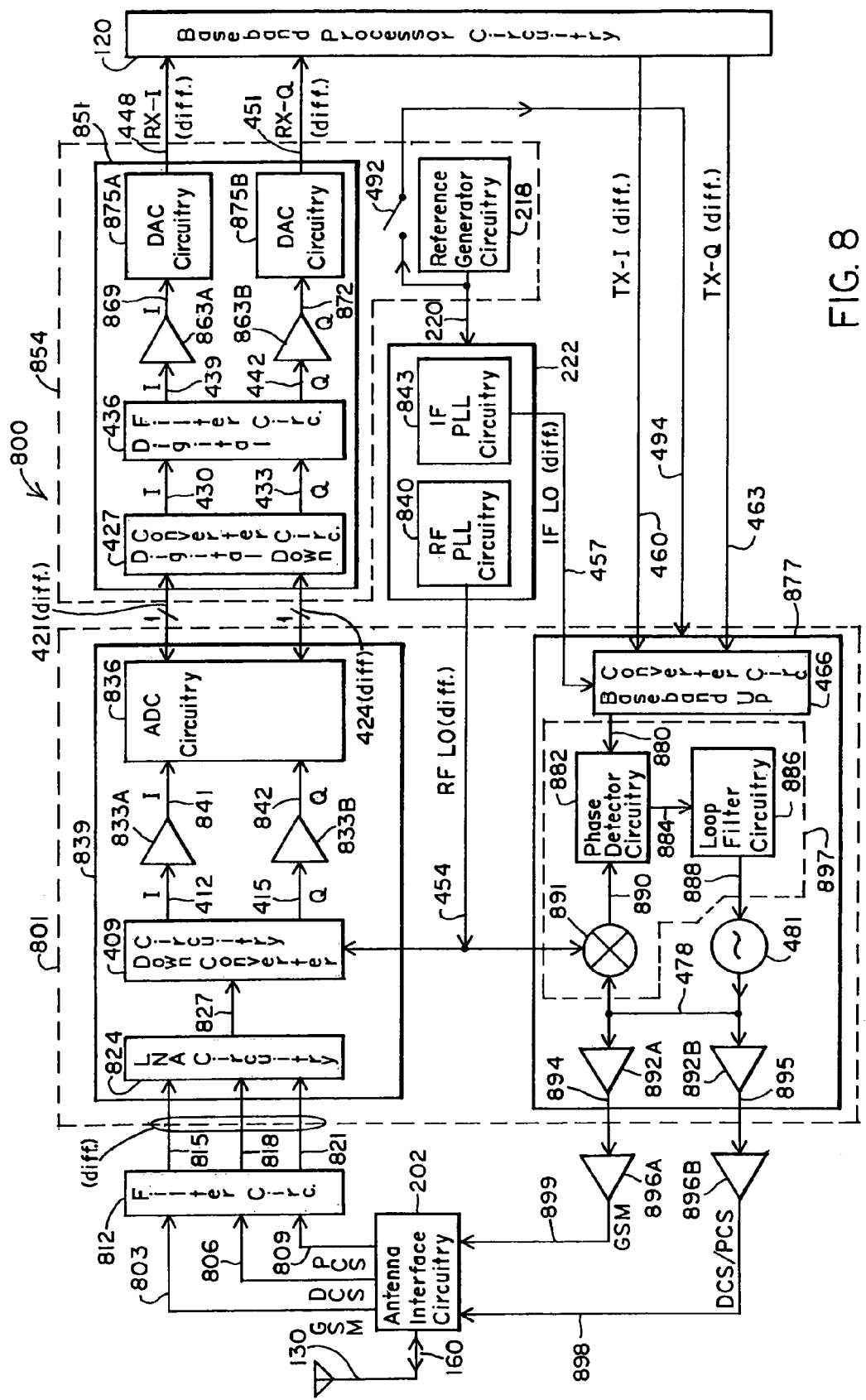
FIG. 8 illustrates a more detailed block diagram of a multi-band RF transceiver circuitry partitioned according to the invention.

FIG. 8 shows an embodiment 800 of a multi-band RF transceiver, partitioned according to the invention. Preferably, the RF transceiver in FIG. 8 operates within the GSM (925 to 960 MHz for reception and 880–915 MHz for transmission), PCS (1930 to 1990 MHz for reception and 1850–1910 MHz for transmission), and DCS (1805 to 1880 MHz for reception and 1710–1785 MHz for transmission) bands. Like the RF transceiver in FIG. 4, the RF transceiver in FIG. 8 uses a low-IF architecture. The embodiment 800 includes receiver analog circuitry 839, receiver digital circuitry 851, transmitter circuitry 877, local oscillator circuitry 222, and reference generator circuitry 218. The local oscillator circuitry 222 includes RF phase-lock loop (PLL) circuitry 840 and intermediate-frequency (IF) PLL circuitry 843. The RF PLL circuitry 840 produces the RF local oscillator, or RF LO, signal 454, whereas the IF PLL circuitry 843 produces the IF local oscillator, or IF LO, signal 457.

Table 1 below shows the preferred frequencies for the RF local oscillator signal 454 during the receive mode:

TABLE 1

| Band | RF Local Oscillator Frequency (MHz) |
| --- | --- |
| GSM | 1849.8–1919.8 |
| DCS | 1804.9–1879.9 |
| PCS | 1929.9–1989.9 |
| All Bands | 1804.9–1989.9 |

Table 2 below lists the preferred frequencies for the RF local oscillator signal 454 during the transmit mode:

TABLE 2

| Band | RF Local Oscillator Frequency (MHz) |
| --- | --- |
| GSM | 1279–1314 |
| DCS | 1327–1402 |
| PCS | 1423–1483 |
| All Bands | 1279–1483 |

During the receive mode, the IF local oscillator signal 457 is preferably turned off. In preferred embodiments, during the transmit mode, the IF local oscillator signal 457 preferably has a frequency between 383 MHz and 427 MHz. Note, however, that one may use other frequencies for the RF and IF local oscillator signals 454 and 457, as desired.

The reference generator 218 provides a reference signal 220 that preferably comprises a clock signal, although one may use other signals, as persons skilled in the art who have the benefit of the description of the invention understand. Moreover, the transmitter circuitry 877 preferably uses high-side injection for the GSM band and low-side injection for the DCS and PCS bands.

The receive path circuitry operates as follows. Filter circuitry 812 accepts a GSM RF signal 803, a DCS RF signal 806, and a PCS RF signal 809 from the antenna interface circuitry 202. The filter circuitry 812 preferably contains a surface-acoustic-wave (SAW) filter for each of the three bands, although one may use other types and numbers of filters, as desired. The filter circuitry 812 provides a filtered GSM RF signal 815, a filtered DCS RF signal 818, and a filtered PCS RF signal 821 to low-noise amplifier (LNA) circuitry 824. The LNA circuitry 824 preferably has programmable gain, and in part provides for programmable gain in the receive path circuitry.

The LNA circuitry 824 provides an amplified RF signal 827 to down-converter circuitry 409. In exemplary embodiments according to the invention, amplified RF signal 827 includes multiple signal lines, which may be differential signal lines, to accommodate the GSM, DCS, and PCS bands. Note that, rather than using the LNA circuitry with a real output, one may use an LNA circuitry that has complex outputs (in-phase and quadrature outputs), together with a poly-phase filter circuitry. The combination of the complex LNA circuitry and the poly-phase filter circuitry provides better image rejection, albeit with a somewhat higher loss. Thus, the choice of using the complex LNA circuitry and the poly-phase filter circuitry depends on a trade-off between image rejection and loss in the poly-phase filter circuitry.

The down-converter circuitry 409 mixes the amplified RF signal 827 with the RF local oscillator signal 454, which it receives from the RF PLL circuitry 840. The down-converter circuitry 409 produces the in-phase analog down-converted signal 412 and the quadrature in-phase analog down-converted signal 415. The down-converter circuitry 409 provides the in-phase analog down-converted signal 412 and the quadrature in-phase analog down-converted signal 415 to a pair of programmable-gain amplifiers (PGAs) 833A and 833B.

The PGA 833A and PGA 833B in part allow for programming the gain of the receive path. The PGA 833A and the PGA 833B supply an analog in-phase amplified signal 841 and an analog quadrature amplified signal 842 to complex ADC circuitry 836 (i.e., both I and Q inputs will affect both I and Q outputs). The ADC circuitry 836 converts the analog in-phase amplified signal 841 into a one-bit in-phase digital receive signal 421. Likewise, the ADC circuitry 836 converts the analog quadrature amplifier signal 842 into a one-bit quadrature digital receive signal 424.

Note that RF transceivers and receivers according to the invention preferably use a one-bit digital interface. One may, however, use a variety of other interfaces, as persons skilled in the art who have the benefit of the description of the invention understand. For example, one may use a multi-bit interface or a parallel interface. Moreover, as described below, rather than, or in addition to, providing the one-bit in-phase and quadrature digital receive signals to the receiver digital circuitry 851, the digital interface between the receiver analog circuitry 839 and the receiver digital circuitry 851 may communicate various other signals. By way of illustration, those signals may include reference signals (e.g., clock signals), control signals, logic signals, hand-shaking signals, data signals, status signals, information signals, flag signals, and/or configuration signals. Furthermore, the signals may constitute single-ended or differential signals, as desired. Thus, the interface provides a flexible communication mechanism between the receiver analog circuitry and the receiver digital circuitry.

The receiver digital circuitry 851 accepts the one-bit in-phase digital receive signal 421 and the one-bit quadrature digital receive signal 424, and provides them to the digital down-converter circuitry 427. The digital down-converter circuitry 427 converts the received signals into a down-converted in-phase signal 430 and a down-converted quadrature signal 433 and provides those signals to the digital filter circuitry 436. The digital filter circuitry 436 preferably comprises an IIR channel-select filter that performs filtering operations on its input signals. Note, however, that one may use other types of filters, for example, FIR filters, as desired.

The digital filter circuitry 436 provides the digital in-phase filtered signal 439 to a digital PGA 863A and the digital quadrature filtered signal 442 to a digital PGA 863B. The digital PGA 863A and PGA 863B in part allow for programming the gain of the receive path circuitry. The digital PGA 863A supplies an amplified digital in-phase signal 869 to DAC circuitry 875A, whereas the digital PGA 863B supplies an amplified digital quadrature signal 872 to DAC circuitry 875B. The DAC circuitry 875A converts the amplified digital in-phase signal 869 to the in-phase analog receive signal 448. The DAC circuitry 875B converts the amplified digital quadrature signal 872 signal into the quadrature analog receive signal 451. The baseband processor circuitry 120 accepts the in-phase analog receive signal 448 and the quadrature analog receive signal 451 for further processing, as desired.

Note that the digital circuit blocks shown in the receiver digital circuitry 851 depict mainly the conceptual functions and signal flow. The actual digital-circuit implementation may or may not contain separately identifiable hardware for the various functional blocks. For example, one may re-use (in time, for instance, by using multiplexing) the same digital circuitry to implement both digital PGA 863A and digital PGA 863B, as desired.

Note also that, similar to the RF transceiver in FIG. 4, the RF transceiver in FIG. 8 features a digital-IF architecture. The digital-IF architecture facilitates the implementation of the one-bit digital interface between the receiver digital circuitry 426 and the receiver analog circuitry 408. Moreover, the digital-IF architecture allows digital (rather than analog) IF-filtering, thus providing all of the advantages of digital filtering.

The transmitter circuitry 877 comprises baseband up-converter circuitry 466, transmit VCO circuitry 481, a pair of transmitter output buffers 892A and 892B, and offset PLL circuitry 897. The offset PLL circuitry 897 includes offset mixer circuitry 891, phase detector circuitry 882, and loop filter circuitry 886. The baseband up-converter circuitry 466 accepts the analog in-phase transmit input signal 460 and the analog quadrature transmit input signal 463, mixes those signals with the IF local oscillator signal 457, and provides a transmit IF signal 880 to the offset PLL circuitry 897. The offset PLL circuitry 897 uses the transmit IF signal 880 as a reference signal. The transmit IF signal 880 preferably comprises a modulated single-sideband IF signal but, as persons skilled in the art who have the benefit of the description of the invention understand, one may use other types of signal and modulation, as desired.

The offset mixer circuitry 891 in the offset PLL circuitry 897 mixes the transmit VCO output signal 478 with the RF local oscillator signal 454, and provides a mixed signal 890 to the phase detector circuitry 882. The phase detector circuitry 882 compares the mixed signal 890 to the transmit IF signal 880 and provides an offset PLL error signal 884 to the loop filter circuitry 886. The loop filter circuitry 886 in turn provides a filtered offset PLL signal 888 to the transmit VCO circuitry 481. Thus, the offset PLL circuitry 897 and the transmit VCO circuitry 481 operate in a feedback loop. Preferably, the output frequency of the transmit VCO circuitry 481 centers between the DCS and PCS bands, and its output is divided by two for the GSM band.

Transmitter output buffers 892A and 892B receive the transmit VCO output signal 478 and provide buffered transmit signals 894 and 895 to a pair of power amplifiers 896A and 896B. The power amplifiers 896A and 896B provide amplified RF signals 899 and 898, respectively, for transmission through antenna interface circuitry 202 and the antenna 130. Power amplifier 896A provides the RF signal 899 for the GSM band, whereas power amplifier 896B supplies the RF signal 898 for the DCS and PCS bands. Persons skilled in the art who have the benefit of the description of the invention, however, understand that one may use other arrangements of power amplifiers and frequency bands. Moreover, one may use RF filter circuitry within the output path of the transmitter circuitry 877, as desired.

The embodiment 800 comprises three circuit partitions, or circuit blocks. A first circuit partition 801 includes the receiver analog circuitry 839 and the transmitter circuitry 877. A second circuit partition 854 includes the receiver digital circuitry 851 and the reference generator circuitry 218. Finally, a third circuit partition comprises the local oscillator circuitry 222. The first circuit partition 801, the second circuit partition 854, and the third circuit partition are partitioned from one another so that interference effects among the circuit partitions tend to be reduced. That arrangement tends to reduce the interference effects among the circuit partitions because of the analysis of interference effects provided above in connection with FIG. 3. Preferably, the first, second, and third circuit partitions each reside within an integrated circuit device. To further reduce interference effects among the circuit partitions, the embodiment 800 in FIG. 8 uses differential signals wherever possible. The notation "(diff.)" adjacent to signal lines or reference numerals in FIG. 8 denotes the use of differential lines to propagate the annotated signals.

Note that, similar to the RF transceiver shown in FIG. 4 and described above, the embodiment 800 shown in FIG. 8 uses an analog-digital-analog signal path in its receiver section. The embodiment 800 uses this particular signal path for reasons similar to those described above in connection with the transceiver shown in FIG. 4.

Like the transceiver in FIG. 4, if the receiver digital circuitry 851 need not be compatible with the common analog interface to baseband processors, one may remove the DAC circuitry 875A and 875B, and use a digital interface to the baseband processor circuitry 120, as desired. In fact, similar to the RF transceiver shown in FIG. 2D, one may realize the function of the receiver digital circuitry 851 within the baseband processor circuitry 120, using hardware, software, or a combination of hardware and software. In that case, the RF transceiver would include two circuit partitions, or circuit blocks. The first circuit partition 801 would include the receiver analog circuitry 839 and the transmitter circuitry 877. A second circuit partition would comprise the local oscillator circuitry 222. Note also that, similar to the RF transceiver shown in FIG. 2C, in the embodiment 800, one may include within the baseband processor circuitry 120 the functionality of the reference generator circuitry 218, as desired.

Another aspect of the invention includes a configurable interface between the receiver digital circuitry and the receiver analog circuitry. Generally, one would seek to minimize digital switching activity within the receiver analog circuitry. Digital switching activity within the receiver analog circuitry would potentially interfere with the sensitive analog RF circuitry, for example, LNAs, or mixers. As described above, the receiver analog circuitry includes analog-to-digital circuitry (ADC), which preferably comprises sigma-delta-type ADCs. Sigma-delta ADCs typically use a clock signal at their output stages that generally has a pulse shape and, thus, contains high-frequency Fourier series harmonics. Moreover, the ADC circuitry itself produces digital outputs that the receiver digital circuitry uses. The digital switching present at the outputs of the ADC circuitry may also interfere with sensitive analog circuitry within the receiver analog circuitry.

Figure 9A:
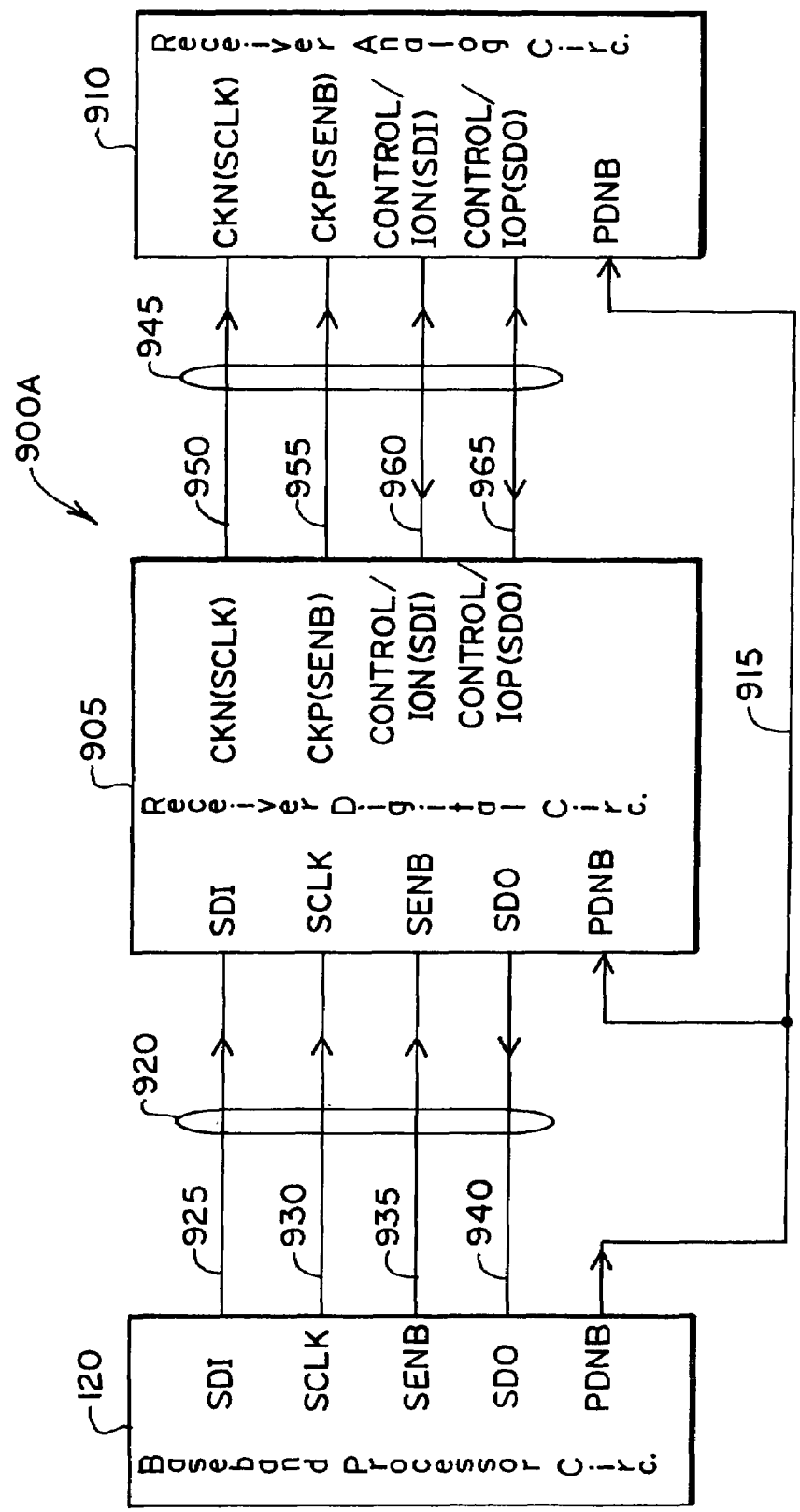
FIG. 9A shows a block diagram of an embodiment of the interface between the receiver digital circuitry and receiver analog circuitry in an RF transceiver according to the invention.

The invention contemplates providing RF apparatus according to the invention, for example, receivers and transceivers, that include an interface circuitry to minimize or reduce the effects of interference from digital circuitry within the RF apparatus. FIG. 9A shows an embodiment 900A of an interface between the receiver digital circuitry 905 and the receiver analog circuitry 910. The interface includes configurable interface signal lines 945. The baseband processor circuitry 120 in the transceiver of FIG. 9A communicates configuration, status, and setup information with both the receiver digital circuitry 905 and the receiver analog circuitry 910. In the preferred embodiments of RF transceivers according to the invention, the baseband processor circuitry 120 communicates with the receiver digital circuitry 905 and the receiver analog circuitry 910 by sending configuration data to read and write registers included within the receiver digital circuitry 905 and the receiver analog circuitry 910.

The receiver digital circuitry 905 communicates with the baseband processor circuitry 120 through a set of serial interface signal lines 920. The serial interface signal lines 920 preferably include a serial data-in (SDI) signal line 925, a serial clock (SCLK) signal line 930, a serial interface enable (SENB) signal line 935, and a serial data-out (SDO) signal line 940. The transceiver circuitry and the baseband processor circuitry 120 preferably hold all of the serial interface signal lines 920 at static levels during the transmit and receive modes of operation. The serial interface preferably uses a 22-bit serial control word that comprises 6 address bits and 16 data bits. Note, however, that one may use other serial interfaces, parallel interfaces, or other types of interfaces, that incorporate different numbers of signal lines, different types and sizes of signals, or both, as desired. Note also that, the SENB signal is preferably an active-low logic signal, although one may use a normal (i.e., an active-high) logic signal by making circuit modifications, as persons skilled in the art understand.

The receiver digital circuitry 905 communicates with the receiver analog circuitry 910 via configurable interface signal lines 945. Interface signal lines 945 preferably include four configurable signal lines 950, 955, 960, and 965, although one may use other numbers of configurable signal lines, as desired, depending on a particular application. In addition to supplying the serial interface signals 920, the baseband processor circuitry 120 provides a control signal 915, shown as a power-down (PDNB) signal in FIG. 9A, to both the receiver digital circuitry 905 and the receiver analog circuitry 910. The receiver digital circuitry 905 and the receiver analog circuitry 910 preferably use the power-down (PDNB) signal as the control signal 915 to configure the functionality of the interface signal lines 945. In other words, the functionality of the interface signal lines 945 depends on the state of the control signal 915. Also, the initialization of the circuitry within the receive path and the transmit path of the transceiver occurs upon the rising edge of the PDNB signal. Note that the PDNB signal is preferably an active-low logic signal, although one may use a normal (i.e., an active-high) logic signal, as persons skilled in the art would understand. Note also that, rather than using the PDNB signal, one may use other signals to control the configuration of the interface signal lines 945, as desired.

In the power-down or serial interface mode (i.e., the control signal 915 (for example, PDNB) is in the logic low state), interface signal line 950 provides the serial clock (SCLK) and interface signal line 955 supplies the serial interface enable signal (SENB). Furthermore, interface signal line 960 provides the serial data-in signal (SDI), whereas interface signal line 965 supplies the serial data-out (SDO) signal. One may devise other embodiments according to the invention in which, during this mode of operation, the transceiver may also perform circuit calibration and adjustment procedures, as desired (for example, the values of various transceiver components may vary over time or among transceivers produced in different manufacturing batches. The transceiver may calibrate and adjust its circuitry to take those variations into account and provide higher performance).

In the normal receive mode of operation (i.e., the control signal, PDNB, is in the logic-high state), interface signal line 950 provides a negative clock signal (CKN) and interface signal line 955 supplies the positive clock signal (CKP). Furthermore, interface signal line 960 provides a negative data signal (ION), whereas interface signal line 965 supplies a positive data signal (IOP).

In preferred embodiments of the invention, the CKN and CKP signals together form a differential clock signal that the receiver digital circuitry 905 provides to the receiver analog circuitry 910. The receiver analog circuitry 910 may provide the clock signal to the transmitter circuitry within the RF transceiver in order to facilitate calibration and adjustment of circuitry, as described above. During the receive mode, the receiver analog circuitry 910 provides the ION and IOP signals to the receiver digital circuitry 905. The ION and IOP signals preferably form a differential data signal. As noted above, the transceiver disables the transmitter circuitry during the receive mode of operation.

In preferred embodiments according to the invention, clock signals CKN and CKP are turned off when the transmitter circuitry is transmitting signals. During the transmit mode, interface signal lines 960 and 965 preferably provide two logic signals from the receiver digital circuitry 905 to the receiver analog circuitry 910. The signal lines may provide input/output signals to communicate data, status, information, flag, and configuration signals between the receiver digital circuitry 905 and the receiver analog circuitry 910, as desired. Preferably, the logic signals control the output buffer of the transmit VCO circuitry. Note that, rather than configuring interface signal lines 960 and 965 as logic signal lines, one may configure them in other ways, for example, analog signal lines, differential analog or digital signal lines, etc., as desired. Furthermore, the interface signal line 960 and 965 may provide signals from the receiver digital circuitry 905 to the receiver analog circuitry 910, or vice-versa, as desired.

In addition to using differential signals, RF transceivers according to the invention preferably take other measures to reduce interference effects among the various transceiver circuits. Signals CKN, CKP, ION, and IOP may constitute voltage signals, as desired. Depending on the application, the signals CKN, CKP, ION, and IOP (or logic signals in the transmit mode) may have low voltage swings (for example, voltage swings smaller than the supply voltage) to reduce the magnitude and effects of interference because of the voltage switching on those signals.

In preferred embodiments according to the invention, signals CKN, CKP, ION, and IOP constitute current, rather than voltage, signals. Moreover, to help reduce the effects of interference even further, RF transceivers according to the invention preferably use band-limited signals. RF transceivers according to the invention preferably use filtering to remove some of the higher frequency harmonics from those signals to produce band-limited current signals.

Table 3 below summarizes the preferred functionality of the configurable interface signal lines 950, 955, 960, and 965 as a function of the state of the control signal 915 (for example, PDNB):

TABLE 3

| Signal Line | Control = 0 | Control = 1 (During Reception) | Control = 1 (During Transmission) |
|---|---|---|---|
| 950 | SCLK | CKN | (CKN off) |
| 955 | SENB | CKP | (CKP off) |
| 960 | SDI | ION | Logic Signal |
| 965 | SDO | IOP | Logic Signal |

Using configurable interface signal lines 945 in the interface between the receiver digital circuitry 905 and the receiver analog circuitry 910 allows using the same physical connections (e.g., pins on an integrated-circuit device or electrical connectors on a module) to accomplish different functionality. Thus, the configurable interface between the receiver digital circuitry 905 and the receiver analog circuitry 910 makes available the physical electrical connections available for other uses, for example, providing ground pins or connectors around sensitive analog signal pins or connectors to help shield those signals from RF interference. Moreover, the configurable interface between the receiver digital circuitry 905 and the receiver analog circuitry 910 reduces packaging size, cost, and complexity.

Figure 9B:
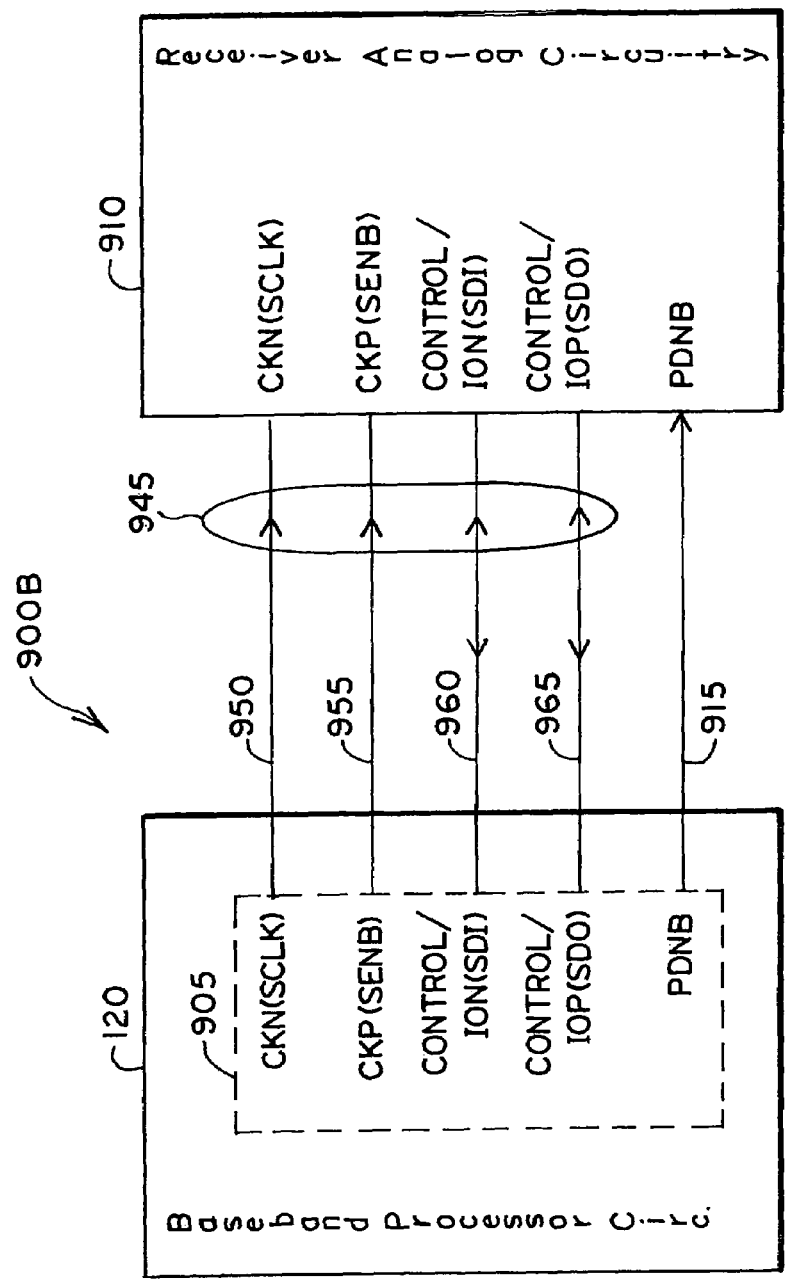
FIG. 9B depicts a block diagram of another embodiment of the interface between the baseband processor circuitry and the receiver analog circuitry in an RF transceiver according to the invention, in which the receiver digital circuitry resides within the baseband processor circuitry.

FIG. 9B shows an embodiment 900B that includes a configurable interface according to the invention. Here, the baseband processor circuitry 120 subsumes the functionality of the receiver digital circuitry 905. The baseband processor circuitry 120 realizes the functionality of the receiver digital circuitry 905, using hardware, software, or both, as desired. Because the baseband processor circuitry 120 has subsumed the receiver digital circuitry 905, the baseband processor circuitry 120 may communicate with the receiver analog circuitry 910 using configurable interface signal lines 945, depending on the state of the control signal 915 (e.g., the PDNB signal). The configurable interface signal lines 945 perform the same functions described above in connection with FIG. 9A, depending on the state of the control signal 915. As noted above, one may reconfigure the interface signal line 960 and 965 during transmit mode to implement desired functionality, for example, logic signals.

Figure 10:
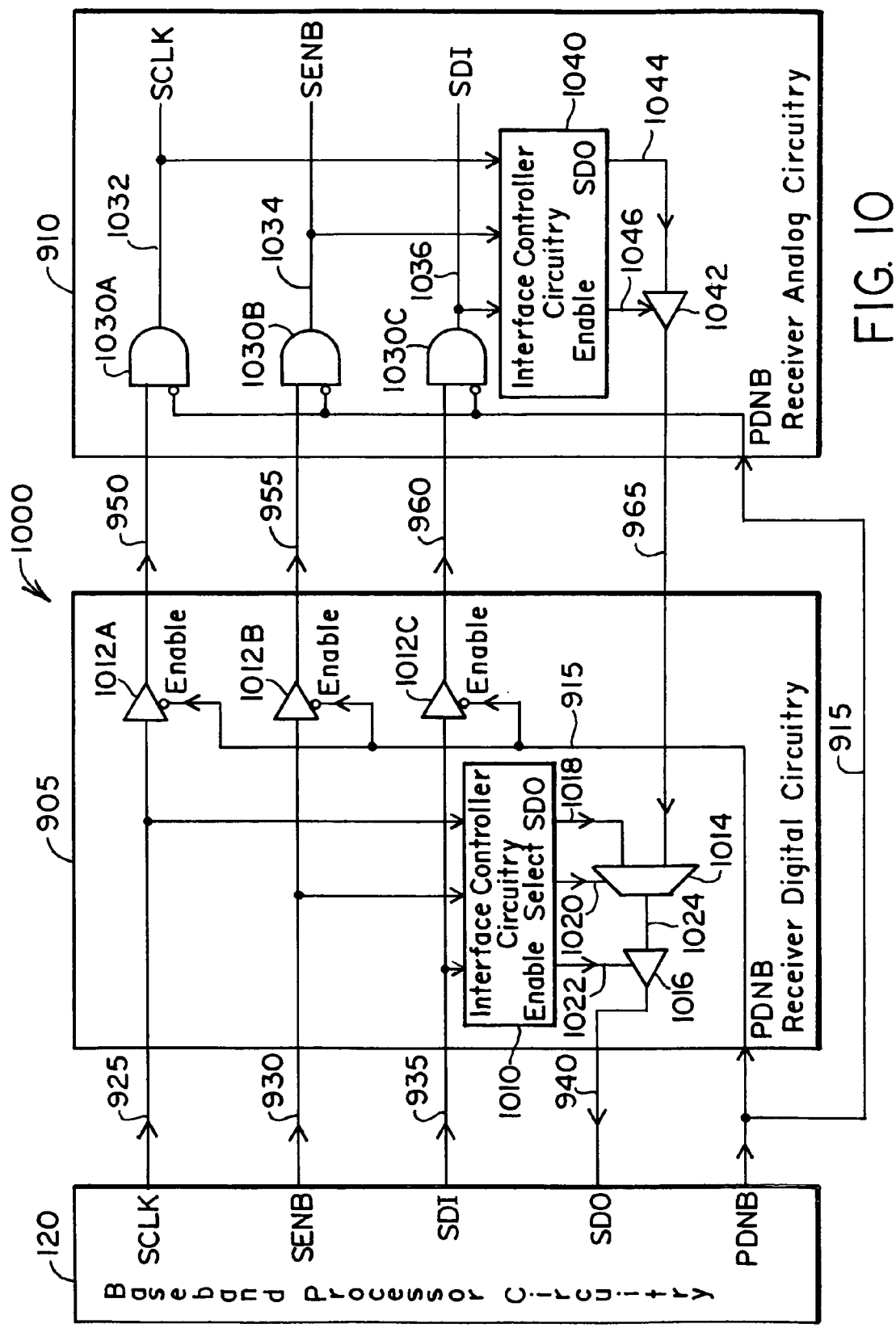
FIG. 10 illustrates a more detailed block diagram of the interface between the receiver analog circuitry and the receiver digital circuitry, with the interface configured as a serial interface.

FIG. 10 shows a conceptual block diagram of an embodiment 1000 of a configurable interface according to the invention within an RF transceiver in the power-down or serial interface mode (i.e., the control signal 915 is in a logic-low state). A logic low state on the control signal 915 enables the driver circuitry 1012A, 1012B, and 1012C, thus providing the configurable serial interface signal lines 950, 955, and 960 to the receiver analog circuitry 910. Similarly, the logic low state on the control signal 915 causes the AND gates 1030A, 1030B, and 1030C to provide configurable interface signal lines 950, 955, and 960 to other circuitry within the receiver analog circuitry 910. The outputs of the AND gates 1030A, 1030B, and 1030C comprise a gated SCLK signal 1032, a gated SENB signal 1034, and a gated SDI signal 1036, respectively.

Interface controller circuitry 1040 accepts as inputs the gated SCLK signal 1032, the gated SENB signal 1034, and the gated SDI signal 1036. The interface controller circuitry 1040 resides within the receiver analog circuitry 910 and produces a receiver analog circuitry SDO signal 1044 and an enable signal 1046. By controlling tri-state driver circuitry 1042, the enable signal 1046 controls the provision of the receiver analog circuitry SDO signal 1044 to the receiver digital circuitry 905 via the configurable interface signal line 965.

Interface controller circuitry 1010 within the receiver digital circuitry 905 accepts the SCLK signal 925, the SENB signal 930, and the SDI signal 935 from the baseband processor circuitry 120. By decoding those signals, the interface controller circuitry 1010 determines whether the baseband processor circuitry 120 intends to communicate with the receiver digital circuitry 905 (e.g., the baseband processor circuitry 120 attempts to read a status or control register present on the receiver digital circuitry 905). If so, the interface controller circuitry 1010 provides the SCLK signal 925, the SENB signal 930, and the SDI signal 935 to other circuitry (not shown explicitly) within the receiver digital circuitry 905 for further processing.

Interface controller circuitry 1010 provides as output signals a receiver digital circuitry SDO signal 1018, a select signal 1020, and an enable signal 1022. The receiver digital circuitry SDO signal 1018 represents the serial data-out signal for the receiver digital circuitry 905, i.e., the serial data-out signal that the receiver digital circuitry 905 seeks to provide to the baseband processor circuitry 120. The interface controller circuitry 1010 supplies the select signal 1020 to multiplexer circuitry 1014. The multiplexer circuitry 1014 uses that signal to selectively provide as the multiplexer circuitry output signal 1024 either the receiver digital circuitry SDO signal 1018 or the receiver analog circuitry SDO signal 1044, which it receives through configurable interface signal line 965. Tri-state driver circuitry 1016 provides the multiplexer circuitry output signal 1024 to the baseband processor circuitry 120 under the control of the enable signal 1022.

Tri-state driver circuitry 1012A, 1012B, and 1012C use an inverted version of the control signal 915 as their enable signals. Thus, a logic high value on the control signal 915 disables the driver circuitry 1012A, 1012B, and 1012C, thus disabling the serial interface between the receiver digital circuitry 905 and the receiver analog circuitry 910. Similarly, AND gates 1030A, 1030B, and 1030C use an inverted version of the control signal 915 to gate interface signal lines 950, 955, and 960. In other words, a logic high value on the control signal 915 inhibits logic switching at the outputs of AND gates 1030A, 1030B, and 1030C, which reside on the receiver analog circuitry 910.

Figure 11A:
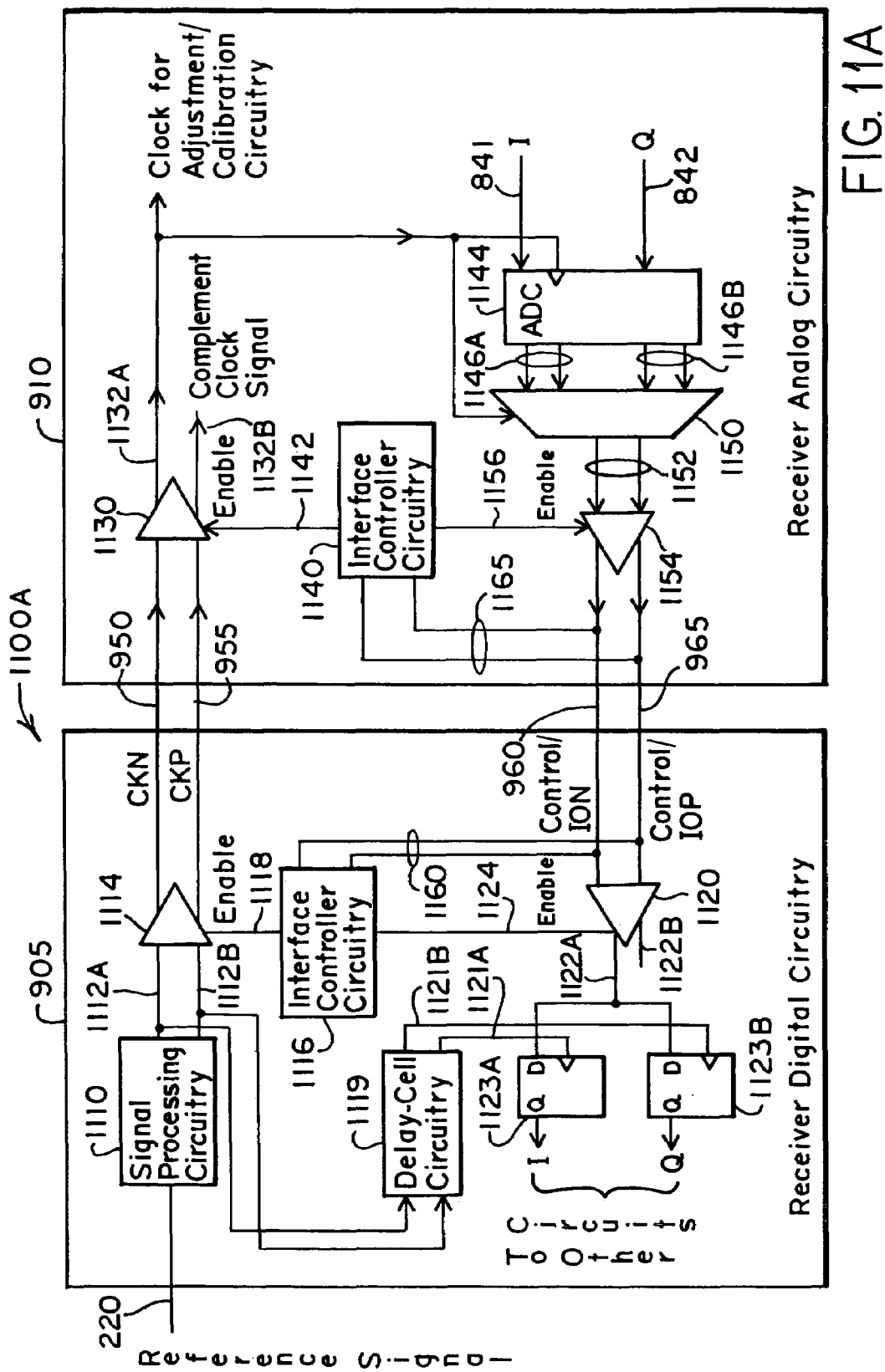
FIG. 11A shows a more detailed block diagram of an embodiment of the interface between the receiver analog circuitry and the receiver digital circuitry, with the interface configured as a data and clock signal interface.

FIG. 11A shows a conceptual block diagram of an embodiment 1100A of a configurable interface according to the invention, in an RF transceiver operating in the normal receive mode of operation (i.e., the control signal 915 is in a logic-high state). As noted above, in this mode, the receiver digital circuitry 905 provides a clock signal to the receiver analog circuitry 910 through the configurable interface signal line 950 and 955. Configurable interface signal line 950 provides the CKN signal, whereas configurable interface signal line 955 supplies the CKP signal. Also in this mode, the receiver analog circuitry 910 provides a data signal to the receiver digital circuitry 905 through the configurable interface signal line 960 and 965.

The receiver digital circuitry 905 provides the CKN and CKP signals to the receiver analog circuitry 910 by using clock driver circuitry 1114. The clock driver circuitry 1114 receives a clock signal 1112A and a complement clock signal 1112B from signal processing circuitry 1110. Signal processing circuitry 1110 receives the reference signal 220 and converts it to the clock signal 1112A and complement clock signal 1112B. Interface controller circuitry 1116 provides an enable signal 1118 that controls the provision of the CKN and CKP clock signals to the receiver analog circuitry 910 via the interface signal line 950 and 955, respectively.

Receiver analog circuitry 910 includes clock receiver circuitry 1130 that receives the CKN and CKP clock signals and provides a clock signal 1132A and a complement clock signal 1132B. Interface controller circuitry 1140 within the receiver analog circuitry 910 provides an enable signal 1142 that controls the operation of the clock receiver circuitry 1130.

The clock signal 1132A clocks the ADC circuitry 1144, or other circuitry (for example, calibration circuitry), or both, as desired. Note that, rather than using the clock signal 1132A, one may use the complement clock signal 1132B, or both the clock signal 1132A and the complement clock signal 1132B, by making circuit modifications as persons skilled who have the benefit of the description of the invention understand. The ADC circuitry 1144 provides to multiplexer circuitry 1150 a one-bit differential in-phase digital signal 1146A and a one-bit differential quadrature digital signal 1146B. The multiplexer circuitry 1150 provides a one-bit differential digital output signal 1152 to data driver circuitry 1154. The output signal 1152 therefore constitutes multiplexed I-channel data and Q-channel data. The data driver circuitry 1154 supplies the differential data signal comprising ION and IOP to the receiver digital circuitry 905, using the configurable interface signal line 960 and 965, respectively.

The clock signal 1132A also acts as the select signal of multiplexer circuitry 1150. On alternating edges of the clock signal 1132A, the multiplexer circuitry 1150 selects, and provides to, the data driver circuitry 1154 the one-bit differential in-phase digital signal 1146A (i.e., I-channel data) and the one-bit differential quadrature digital signal 1146B (i.e., Q-channel data). The interface controller circuitry 1140 supplies an enable signal 1156 to the data driver circuitry 1154 that controls the provision of the configurable interface signal 960 and the configurable interface signal 965 to the receiver digital circuitry 905 via the configurable interface signal lines 960 and 965.

The receiver digital circuitry 905 includes data receiver circuitry 1120. Data receiver circuitry 1120 accepts from the receiver analog circuitry 910 the signals provided via the configurable interface signal line 960 and 965. The data receiver circuitry 1120 provides a pair of outputs 1122A and 1122B. An enable signal 1124, supplied by the interface controller circuitry 1116, controls the operation of the data receiver circuitry 1120.

The receiver digital circuitry 905 also includes a delay-cell circuitry 1119 that accepts as its inputs the clock signal 1112A and the complement clock signal 1112B. The delay-cell circuitry 1119 constitutes a delay-compensation circuit. In other words, ideally, the signal-propagation delay of the delay-cell circuitry 1119 compensates for the delays the signals experience as they propagate from the receiver digital circuitry 905 to the receiver analog circuitry 910, and back to the receiver digital circuitry 905.

The delay-cell circuitry 1119 provides as its outputs a clock signal 1121A and a complement clock signal 1121B. The clock signal 1121A and the complement clock signal 1121B clock a pair of D flip-flop circuitries 1123A and 1123B, respectively. The D flip-flop circuitries 1123A and 1123B latch the output 1122A of the data receiver circuitry 1120 alternately. In other words, the clock signal 1121 A causes the latching of the I-channel data by the D flip-flop circuitry 1123A, whereas the complement clock signal 1121B causes the D flip-flop circuitry 1123B to latch the Q-channel data.

The output signals of the delay-cell circuitry 1119 help the receiver digital circuitry 905 to sample the I-channel data and the Q-channel data that it receives from the receiver analog circuitry 910. The receiver digital circuitry 905 receives multiplexed I-channel data and the Q-channel data through the ION signal 960 and the IOP signal 965. Thus, the D flip-flop circuitries 1123A and 1123B perform a de-multiplexing function on the multiplexed I-channel data and Q-channel data.

In the normal receive or transmit modes, (i.e., the control signal 915 is in the logic-high state), interface signal line 950 provides the negative clock signal (CKN) and interface signal line 955 supplies the positive clock signal (CKP). In preferred embodiments of the invention, the CKN and CKP signals together form a differential clock signal that the receiver digital circuitry 905 provides to the receiver analog circuitry 910.

During the receive mode, interface signal line 960 provides the negative data signal (ION), whereas interface signal line 965 supplies the positive data signal (IOP). The ION and IOP signals preferably form a differential data signal.

In the transmit mode, the data signal may function as an input/output signal to communicate data, status, information, flag, and/or configuration signals between the receiver digital circuitry 905 and the receiver analog circuitry 910. Preferably, the interface signal lines 960 and 965 function as two logic signal lines in the transmit mode. As noted above, the transceiver disables the receiver circuitry during the transmit mode of operation. In RF transceivers partitioned according to the invention (see, e.g., FIGS. 2A–2D, 4, and 8), the clock receiver circuitry 1130 may provide the clock signal 1132A, the complement clock signal 1132B, or both, to transmitter circuitry (partitioned together with the receiver analog circuitry 910) for circuit calibration, circuit adjustment, and the like, as described above.

In the transmit mode, once circuit calibration and adjustment has concluded, however, the clock driver circuitry 1114 uses the enable signal 1118 to inhibit the propagation of the CKN and CKP clock signals to the receiver analog circuitry 910. In this manner, the clock driver circuitry 1114 performs the function of the switch 492 in FIGS. 4 and 8. Note that, during the normal transmit mode of operation, the ADC circuitry 1144 does not provide any data to the receiver digital circuitry 905 via the ION and IOP signals because, according to the TDD protocol, the receiver path circuitry is inactive during the normal transmit mode of operation. Instead, the receiver digital circuitry 905 provides control signals to the receiver analog circuitry 910 via interface signal line 960 and 965.

During the transmit mode, the interface controller circuitry 1116 provides control signals via signal lines 1160 to the interface signal line 960 and 965. The interface controller circuitry 1140 receives the control signals via signal lines 1165 and provides them to various blocks within the receiver analog circuitry, as desired. During the receive mode, the interface controller circuitry 1116 inhibits (e.g., high-impedance state) the signal lines 1160. Similarly, the interface controller circuitry 1140 inhibits the signal lines 1165 during the receive mode.

For the purpose of conceptual illustration, FIG. 11A shows the interface controller circuitry 1116 and the interface controller circuitry 1140 as two blocks of circuitry distinct from the interface controller circuitry 1010 and the interface controller circuitry 1040 in FIG. 10, respectively. One may combine the functionality of the interface controller circuitry 1116 with the functionality of the interface controller circuitry 1010, as desired. Likewise, one may combine the functionality of interface controller circuitry 1140 with the functionality of the interface controller circuitry 1040, as desired. Moreover, one may combine the functionality of the signal processing circuitries 1110 with the functionality of the interface controller circuitry 1116 and the interface controller circuitry 1140, respectively. Combining the functionality of those circuits depends on various design and implementation choices, as persons skilled in the art understand.

Figure 11B:
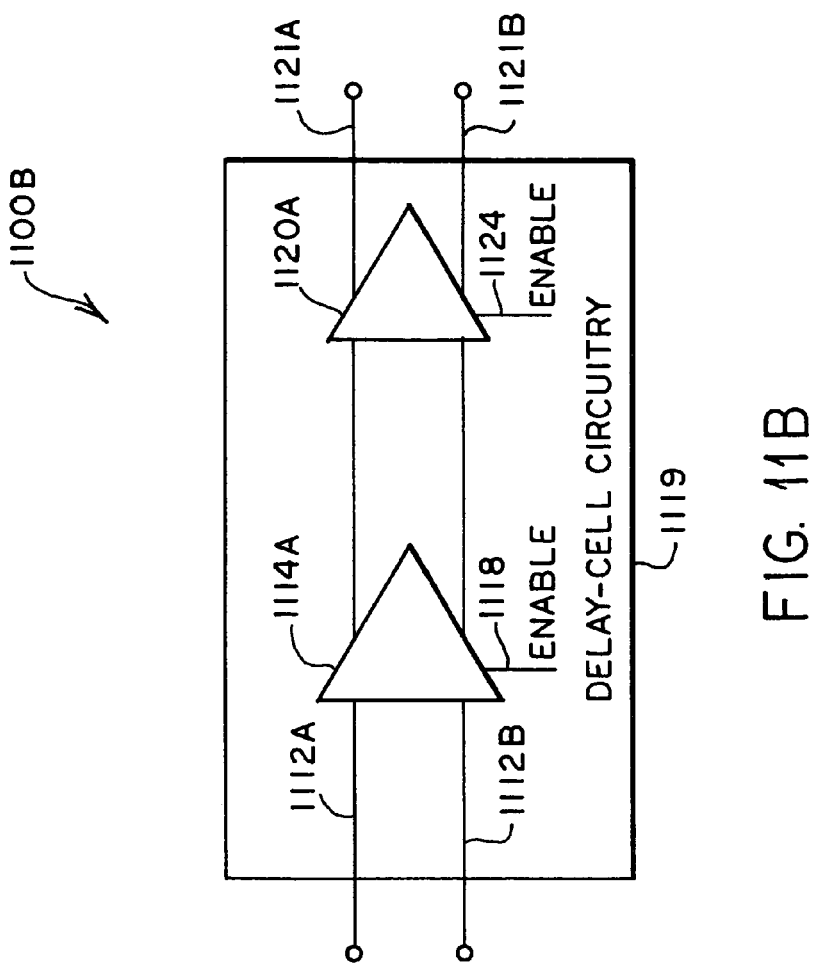
FIG. 11B illustrates a block diagram of an embodiment of a delay-cell circuitry that includes a clock driver circuitry in tandem with a clock receiver circuitry.

FIG. 11B illustrates a block diagram of a preferred embodiment 1100B of a delay-cell circuitry 1119 according to the invention. The delay-cell circuitry 1119 includes a replica of the clock driver circuitry 1114A in tandem with a replica of the data receiver circuitry 1120A. In other words, the block labeled "1114A" is a replica of the clock driver circuitry 1114, and the block labeled "1120A" is a replica of the data receiver circuitry 1120. (Note that the delay-cell circuitry 1119 may alternatively include a replica of the data driver circuitry 1154 in tandem with a replica of the clock receiver circuitry 1130.) The replica of the clock driver circuitry 1114A accepts the clock signal 1112A and the complement clock signal 1112B. The replica of the clock driver circuitry 1114A provides its outputs to the replica of the data receiver circuitry 1120A. The replica of the data receiver circuitry 1120A supplies the clock signal 1121A and the complement clock signal 1121B. The clock signal 1121A and the complement clock signal 1121B constitute the output signals of the delay-cell circuitry 1119. The delay-cell circuitry 1119 also receives as inputs enable signals 1118 and 1124 (note that FIG. 1A does not show those input signals for the sake of clarity). The enable signal 1118 couples to the replica of the clock driver circuitry 1114A, whereas the enable signal 1124 couples to the replica of the data receiver circuitry 1120A.

Note that FIG. 11B constitutes a conceptual block diagram of the delay-cell circuitry 1119. Rather than using distinct blocks 1114A and 1120A, one may alternatively use a single block that combines the functionality of those two blocks, as desired. Moreover, one may use a circuit that provides an adjustable, rather than fixed, delay, as desired. Note also that the embodiment 1100B of the delay-cell circuitry 1119 preferably compensates for the delay in the clock driver circuitry 1114 in FIG. 11A. In other words, the delay-cell circuitry 1119 preferably compensates sufficiently for the round-trip delay in the signals that travel from the receiver digital circuitry 905 to the receiver analog circuitry 910 and back to the receiver digital circuitry 905 to allow for accurate sampling in the receiver digital circuitry of the I-channel data and the Q-channel data. Note that in the embodiment 1100B, the replica of the clock driver circuitry 1114A mainly compensates for the round-trip delay, whereas the replica of the data receiver circuitry 1120A converts low-swing signals at the output of the replica of the clock driver circuitry 1114A into full-swing signals.

The receiver digital circuitry 905 and the receiver analog circuitry 910 preferably reside within separate integrated-circuit devices. Because those integrated-circuit devices typically result from separate semiconductor fabrication processes and manufacturing lines, their process parameters may not match closely. As a result, the preferred embodiment 1100B of the delay-cell circuitry 1119 does not compensate for the delay in the clock receiver circuitry 1130, the data driver circuitry 1154, and the data receiver circuitry 1120 in FIG. 11A.

Note, however, that if desired, the delay-cell circuitry 11119 may also compensate for the signal delays of the clock receiver circuitry 1130, the data driver circuitry 1154, and the data receiver circuitry 1120. Thus, in situations where one may match the process parameters of the receiver digital circuitry 905 and the receiver analog circuitry 910 relatively closely (for example, by using thick-film modules, silicon-on-insulator, etc.), the delay-cell circuitry 1119 may also compensate for the delays of other circuit blocks. As another alternative, one may use a delay-cell circuitry 1119 that provides an adjustable delay and then program the delay based on the delays in the receiver digital circuitry 905 and the receiver analog circuitry 910 (e.g., provide a matched set of receiver digital circuitry 905 and receiver analog circuitry 910), as persons skilled in the art who have the benefit of the description of the invention understand. Furthermore, rather than an open-loop arrangement, one may use a closed-loop feedback circuit implementation (e.g., by using a phase-locked loop circuitry) to control and compensate for the delay between the receiver analog circuitry 910 and the receiver digital circuitry 905, as desired.

Note that the digital circuit blocks shown in FIGS. 11A and 11B depict mainly the conceptual functions and signal flow. The actual circuit implementation may or may not contain separately identifiable hardware for the various functional blocks. For example, one may combine the functionality of various circuit blocks into one circuit block, as desired.

Figure 12:
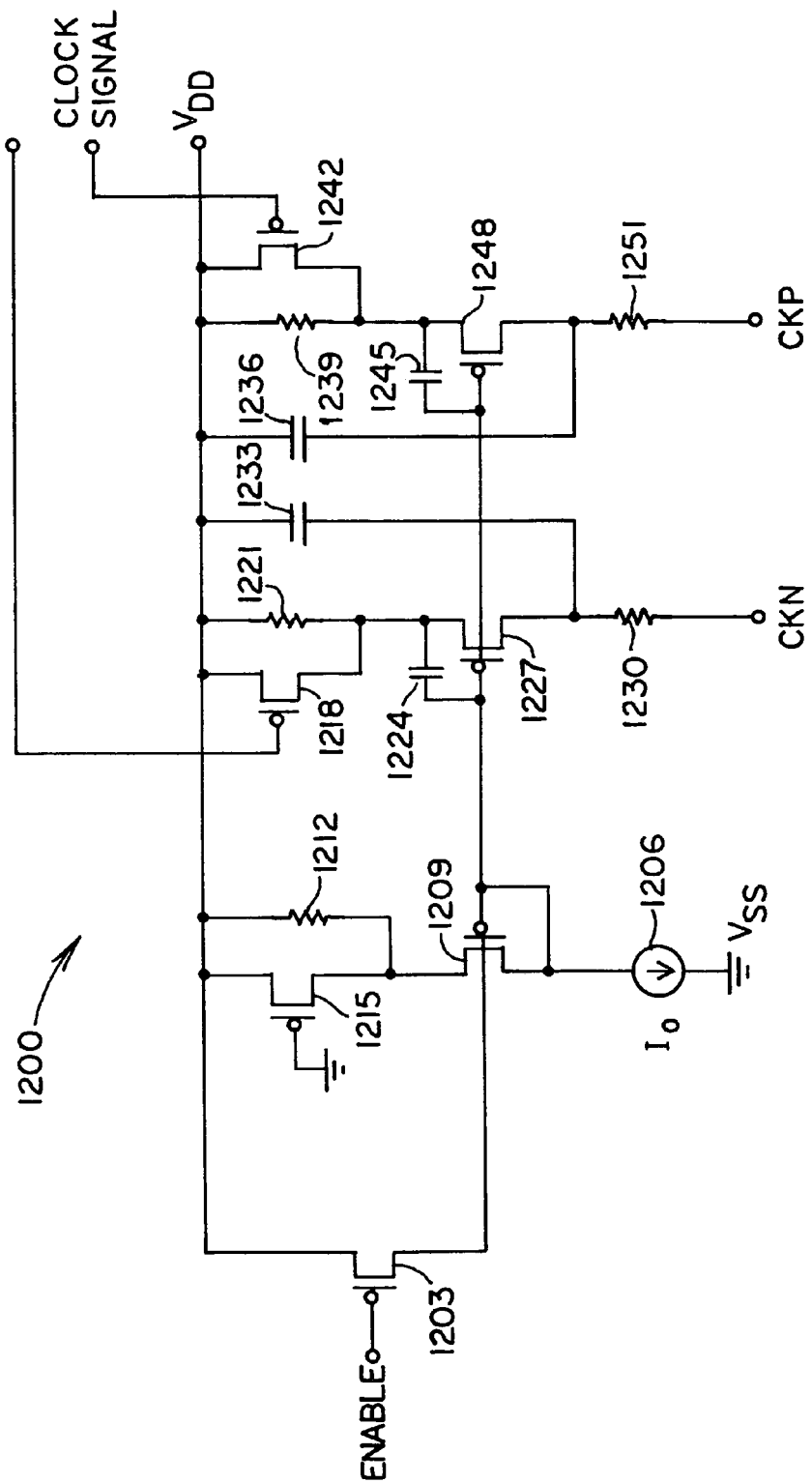
FIG. 12 depicts a schematic diagram of an embodiment of a signal-driver circuitry used to interface the receiver analog circuitry and the receiver digital circuitry according to the invention.

FIG. 12 shows a schematic diagram of a preferred embodiment 1200 of a signal-driver circuitry according to the invention. One may use the signal-driver circuitry as the clock driver circuitry 1114 and the data driver circuitry 1154 in FIG. 11A. In the latter case, the input signals to the signal-driver circuitry constitute the output signals 1152 and the enable signal 1156, whereas the output signals of the signal-receiver circuitry constitute the ION and IOP signals 960 and 965, respectively, in FIG. 11A.

The signal-driver circuitry in FIG. 12 constitutes two circuit legs. One circuit leg includes MOSFET devices 1218 and 1227 and resistor 1230. The second leg includes MOSFET devices 1242 and 1248 and resistor 1251. The input clock signal controls MOSFET devices 1218 and 1242. Current source 1206, MOSFET devices 1209 and 1215, and resistor 1212 provide biasing for the two circuit legs.

MOSFET devices 1227 and 1248 drive the CKN and CKP output terminals through resistors 1230 and 1251, respectively. Depending on the state of the clock signal, one leg of the signal-driver circuitry conducts more current than the other leg. Put another way, the signal-driver circuitry steers current from one leg to the other in response to the clock signal (i.e., in response to the clock signal, one leg of the circuit turns on and the other leg turns off, and vice-versa). As a result, the signal-driver circuitry provides a differential clock signal that includes current signals CKN and CKP.

If the enable signal is high, MOSFET device 1203 is off and therefore does not affect the operation of the rest of the circuit. In that case, a current $I_o$ flows through the current source 1206 and diode-connected MOSFET device 1209. The flow of current generates a voltage at the gate of MOSFET device 1209. MOSFET devices 1227 and 1248 share the same gate connection with MOSFET device 1209. Thus, MOSFET devices 1227 and 1248 have the same gate-source voltage, $V_{gs}$, as MOSFET device 1209 when the appropriate MOSFET devices are in the on state.

MOSFET devices 1218 and 1242 cause current steering between the first and second circuit legs. Only one of the MOSFET devices 1218 and 1242 is in the on state during the operation of the circuit. Depending on which MOSFET device is in the on state, the mirroring current $I_o$ flows through the circuit leg that includes the device in the on state.

Resistors 1221 and 1239 provide a small trickle current to the circuit leg that includes the MOSFET device (i.e., MOSFET device 1218 or MOSFET device 1242) that is in the off state. The small trickle current prevents the diode-connected MOSFET devices in the signal receiver circuitry (see FIG. 13) from turning off completely. The trickle current helps to reduce the delay in changing the state of the circuit in response to transitions in the input clock signal. The trickle currents also help to reduce transient signals at the CKP and CKN terminals and, thus, reduce interference effects.

Capacitors 1224 and 1245 provide filtering so that when MOSFET device 1218 and MOSFET device 1242 switch states, the currents through the first and second circuit legs (CKN and CKP circuit legs) do not change rapidly. Thus, capacitors 1224 and 1245 reduce the high-frequency content in the currents flowing through the circuit legs into the CKN and CKP terminals. The reduced high-frequency (i.e., band-limited) content of the currents flowing through the CKN and CKP terminals helps reduce interference effects to other parts of the circuit, for example, the LNA circuitries, as described above. Capacitors 1233 and 1236 and resistors 1230 and 1251 help to further reduce the high-frequency content of the currents flowing through the CKN and CKP terminals. Thus, the circuit in FIG. 12 provides smooth steering of current between the two circuit legs and therefore reduces interference effects with other circuitry.

When the enable signal goes to the low state, MOSFET device 1203 turns on and causes MOSFET device 1209 to turn off. MOSFET devices 1227 and 1248 also turn off, and the circuit becomes disabled. Note that the enable signal may be derived from the power-down PDNB signal.

Figure 13A:
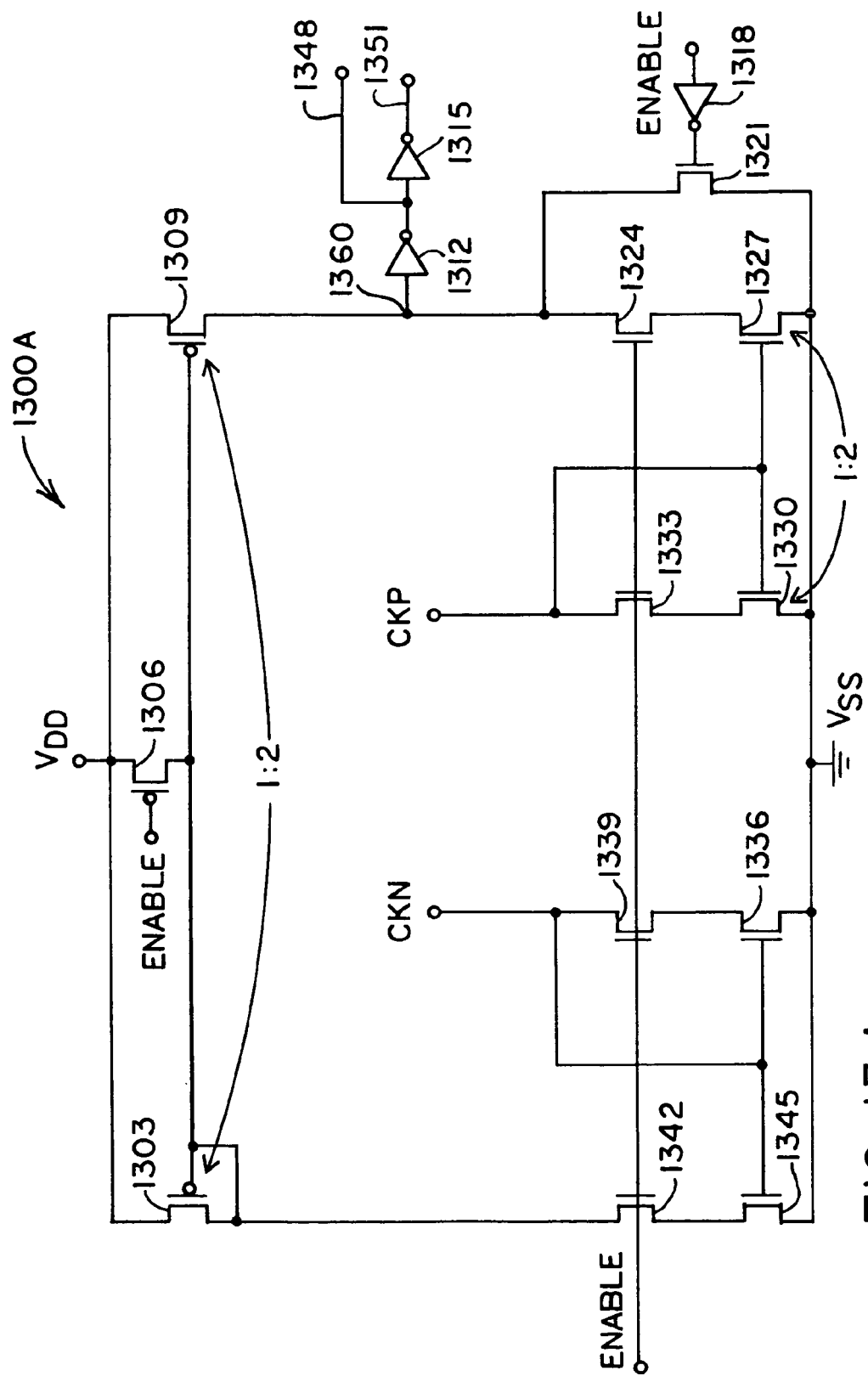
FIGS. 13A and 13B illustrate schematic diagrams of embodiments of signal-receiver circuitries used to interface the receiver analog circuitry and the receiver digital circuitry according to the invention.

FIG. 13A shows a schematic diagram of an exemplary embodiment 1300A of a signal-receiver circuitry according to the invention. One may use the signal-receiver circuitry as the clock receiver circuitry 1130 and the data receiver circuitry 1120 in FIG. 11A. In the latter case, the input signals to the signal-receiver circuitry constitute the ION and IOP signals 960 and 965 and the enable signal 1124, whereas the output signals constitute the signals at the outputs 1122A and 1122B, respectively, in FIG. 11A.

The signal receiver circuitry in FIG. 13A helps to convert differential input currents into CMOS logic signals. The signal-receiver circuitry in FIG. 13A constitutes two circuit legs. The first circuit leg includes MOSFET devices 1303, 1342, and 1345. The second leg includes MOSFET devices 1309, 1324, and 1327. Note that, preferably, the scaling of MOSFET devices 1303 and 1309 provides a current gain of 1:2 between them. Likewise, the scaling of MOSFET devices 1330 and 1327 preferably provides a current gain of 1:2 between them. The current gains help to reduce phase noise in the signal-receiver circuitry.

MOSFET devices 1339, 1342, 1333, and 1324 provide enable capability for the circuit. When the enable input is in the high state, MOSFET devices 1339, 1342, 1333, and 1324 are in the on state. MOSFET devices 1345 and 1336 are current mirrors, as are MOSFET devices 1303 and 1309. MOSFET devices 1330 and 1327 also constitute current mirrors.

The currents flowing through the CKN and CKP terminals mirror to the MOSFET devices 1327 and 1309. The actual current flowing through the second circuit leg depends on the currents that MOSFET device 1327 and MOSFET device 1309 try to conduct; the lower of the two currents determines the actual current that flows through the second circuit leg.

The difference between the currents that MOSFET device 1327 and MOSFET device 1309 try to conduct flows through the parasitic capacitance at node 1360. The current flow charges or discharges the capacitance at node 1360, thus making smaller the drain-source voltage ($V_{ds}$) of whichever of MOSFET devices 1327 and 1309 that seeks to carry the higher current. Ultimately, the lower of the currents that MOSFET devices 1327 and 1309 seek to conduct determines the current through the second leg of the circuit.

A pair of inverters 1312 and 1315 provide true and complement output signals 1351 and 1348, respectively. The signal receiver circuitry therefore converts differential input currents into CMOS logic output signals.

Figure 13B:
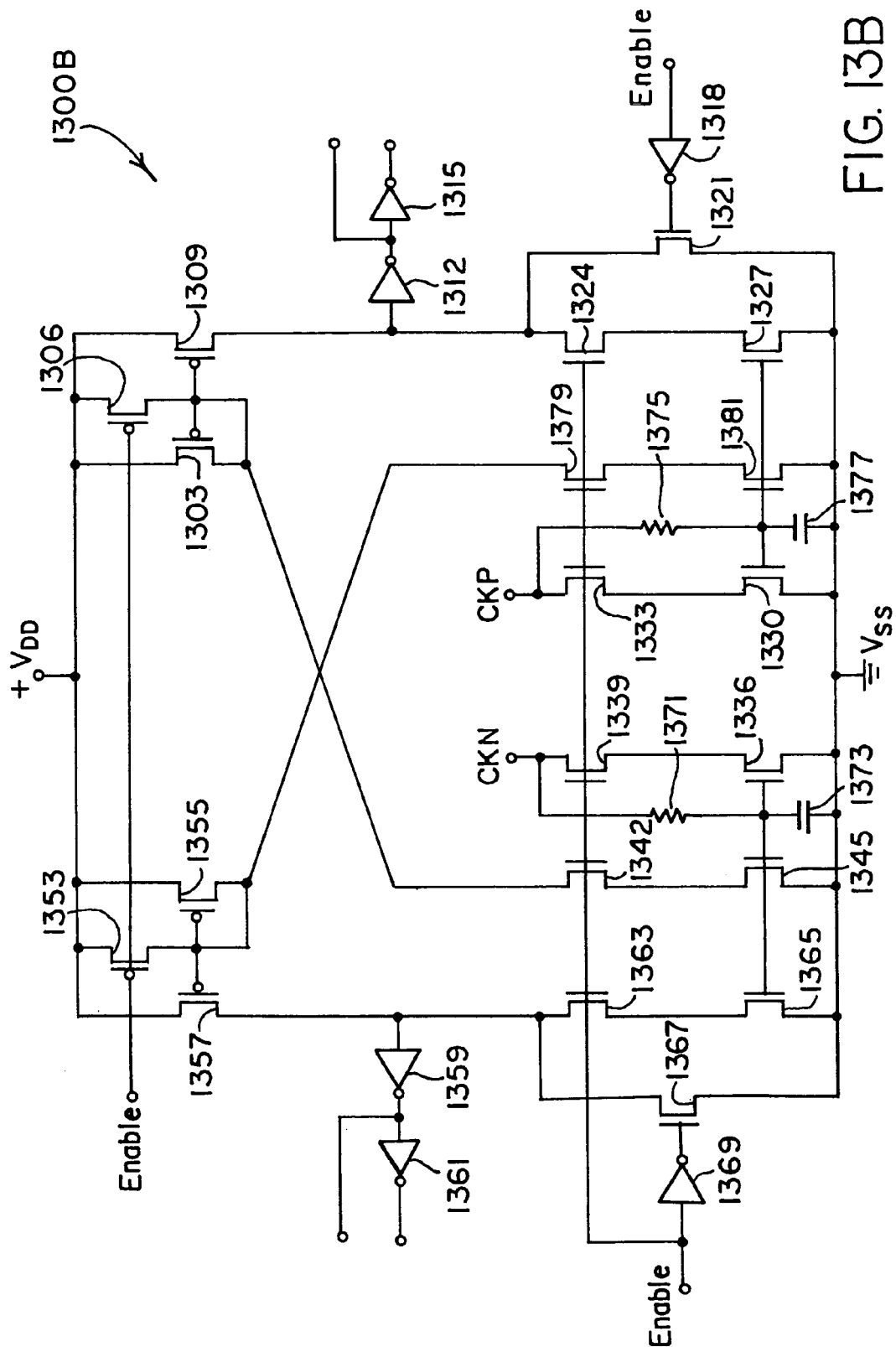

In exemplary embodiments of the invention, the signal receiver circuitry provides fully differential output signals. FIG. 13B shows an embodiment 1300B of such a signal receiver circuitry. One may use embodiment 1300B in a similar manner and application as embodiment 1300A, using the same input signals, as desired. Unlike embodiment 1300A, however, embodiment 1300B includes fully differential circuitry to generate fully differential output signals.

Embodiment 1300B includes the same devices as does embodiment 1300A, and the common devices operate in a similar manner. Furthermore, embodiment 1300B includes additional devices and components. Embodiment 1300B constitutes two circuit legs and replica of those circuit legs. The first circuit leg includes MOSFET devices 1303, 1342, and 1345. The replica of the first circuit leg includes devices 1355, 1379, and 1381. The second circuit leg includes MOSFET devices 1309, 1324, and 1327. The replica of the second circuit leg include devices 1357, 1363, and 1365. The scaling of MOSFET devices 1303 and 1309 provides a current gain of 1:2 between them, as does the scaling of MOSFET devices 1330 and 1327. Likewise, scaling of MOSFET devices 1355 and 1357 provides a current gain of 1:2 between them, as does the scaling of MOSFET devices 1336 and 1365. The current gains help to reduce phase noise in the signal-receiver circuitry.

Embodiment 1300B generally operates similarly to embodiment 1300A. Devices 1381, 1379, 1355, 1353, 1357, 1363, 1365, 1367, 1369, 1359, and 1361 perform the same functions as do devices 1345, 1342, 1303, 1306, 1309, 1324, 1327, 1321, 1318, 1312, and 1315, respectively. The enable function also operates similarly to embodiment 1300A. Resistors 1371 and 1375 and capacitors 1373 and 1377 filter the input clock (e.g., 13 MHz clock). Inverters 1312, 1315, 1361, and 1359 provide fully differential true and complement output signals.

Figure 14:
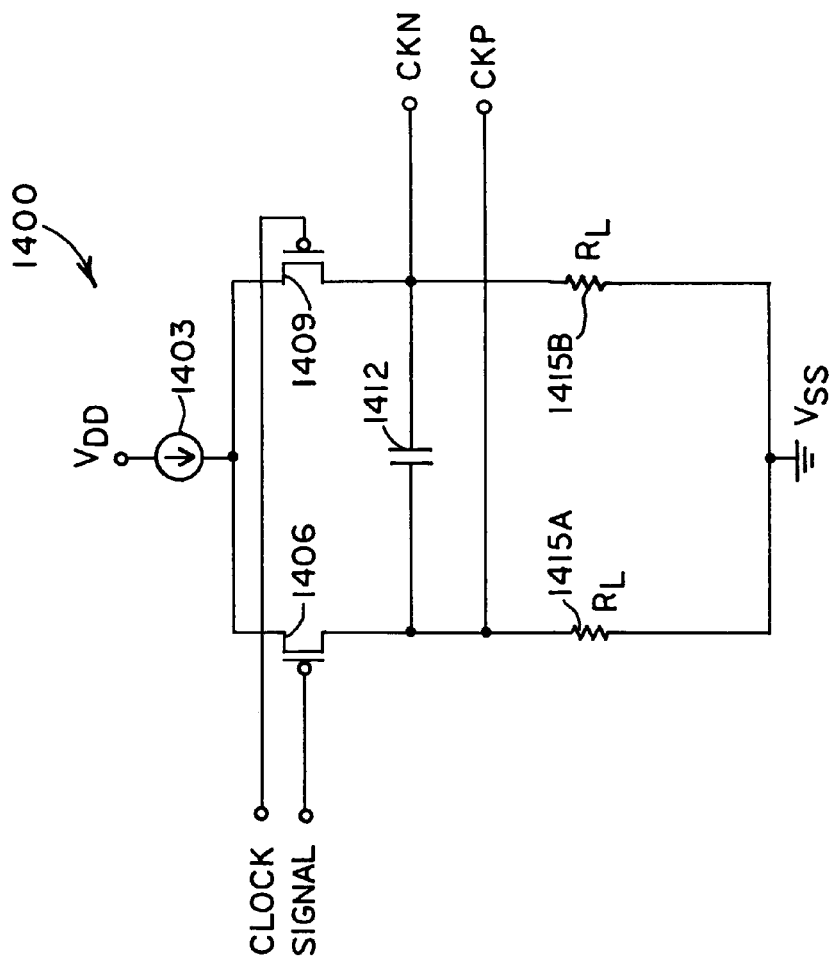
FIG. 14 shows a schematic diagram of another signal-driver circuitry that one may use to interface the receiver analog circuitry and the receiver digital circuitry according to the invention.

FIG. 14 shows an embodiment 1400 of an alternative signal-driver circuitry according to the invention. The signal-driver circuitry in FIG. 14 includes two circuit legs. The first circuit leg includes MOSFET device 1406 and resistor 1415A. The second circuit leg includes MOSFET device 1409 and resistor 1415B. A current source 1403 supplies current to the two circuit legs.

The input clock signal controls MOSFET devices 1406 and 1409. MOSFET devices 1406 and 1409 drive the CKP and CKN output terminals, respectively. Depending on the state of the clock signal, one leg of the signal-driver circuitry conducts current. Put another way, the signal-driver circuitry steers current from one leg to the other in response to the clock signal. As a result, the signal-driver circuitry provides a differential clock signal that includes signals CKN and CKP. Capacitor 1412 filters the output signals CKN and CKP. Put another way, capacitor 1412 provides band-limiting of the output signals CKN and CKP. Note that the current source 1403 supplies limited-amplitude signals by providing current through resistors 1415A and 1415B.

Note that the signal-driver circuitries (clock driver and data driver circuitries) according to the invention preferably provide current signals CKN and CKP. Similarly, signal-receiver circuitries (clock receiver and data receiver circuitries) according to the invention preferably receive current signals. As an alternative, one may use signal-driver circuitries that provide as their outputs voltage signals, as desired. One may also implement signal-receiver circuitries that receive voltage signals, rather than current signals. As noted above, depending on the application, one may limit the frequency contents of those voltage signals, for example, by filtering, as desired.

Generally, several techniques exist for limiting noise, for example, digital switching-noise, in the interface between the receiver analog circuitry and the receiver digital circuitry according to the invention. Those techniques include using differential signals, using band-limited signals, and using amplitude-limited signals. RF apparatus according to the invention may use any or all of those techniques, as desired. Furthermore, one may apply any or all of those techniques to interface circuitry that employs voltage or current signals, as persons of ordinary skill in the art who have the benefit of the description of the invention understand.

Note also that the RF transceiver embodiments according to the invention lend themselves to various choices of circuit implementation, as a person skilled in the art who have the benefit of the description of the invention understand. For example, as noted above, each of the circuit partitions, or circuit blocks, of RF transceivers partitioned according to the invention, resides preferably within an integrated circuit device. Persons skilled in the art, however, will appreciate that the circuit partitions, or circuit blocks, may alternatively reside within other substrates, carriers, or packaging arrangements. By way of illustration, other partitioning arrangements may use modules, thin-film modules, thick-film modules, isolated partitions on a single substrate, circuit-board partitions, and the like, as desired, consistent with the embodiments of the invention described here.

One aspect of the invention contemplates partitioning RF transceivers designed to operate within several communication channels (e.g., GSM, PCS, and DCS). Persons skilled in the art, however, will recognize that one may partition according to the invention RF transceivers designed to operate within one or more other channels, frequencies, or frequency bands, as desired.

Moreover, the partitioning of RF transceivers according to the invention preferably applies to RF apparatus (e.g., receivers or transceivers) with a low-IF, digital-IF architecture. Note, however, that one may apply the partitioning and interfacing concepts according to the invention to other RF receiver or transceiver architectures and configurations, as persons of ordinary skill in the art who have the benefit of the description of the invention understand. By way of illustration, one may use the partitioning and interface concepts according to the invention in RF apparatus that includes:

low-IF receiver circuitry;
low-IF receiver circuitry and offset-PLL transmitter circuitry;
low-IF receiver circuitry and direct up-conversion transmitter circuitry;
direct-conversion receiver circuitry;
direct-conversion receiver circuitry and offset-PLL transmitter circuitry; or
direct-conversion receiver circuitry and direct up-conversion transmitter circuitry.

As an example of the flexibility of the partitioning concepts according to the invention, one may include the LO circuitry in one partition, the receiver digital circuitry in a second partition, and the transmitter up-converter circuitry and the receiver analog circuitry in a third partition. As another illustrative alternative, one may include the LO circuitry and the transmitter up-converter circuitry within one circuit partition, depending on the noise and interference characteristics and specifications for a particular implementation.

Note that, in a typical direct-conversion RF receiver or transceiver implementation, the receiver digital circuitry would not include the digital down-converter circuitry (the receiver analog circuitry, however, would be similar to the embodiments described above). Furthermore, in a typical direct up-conversion transmitter circuitry, one would remove the offset PLL circuitry and the transmit VCO circuitry from the transmitter circuitry. The LO circuitry would supply the RF LO signal to the up-conversion circuitry of the transmitter circuitry, rather than the offset-PLL circuitry. Also, in a direct up-conversion implementation, the LO circuitry typically does not provide an IF LO signal.

Furthermore, as noted above, one may use the partitioning and interface concepts according to the invention not only in RF transceivers, but also in RF receivers for high-performance applications. In such RF receivers, one may partition the receiver as shown in FIGS. 2A–2D and 4–8, and as described above. In other words, the RF receiver may have a first circuit partition that includes the receiver analog circuitry, and a second circuit partition that includes the receiver digital circuitry.

The RF receiver may also use the digital interface between the receiver analog circuitry and the receiver digital circuitry, as desired. By virtue of using the receiver analog circuitry and the receiver digital circuitry described above, the RF receiver features a low-IF, digital-IF architecture. In addition, as noted above with respect to RF transceivers according to the invention, depending on performance specifications and design goals, one may include all or part of the local oscillator circuitry within the circuit partition that includes the receiver analog circuitry, as desired. Partitioning RF receivers according to the invention tends to reduce the interference effects between the circuit partitions.

As noted above, although RF apparatus according to the invention use a serial interface between the receiver analog circuitry and the receiver digital circuitry, one may use other types of interface, for example, parallel interfaces, that incorporate different numbers of signal lines, different types and sizes of signals, or both, as desired. Moreover, the clock driver circuitries and the data driver circuitries may generally constitute signal-driver circuitries that one may use in a variety of digital interfaces between the receiver analog circuitry and the receiver digital circuitry according to the invention.

Likewise, the clock receiver circuitries and data receiver circuitries may generally constitute signal-receiver circuitries that one may use in a variety of digital interfaces between the receiver analog circuitry and the receiver digital circuitry according to the invention. In other words, one may use signal-driver circuitries and signal-receiver circuitries to implement a wide variety of digital interfaces, as persons of ordinary skill who have the benefit of the description of the invention understand.

Another aspect of the invention relates to calibration of signal-processing circuitry. Typically, analog signal-processing circuitry, such as ADC circuitry 418 described above, includes elements or components whose characteristics or attributes changes in response to fluctuations in physical and environmental parameters (e.g., fabrication process variations, temperature). The change in the characteristics or attributes of the components result in variations in the characteristics, such as transfer function, stability, and the like, of the analog signal-processing circuitry and of the system that includes the analog signal-processing circuitry. The inventive concepts described here contemplate apparatus and methods for calibrating the signal-processing circuitry so as to reduce the effect of the change in the characteristics of the analog signal-processing circuitry as a result of physical and environmental changes.

Some of the components in typical analog signal-processing circuitry whose characteristics normally exhibit sensitivity to physical and environmental changes include resistors and capacitors. ADC circuitry 418 (see, for example, FIGS. 4–8 and corresponding description), includes resistors and capacitors whose values affect various characteristics (e.g., gain, stability) of ADC circuitry 418 and the RF apparatus within which it resides. One aspect of the invention relates to calibrating some of the components within the ADC circuitry 418 so as to reduce any impact on the performance of the ADC circuitry 418 and/or the RF apparatus that includes ADC circuitry 418.

Figure 15:
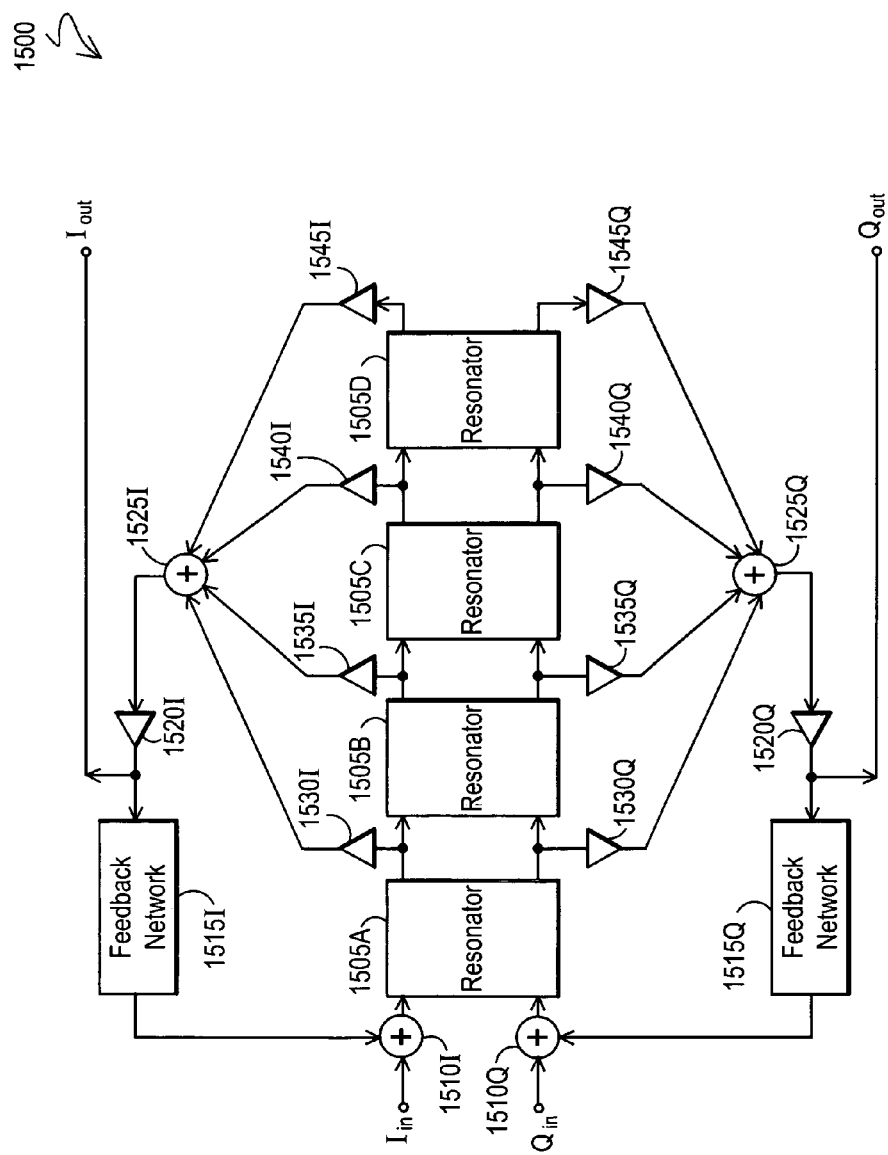
FIG. 15 depicts an exemplary embodiment of a sigma-delta analog-to-digital converter (ADC) circuitry that may use calibration apparatus according to the invention.

As noted above, ADC circuitry in exemplary embodiments of the invention constitutes a sigma-delta ADC circuitry. FIG. 15 shows an exemplary embodiment 1500 of a sigma-delta ADC circuitry 418 for use in RF apparatus according to the invention. Notations "I" and "Q" following numeral designators in FIG. 15 denote, respectively, components, blocks, or elements within the in-phase and quadrature signal paths.

Embodiment 1500 includes a cascade of four resonators 1505A–1505D. Through combiner circuitry 1510I and combiner circuitry 1510Q, resonator 1505A accepts the in-phase input ($I_{in}$) and quadrature input ($Q_{in}$) of ADC circuitry 418, respectively. In other words, the in-phase input ($I_{in}$) drives one input of combiner circuitry 1510I, whereas the quadrature input ($Q_{in}$) drives one input of combiner circuitry 1510Q. An output of combiner circuitry 1510I drives the in-phase input of resonator 1505A. An output of combiner circuitry 1510Q drives the quadrature input of resonator 1505A.

The in-phase signal path in embodiment 1500 includes gain circuitries 1530I, 1535I, 1540I, and 1545I, whose output signals represent, respectively, the in-phase output signals of resonators 1505A–1505D, as modified or amplified by a prescribed or desired gain. Combiner circuitry 1525I sums the output signals of gain circuitries 1530I, 1535I, 1540I, and 1545I. An output signal of combiner circuitry 1525I drives an input of comparator 1520I. Comparator 1520I acts as a one-bit digitizer. An output signal of comparator 1520I represents the in-phase output of embodiment 1500.

Feedback network 1515I receives the output signal of comparator 1520I. An output signal of feedback network 1515I drives a second input of combiner circuitry 1510I. Feedback network 1515I, together with combiner circuitry 1510I, feeds a signal derived from the output signal of the circuit to its input.

The quadrature signal path in embodiment 1500 operates in a similar manner. The quadrature signal path includes gain circuitries 1530Q, 1535Q, 1540Q, and 1545Q, whose output signals represent, respectively, the quadrature output signals of resonators 1505A–1505D, as modified or amplified by a prescribed or desired gain. Combiner circuitry 1525Q sums the output signals of gain circuitries 1530Q, 1535Q, 1540Q, and 1545Q. An output signal of combiner circuitry 1525Q drives an input of comparator 1520Q, which acts as a one-bit digitizer. An output signal of comparator 1520Q represents the quadrature output of embodiment 1500.

Feedback network 1515Q receives the output signal of comparator 1520Q. An output signal of feedback network 1515Q drives a second input of combiner circuitry 1510Q. Feedback network 1515Q, together with combiner circuitry 1510Q, feeds a signal derived from the output signal of the circuit to its input.

Figure 16:
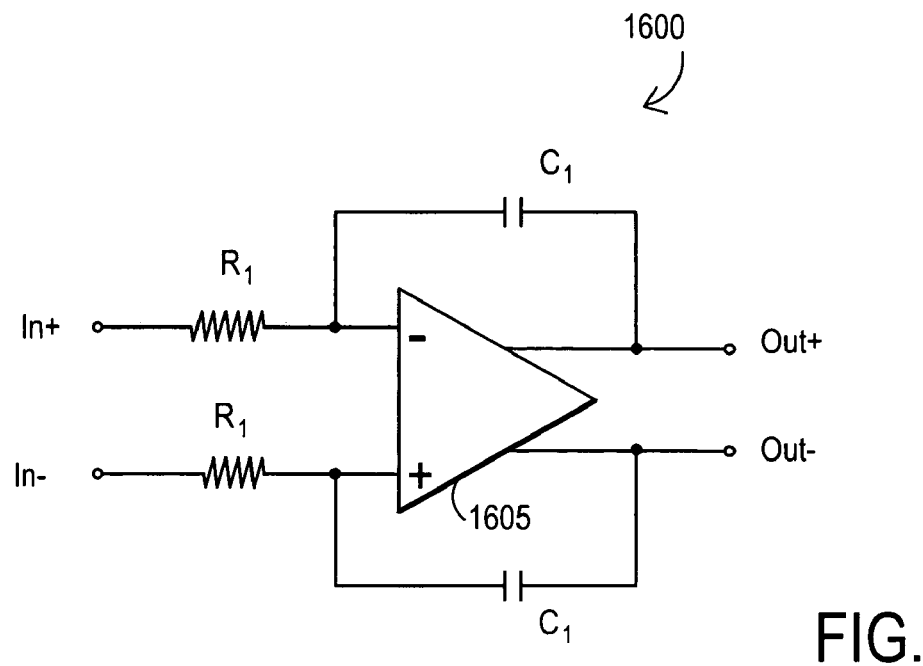
FIG. 16 illustrates an exemplary embodiment according to the invention of a differential integrator for use in the ADC circuitry in FIG. 15.
Figure 17:
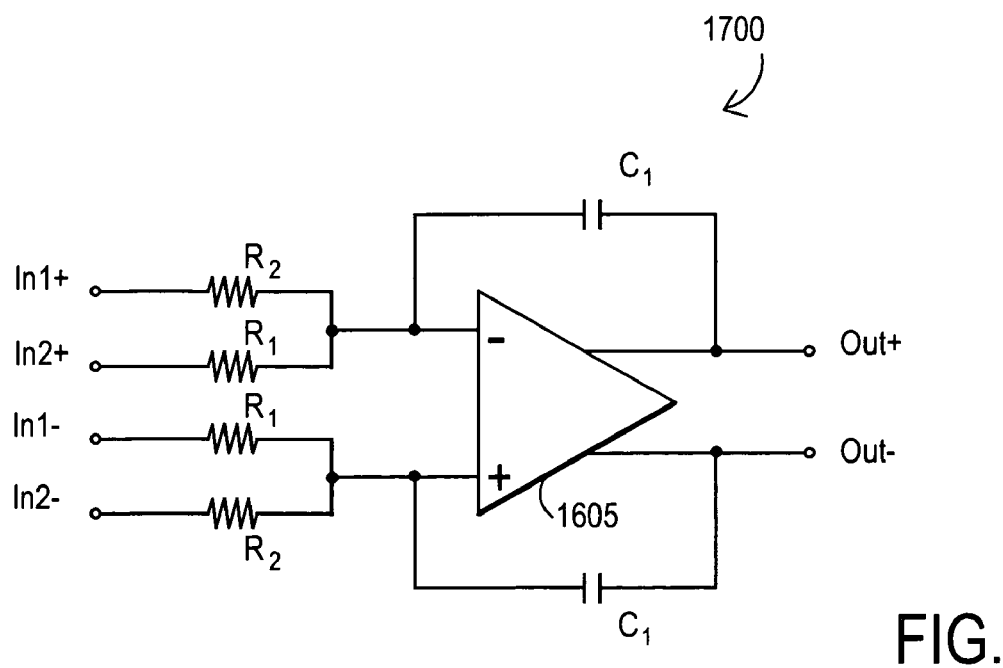
FIG. 17 shows an exemplary embodiment according to the invention of a signal processing circuit arrangement for use in the ADC circuitry in FIG. 15.
Figure 18:
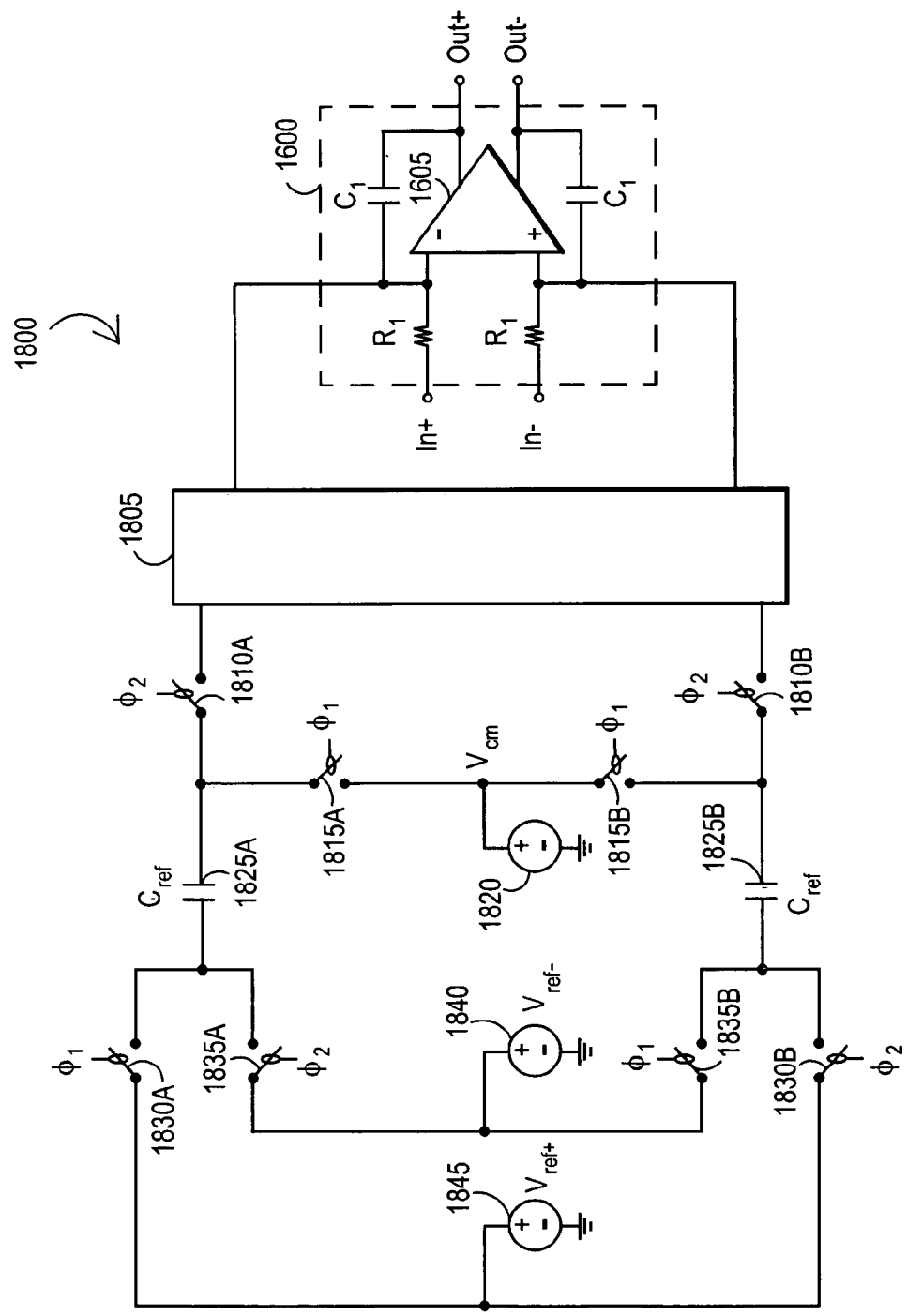
FIG. 18 depicts an exemplary embodiment according to the invention of a circuit arrangement of portions of the ADC circuitry in FIG. 15.

Various blocks within embodiment 1500 include elements or components whose characteristics would impact the overall performance of embodiment 1500 in the absence of calibration according to the invention. FIGS. 16–18 show some of those blocks and the respective elements or components.

Resonators 1505A–1505D in FIG. 15 include integrators implemented with operational amplifiers. FIG. 16 illustrates an exemplary embodiment 1600 according to the invention of a differential integrator for use in ADC circuitry 418. Input signals (In+ and In−) drive the respective positive and negative inputs of operational amplifier 1605 through a pair of resistors $R_1$. A pair of capacitors $C_1$ couple the positive and negative outputs (Out+ and Out−) of operational amplifier 1605 to its positive and negative inputs, respectively.

The integrator in embodiment 1600 has the following transfer function, H(s):

$$H(s) = \frac{1}{s \cdot R_1 \cdot C_1}.$$

Note that the values of resistors ($R_1$) and capacitors ($C_1$) affect the transfer function of the integrator in embodiment 1600. Put another way, the transfer function of the integrator in embodiment 1600 depends on the product $R_1.C_1$.

FIG. 17 depicts an exemplary embodiment 1700 according to the invention of a signal processing circuit arrangement for use in ADC circuitry 418. More specifically, embodiment 1700 constitutes a portion of the circuitry used in each of resonators 1505A–1505D.

Embodiment 1700 includes operational amplifier 1605, a pair of resistors $R_1$, a pair of resistors $R_2$, and a pair of capacitors $C_1$. Embodiment 1700 accepts two differential input signals. The first differential input signal includes signals In1+ and In1−, whereas the second differential input signal includes signals In2+ and In2−.

Signals In1+ and In1− drive the respective positive and negative inputs of operational amplifier 1605 through the pair of resistors $R_2$. Similarly, signals In2+ and In2− drive the respective positive and negative inputs of operational amplifier 1605 through a pair of resistors $R_1$. A pair of capacitors $C_1$ couple the positive and negative outputs (Out+ and Out−) of operational amplifier 1605 to its positive and negative inputs, respectively.

Similar to embodiment 1600 discussed above, the transfer function of the circuit arrangement in embodiment 1700 depends on the values of resistors $R_1$, resistors $R_2$, and capacitors $C_1$. Furthermore, in a practical implementation, the values of the resistors and capacitors in embodiment 1600 may vary by as much as ±20% because of semiconductor fabrication process variations. Those variations affect the characteristics and transfer function of the resonators within ADC circuitry 418 and may affect its stability.

FIG. 18 shows an exemplary embodiment 1800 according to the invention of a circuit arrangement of portions of ADC circuitry 418. More specifically, referring to FIGS. 15 and 18, embodiment 1800 illustrates portions of the circuitry within feedback network 15151, combiner circuitry 15101, and resonator 1505A. (Note that, with appropriate signal changes, embodiment 1800 may also apply to portions of the circuitry within feedback network 1515Q, combiner circuitry 1510Q, and resonator 1505A, as persons skilled in the art with the benefit of the description of the invention understand.)

Embodiment 1800 includes an integrator (as implemented in embodiment 1600 in FIG. 16), modulator 1805, voltage source 1845 ($V_{ref+}$), voltage source 1840 ($V_{ref-}$), voltage source 1820 ($V_{cm}$), switches 1810A–1810B, 1815A–1815B, 1830A–1830B, and 1835A–1835B, and capacitors 1825A–1825B ($C_{ref}$). Referring to FIGS. 15 and 18, modulator 1805 resides in feedback network 1515I (not shown explicitly), and modulates the signal provided to combiner circuitry 1510I with the output signal of comparator 1520I.

Non-overlapping clock signals $\Phi_1$ and $\Phi_2$ control switches 1810A–1810B, 1815A–1815B, 1830A–1830B, and 1835A–1835B. Specifically, clock signal $\Phi_1$ controls switches 1815A–1815B, 1830A, and 1835B. Clock signal $\Phi_2$, on the other hand, controls switches 1810A–1810B, 1830B, and 1835A.

One may derive clock signals $\Phi_1$ and $\Phi_2$ from reference signal 220, as persons of ordinary skill in the art who have the benefit of the description of the invention understand. In exemplary embodiments of the invention, clocks signals $\Phi_1$ and $\Phi_2$ have a frequency of 13 MHz, although one may use other frequencies, as desired.

Voltage sources 1840 and 1845 constitute reference voltages, in exemplary embodiments according to the invention, voltage source 1845 has a magnitude of 2.25 volts, whereas voltage source 1840 has a magnitude of zero volts (i.e., one may implement voltage source 1840 by coupling to the ground potential the appropriate terminal of switches 1835–1835B. Voltage source 1820 constitutes a common-mode voltage, and has a magnitude of 1.25 volts. Note, however, that one may use other magnitudes for the voltage sources, as desired. Furthermore, one may use a variety of circuit arrangements and/or implementations for the voltage sources, as desired. For example, one may use voltage references described in U.S. patent application Ser. No. 10/081,121, titled "Calibrated Low-Noise Current and Voltage References and Associated Methods," as desired.

Because of the clocking action within embodiment 1800, capacitors 1825A and 1825B act as resistors. Each of capacitors 1825A and 1825B has an equivalent resistance, $R_{C_{ref}}$:

$$R_{C_{ref}} = \frac{1}{f_s \cdot C_{ref}},$$

Where $f_s$ and $C_{ref}$ represent, respectively, the frequency of the clock signals $\Phi_1$ and $\Phi_2$, and the capacitance of capacitor 1825A or capacitor 1825B.

When clock signal $\Phi_1$ is active, switches 1815A–1815B, 1830A, and 1835B close, but switches 1810A–1810B, 1830B, and 1835A are open. As a result, a voltage equal to ($V_{ref+}-V_{cm}$) charges capacitor 1825A, whereas a voltage equal to ($V_{ref-}-V_{cm}$) charges capacitor 1825B. On the other hand, when clock signal $\Phi_2$ is active, switches 1810A–1810B, 1830B, and 1835A close, but switches 1815A–1815B, 1830A, and 1835B are open. Consequently, capacitors 1825A and 1825B discharge through the circuitry within modulator 1805. In steady-state operation, for a full-scale differential voltage, $V_{in(diff)}|_{full\ scale}$, applied at the inputs, one obtains:

$$V_{in(diff)}|_{full\ scale} = V_{ref(diff)} \cdot R_1 \cdot C_{ref} f_s,$$

Where $V_{ref(diff)}$, $R_1$, and $C_{ref}$ represent, respectively, the differential reference voltage (i.e., $V_{ref+}-V_{ref-}$), the resistance of resistors $R_1$, and the capacitance of capacitor $C_{ref}$.

The frequency of clock signals $\Phi_1$ and $\Phi_2$, that is, $f_s$, is a relatively stable quantity. Thus, one may observe from the above equations that the full-scale input voltage that ADC circuitry 418 processes depends on the product of a capacitance and a resistance (RC product). Any variations in the values of the capacitance and/or resistance values (because of changes in physical or environmental factors or semiconductor fabrication process parameters) change the full-scale input voltage of ADC circuitry 418. Consequently, the characteristics of ADC circuitry 418 and the RF apparatus within which it resides change as well.

Depending on particular performance specifications, an RF apparatus that uses ADC circuitry 418 can tolerate some variation in the component or element values. For example, the RF apparatus according to an exemplary embodiment of the invention shown conceptually in FIG. 8 can tolerate, say, ±2% variations in the RC products described above in connection with FIGS. 16–18. One may compensate for variations in the RC product variations by calibrating the resistance value(s), the capacitance value(s), or both, that form a respective RC product. Exemplary embodiments of calibration circuitry according to the invention change the capacitance values, although one may use other calibration schemes as persons of ordinary skill in the art who have the benefit of the description of the invention understand. For example, one may change the resistance value(s) or both the resistance and capacitance value(s).

Figure 19:
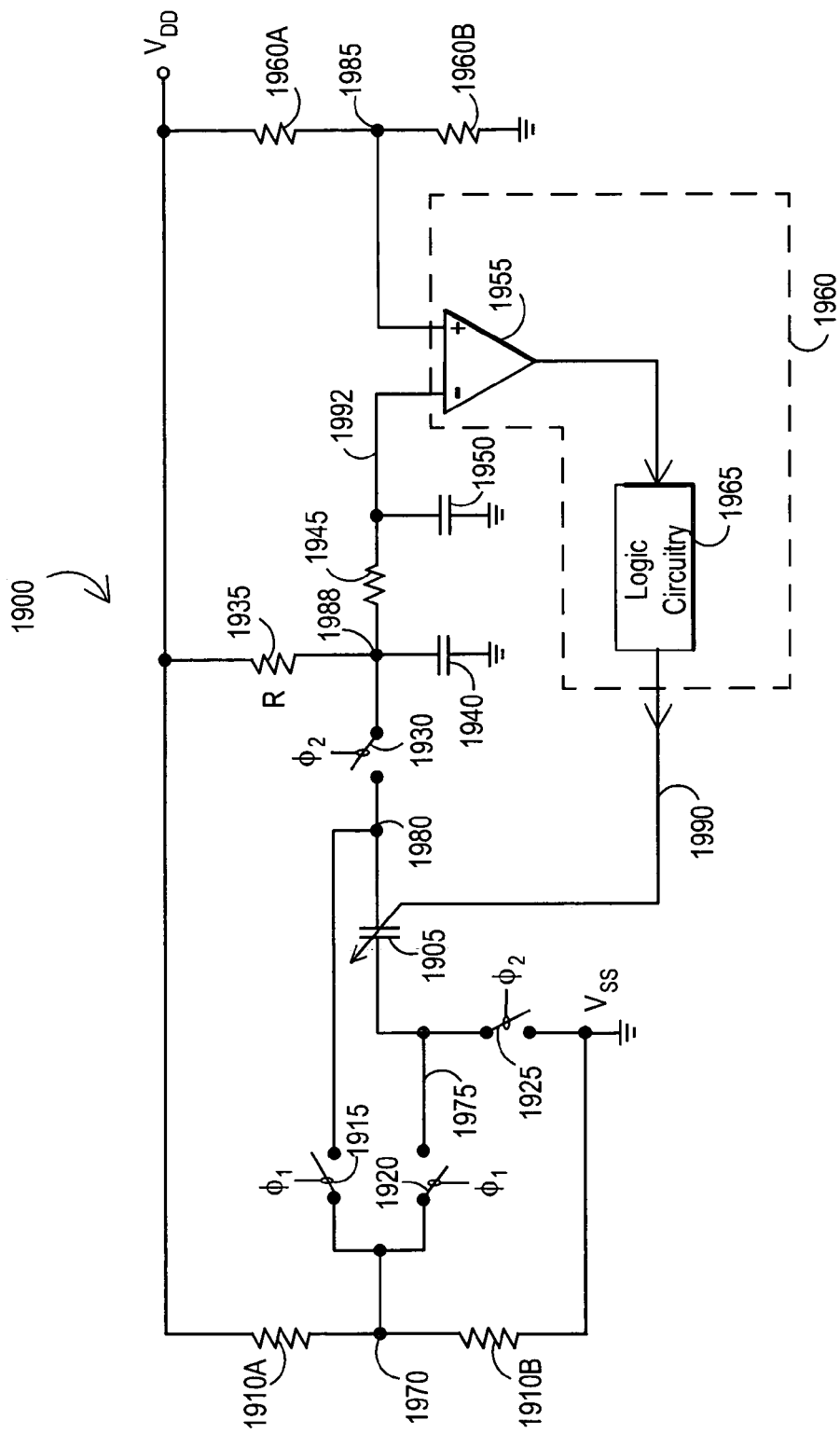
FIG. 19 illustrates an exemplary embodiment of a calibration circuitry according to the invention.

Conceptually, one may calibrate a desired RC product corresponding to the product of a resistance, R, and a capacitance, C, by using a measurement voltage that depends on the resistance, the capacitance, or the RC product, and comparing that voltage to a nominal (or reference) voltage. Depending on the results of the comparison, one may change the resistance, the capacitance, or both, so that the measurement voltage and, hence, the RC product, falls within a desired or prescribed range (say, ±2%) from the nominal RC product. FIG. 19 shows an exemplary embodiment 1900 that implements calibration according to the invention.

Embodiment 1900 includes adjustable capacitor 1905, resistors 1910A–1910B, switches 1915, 1920, 1925, and 1930, resistor 1935, filter capacitors 1940 and 1950, filter resistor 1945, resistors 1960A–1960B, and controller 1960. Controller 1960 includes comparator 1955 and logic circuitry 1965. Resistors 1910A–1910B are equal in magnitude and couple in series between the supply voltage, $V_{DD}$, and the circuit ground, $V_{SS}$. Thus, the voltage at the junction of resistors 1910A–1910B (i.e., node 1970) nominally equals $0.5 \times V_{DD}$. Similarly, Resistors 1960A–1960B are also equal in magnitude and couple in series between the supply voltage, $V_{DD}$, and the circuit ground, $V_{SS}$. Consequently, the voltage at the junction of resistors 1960A–1960B (i.e., node 1985) nominally equals $0.5 \times V_{DD}$. Note that, rather than producing and using $0.5 \times V_{DD}$, one may produce and use other voltage levels, as persons of ordinary skill in the art who have the benefit of the description of the invention understand.

Non-overlapping clock signals $\Phi_1$ and $\Phi_2$ control switches 1915, 1920, 1925, and 1930. Specifically, clock signal $\Phi_1$ controls switches 1915 and 1920, whereas clock signal $\Phi_2$ controls switches 1925 and 1930. In exemplary embodiments of the invention, clock signals $\Phi_1$ and $\Phi_2$ are not the same as the clock signals of ADC circuitry 418 (see above). Note, however, that one may use a variety of other clocking arrangements, as persons skilled in the art with the benefit of the disclosure of the invention understand.

When clock signal $\Phi_1$ is active, switches 1915 and 1920 close, but switches 1925 and 1930 are open. Adjustable capacitor 1905 discharges through switches 1915 and 1920, so that the voltages at both of its terminals are substantially equal to the voltage at node 1970, i.e., $0.5 \times V_{DD}$.

When clock signal $\Phi_2$ is active, switches 1925 and 1930 close, but switches 1915 and 1920 are open. Switch 1925 grounds one terminal of adjustable capacitor 1905 (node 1975) so that it has a voltage nearly equal to the ground potential. A current flows through resistor 1935 and switch 1930 to the other terminal of adjustable capacitor 1905 (node 1980) and charges adjustable capacitor 1905.

Because of the clocking action within the circuit, the adjustable capacitor 1905 behaves similar to a resistor, with a nominal resistance of:

$$R_{eq} = \frac{1}{f_s \cdot C_{adj}},$$

Where $R_{eq}$ and $C_{adj}$ represent the equivalent resistance and the capacitance of capacitor 1905, respectively. Resistor 1935 has a nominal value, R, equal to $R_{eq}$.

Because adjustable capacitor 1905 behaves like a resistor due to the switching action of clock signals $\Phi_1$ and $\Phi_2$, adjustable capacitor 1905 and resistor 1935 form a voltage divider. One may obtain the average voltage at node 1988 as:

$$V = \frac{\frac{V_{DD}}{f_s \cdot C_{adj}}}{\frac{1}{f_s \cdot C_{adj}} + R}, \text{ or } V = \frac{V_{DD}}{1 + f_s \cdot R \cdot C_{adj}}.$$

If resistor 1935 has no variations in its value, R, (because of physical or environmental changes, etc.), then $$R = \frac{1}{f_s \cdot C_{adj}}.$$

Put another way, under that scenario, the product $R \cdot f_s \cdot C_{adj}$ equals unity. Consequently, node 1988 (the junction of resistor 1935 and adjustable capacitor 1905) has a nominal average value of $0.5 \times V_{DD}$.

On average, for nominal values of resistor 1935 and adjustable capacitor 1905, node 1988 has a voltage substantially equal to $0.5 \times V_{DD}$. Because of the switching action of switches 1915, 1920, 1925, and 1930, the voltage at node 1988 has some ripple (deviations or variations around its nominal value). Filter capacitors 1940 and 1950 and filter resistor 1945 form a low-pass filter that filters that ripple. After sufficient settling time of the circuitry, the average voltage at node 1992 substantially equals the average voltage at node 1988.

Controller 1960 uses feedback within embodiment 1900 to cause the average voltage at node 1988 (or node 1992) to substantially equal the voltage at node 1985 ($0.5 \times V_{DD}$). Specifically, comparator 1955 uses the voltage at node 1985 as a reference voltage in a feedback loop to control the capacitance of adjustable capacitor 1905 and, hence, the RC product that includes the capacitance of adjustable capacitor 1905. By comparing the voltage at node 1992 with the voltage at node 1985, comparator 1955 provides its output signal (a one-bit signal) to logic circuitry 1965.

Logic circuitry 1965 derives control signal 1990 from the output signal of comparator 1955. Logic circuitry 1965 supplies control signal 1990 to adjustable capacitor 1905. According to the value or level of control signal 1990, the capacitance of adjustable capacitor 1905 varies such that the average value of the voltage at node 1988 (or node 1992) tends to substantially equal the voltage at node 1985. Control signal 1990 may include one or more individual control signals, as desired, depending on the design of the various blocks of embodiment 1900.

Note that one may use a variety of schemes or techniques to calibrate a signal processing circuitry, as desired. For example, in one embodiment, when the circuit first begins operation, one may determine an appropriate level or value for control signal 1990 (or appropriate levels or values for the bits in control signal 1990) and then freeze or hold that level or value. Thus, one may calibrate control signal 1990 at or near circuit power-up and then use the resulting control signal during operation of embodiment 1900. In other words, one obtains a level or value of control signal 1990 during calibration of the circuit and then uses that level or value during operation of the circuitry that includes embodiment 1900 (e.g., ADC circuitry 418 and the RF apparatus that includes ADC circuitry 418).

In other embodiments according to the invention, one may perform calibration on an on-going basis. If the period of operation of the circuitry that includes embodiment 1900 is long enough that various circuit characteristics, such as RC products, experience drift, one may repeat the calibration as desired to acquire new levels or values for control signal 1990 on an on-going basis. As one example, in an application that uses the circuitry that contains embodiment 1900 (for example, in ADC circuitry 418) intermittently, such as in a burst mode system, one may perform calibration when the circuit powers up (for instance, at the beginning of a burst). Thus, one may perform RC product calibration on a burst-by-burst basis, as desired.

Figure 20:
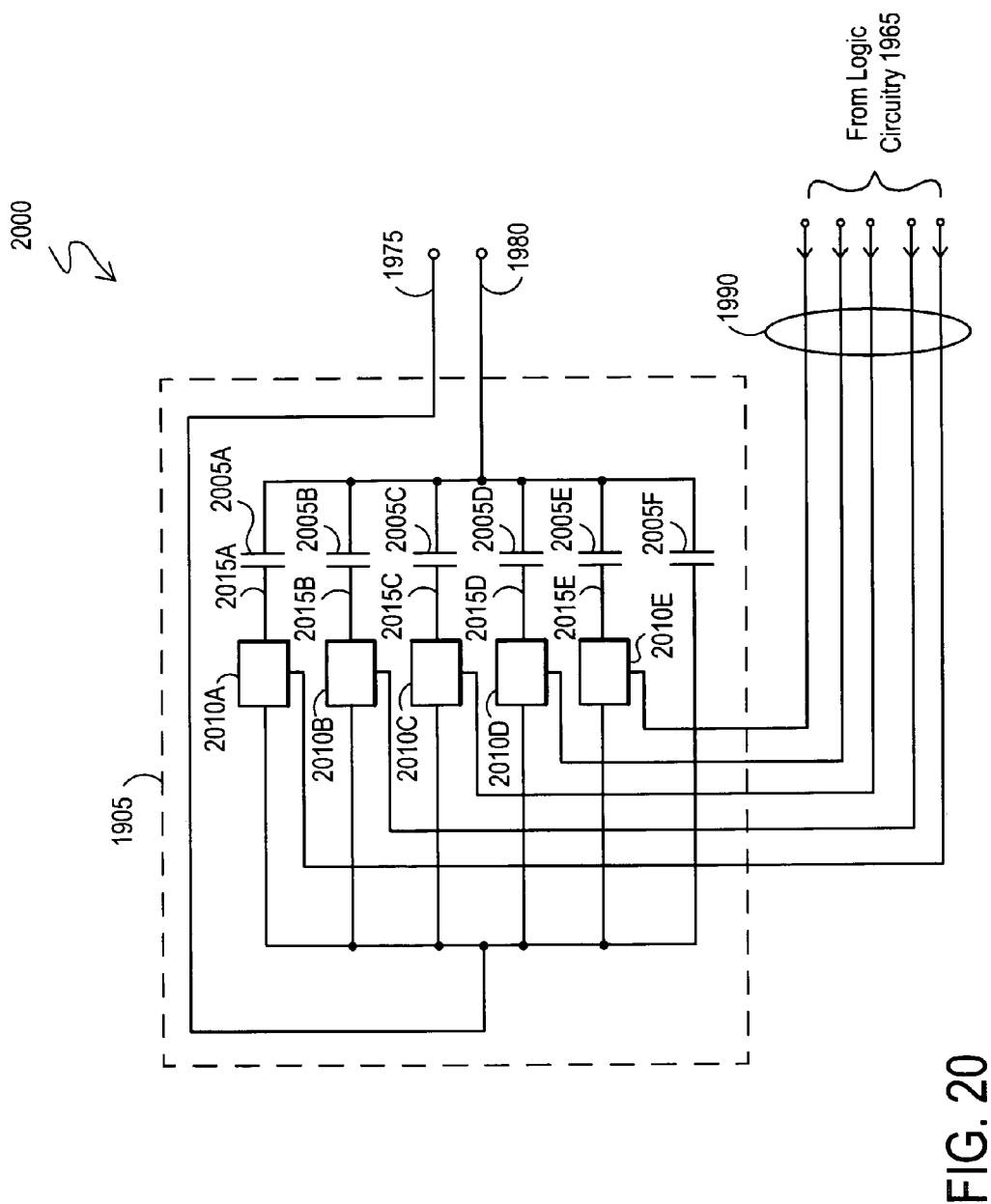
FIG. 20 shows illustrates an exemplary embodiment according to the invention of an adjustable capacitor.

As noted above, control signal 1990 adjusts the value (or capacitance) of adjustable capacitor 1905. FIG. 20 illustrates an exemplary embodiment 2000 according to the invention of adjustable capacitor 1905. In embodiment 2000, adjustable capacitor 1905 includes the parallel coupling of six circuit legs. The circuit legs include capacitors 2005A–2005F and switches 2010A–2010E. Five of the circuit legs each include the series coupling of one of capacitors 2005A–2005E and a respective one of switches 2010A–2010E. Thus, in the first circuit leg, capacitor 2005A couples in series with switch 2010A, and so on. The sixth circuit leg includes fixed capacitor 2005F. Fixed capacitor 2005F couples between the terminals of the adjustable capacitor 1905 (nodes 1975 and 1980). Note that, rather than using six circuit legs, one may use other numbers of circuit legs, devices, and components, by making modifications that persons skilled in the art who have the benefit of the description of the invention understand.

Switches 2010A–2010E constitute controllable switches, i.e., switches that open and close in response to a control signal, for example, a CMOS transmission gate. Each bit within control signal 1990 controls one of switches 2010A–2010E. If a bit in control signal 1990 has a logic high value, a respective one of switches 2010A–2010E that corresponds to that bit closes, and couples a respective one of capacitors 2005A–2005E between nodes 1975 and 1980 (i.e., the terminals of adjustable capacitor 1905). Put another way, if a bit in control signal 1990 has a logic high value, one of switches 2010A–2010E that corresponds to that bit closes and hence couples a respective one of capacitors 2005A–2005E in parallel with fixed capacitor 2005F. For example, if switch 2010A closes, it couples capacitor 2005A in parallel with fixed capacitor 2005F, and so on.

Conversely, if a bit in control signal 1990 has a logic low value, a respective one of switches 2010A–2010E that corresponds to that bit opens and removes the capacitance of a respective one of capacitors 2005A–2005E from the total capacitance of adjustable capacitor 1905. Thus, one may adjust the capacitance of adjustable capacitor 1905 and, hence, the RC product that includes the capacitance of adjustable capacitor 1905, by controlling the logic values of the bits in control signal 1990.

Exemplary embodiments according to the invention include a mechanism (not shown explicitly in FIG. 20) to prevent the respective nodes between each of switches 2010A–2010E and a corresponding one of capacitors 2005A–2005E (i.e., nodes 2015A–2015E, respectively) from floating. More specifically, a switch (such as a transistor or MOSFET) couples between each of nodes 2015A–2015E and circuit ground or $V_{SS}$, and turns on when a respective one of switches 2010A–2010E is in the off state, and vice-versa.

The capacitance of adjustable capacitor 1905 depends on the logic values of the bits in control signal 1990 and the capacitance of capacitors 2005A–2005F. One may choose the capacitance of capacitors 2005A–2005F in a variety of ways. For example, in one embodiment, one may use equally weighted capacitance values for capacitors 2005A–2005F.

In other embodiments, one may use capacitance values with unequal weighting for at least two of capacitors 2005A–2005F. Table 4 below provides capacitance values for one exemplary embodiment that uses unequal weighting. Table 4 shows capacitance values as percentages of a nominal capacitance value, $C_{nom}$, for adjustable capacitor 1905. The capacitance values for capacitors 2005A–2005E vary in proportion to powers of two. The capacitance of fixed capacitor 2005F constitutes 68% of the nominal capacitance value for adjustable capacitor 1905.

TABLE 4

| Capacitor | % of $C_{nom}$ |
|---|---|
| 2005A | 2 |
| 2005B | 4 |
| 2005C | 8 |

TABLE 4-continued

| Capacitor | % of $C_{nom}$ |
|---|---|
| 2005D | 16 |
| 2005E | 32 |
| 2005F | 68 |

Note that in this embodiment, a nominal value of control signal 1990 (i.e., a binary logic value of 10000) provides a capacitance value for adjustable capacitor 1905 equal to $C_{nom}$, with a range of −32% to +30% around it in which one may vary the capacitance of adjustable capacitor 1905. Note that the most-significant bit (MSB) of control signal 1990 controls capacitor 2005E, and so on, and the least-significant bit (LSB) of control signal 1990 controls the capacitor 2005A, although one may use other control arrangements, as desired.

During the calibration process, one may derive the logic values for the bits in control signal 1990, as described above. Those logic values represent a calibration code or word that controls switches 2010A–2010E in adjustable capacitor 1905. Logic circuitry 1965 then freezes or holds those values during the operation of the circuit. In other words, during calibration, one uses control signal 1990 to set a value for the effective capacitance of adjustable capacitor 1905. The circuit subsequently uses that value of adjustable capacitor 1905.

Logic circuitry 1965 includes a finite-state machine that generates control signal 1990 from the output signal of comparator 1955. Logic circuitry 1965 uses a binary search or successive approximation algorithm to generate control signal 1990 to control adjustable capacitor 1905.

Figure 21:
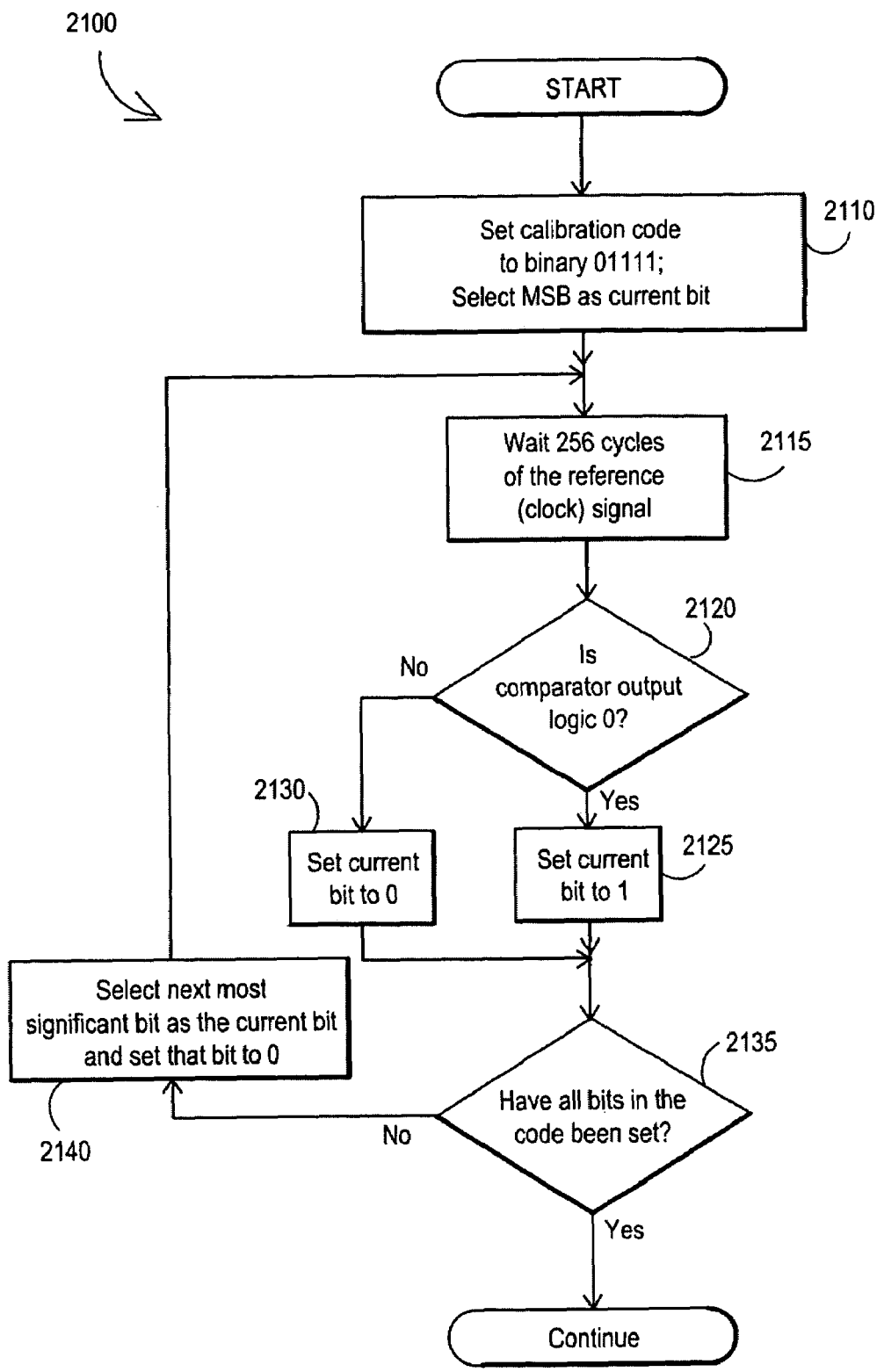
FIG. 21 depicts an exemplary flow diagram for digital calibration operations according to the invention.

FIG. 21 illustrates an exemplary flow diagram 2100 according to the invention for the digital calibration operations that logic circuitry 1965 performs. The operations of logic circuitry 1965 begin at step 2110. In that step, logic circuitry 1965 sets the calibration code or word (i.e., the bits that make up control signal 1990) to binary 01111. Logic circuitry 1965 also selects the MSB of the calibration code as the current bit. Control then passes to step 2115.

In step 2115, logic circuitry 1965 waits for 256 cycles of a reference or clock signal, such as reference signal 220 described above (see, for example, FIGS. 2A–2D and accompanying discussion). In one embodiment, the reference or clock signal has a frequency of 13 MHz, although one may use other values, as desired. The waiting in step 2115 allows the calibration code or word to settle through the calibration circuitry (e.g., comparator 1955), and for various node voltages to settle (e.g., voltages at nodes 1988 and 1992).

The number of wait cycles depends, among other things, on the settling speed of the circuitry. Note that one may include a wait for fewer or more cycles than 256 cycles, as desired, depending on the design and performance specifications and characteristics for a particular application.

Following the completion of the wait cycle, control passes to step 2120. In that step, logic circuitry 1965 determines whether the output of the comparator 1955 has a logic 0 value or logic 1 value. A logic 0 value at the output of comparator 1955 indicates that the capacitance of adjustable capacitor 1905 is too small; a logic 1 value, on the other hand, signifies that the adjustable capacitor 1905 has too large a capacitance.

If the output of comparator 1955 has a logic 0 value, logic circuitry 1965 sets the current bit to a logic 1 value (i.e., to increase the capacitance of adjustable capacitor 1905). On the other hand, if the output of comparator 1955 has a logic 1 value, logic circuitry 1965 sets the current bit to a logic 0 value (i.e., to decrease the capacitance of adjustable capacitor 1905). In either case, control passes subsequently to step 2135.

In step 2135, logic circuitry 1965 determines whether all bits in the calibration code or word (i.e., all bits that make up control signal 1990) have been set to an appropriate logic value. If so, the calibration process completes. If not, in step 2140, logic circuitry 1965 selects the next most significant bit as the current bit, and sets that bit to zero. Control then passes to step 2115.

Note that in exemplary embodiments, one may include within logic circuitry 1965 measures so that it handles situations where the ideal value of the calibrated code or word lies at the common edge of two decision boundaries in the binary search or successive approximation, as desired. Those measures within the logic circuitry 1965 help prevent chatter in the control signal 1990, i.e., the logic values of the bits in control signal 1990 changing in succession. Put another way, repeated calibrations may result in two different calibration codes even though no significant change in the circuit's parameters or attributes has occurred. The chatter may result from noise within the circuit, for example, noise or jitter at the output of comparator 1955.

Chatter may adversely affect the performance of embodiment 1900 and the system or circuit within which it operates. To help prevent the chatter, logic circuitry 1965 may include a memory that stores the calibration results (i.e., codes or words) of previous calibrations. If the result of a previous calibration differs from a current calibration result only in its LSB, logic circuitry 1965 retains the result of the previous calibration. On the other hand, if the results of the previous and current calibration differ by more than their LSBs, logic circuitry 1965 uses the result of the current calibration.

One may use calibration circuitry and associated adjustable capacitors and techniques according to the invention in a variety of applications. As noted above, one may use the calibration circuitry (including its results) and associated adjustable capacitors and techniques in ADC circuitry, such as ADC circuitry 418. In other words, one may use combinations of calibration circuitry and adjustable capacitor circuitry (see FIGS. 19–21) to implement any or all of the capacitors in FIGS. 16–18 (e.g., $C_1$, $C_{ref}$). Furthermore, one may use the calibration circuitry (including its results) and associated techniques in other circuitry whose response, stability, etc., depends on an RC product, resistance of a resistor (by making modifications that persons skilled in the art who have the benefit of the description of the invention understand), or capacitance of a capacitor, as desired.

Generally, one may use calibration circuitry according to the invention in any circuitry whose characteristics or attributes, such as transfer function, stability, and the like, depend on one or more resistance values, capacitance values, or RC products. In exemplary embodiments, for each capacitor, one may use a calibration circuitry to adjust its capacitance value, as desired. In situations when one desires to vary the capacitance of two or more capacitors together or simultaneously, one may implement each capacitor as shown in FIG. 20. One may then use control signal 1990 derived for one of the capacitors (using circuitry as shown in embodiment 1900) to vary the capacitance of more than one capacitor simultaneously.

One may use such ADC circuitry that includes calibration circuitry and techniques in a variety of applications. Examples include RF apparatus, such as transmitters, receivers, and transceivers, as shown, for instance, in FIG. 8. Furthermore, the inventive concepts described here lend themselves to application in a variety of RF apparatus such as those described above in connection with the interfacing and partitioning concepts.

Thus, one may generally apply the inventive concepts in RF receivers, transmitters, and/or RF transceivers, which may incorporate direct-conversion, low-IF, high-IF, or other topologies, as desired. The RF transceivers may employ a variety of architectures and circuit arrangements, such as concerns the transmitter circuitry, the local oscillator circuitry, etc., as noted above. The appropriate modifications for applying the inventive concepts to various RF apparatus are within the knowledge of persons of ordinary skill in the art who have the benefit of the description of the invention.

Rather than or in addition to using the embodiments provided here, one may use many other embodiments of the various circuit blocks and arrangement of circuitry. As persons of ordinary skill in the art who have read the description of the invention will understand, one may use a variety of implementations of the invention, depending on factors such as design and performance specifications. For example, one may design the logic circuitry within the controllers and the adjustable resistors to provide a desired number of control bits (calibration codes). Furthermore, one may implement the logic circuitry in a variety of ways, such as, micro-controllers, microprocessors, general sequential logic, and the like, to produce control signals with various numbers of bits, as desired. As another example, rather than varying the capacitance of an adjustable capacitor to calibrate RC products, one may instead or in addition vary the resistance of the resistor in the RC product, as desired.

Referring to the figures, the various blocks shown depict mainly the conceptual functions and signal flow. The actual circuit implementation may or may not contain separately identifiable hardware for the various functional blocks. For example, one may combine the functionality of various blocks into one circuit block, as desired. Furthermore, one may realize the functionality of a single block in several circuit blocks, as desired. The choice of circuit implementation depends on various factors, such as particular design and specifications for a given implementation, as persons of ordinary skill in the art who have read the disclosure of the invention will understand.

Further modifications and alternative embodiments of the invention will be apparent to persons skilled in the art in view of this description of the invention. Accordingly, this description teaches those skilled in the art the manner of carrying out the invention and are to be construed as illustrative only.

The forms of the invention shown and described should be taken as the presently preferred embodiments. Persons skilled in the art may make various changes in the shape, size and arrangement of parts without departing from the scope of the invention described in this document. For example, persons skilled in the art may substitute equivalent elements for the elements illustrated and described here. Moreover, persons skilled in the art who have the benefit of this description of the invention may use certain features of the invention independently of the use of other features, without departing from the scope of the invention.

We claim:

1. A calibration circuitry, comprising:
an adjustable capacitor, the adjustable capacitor having a capacitance that varies in response to a plurality of control signals;

a voltage generator, the voltage generator configured to provide a measurement voltage that depends on the capacitance of the adjustable capacitor;

a reference voltage generator, the reference voltage generator configured to provide a reference voltage; and a controller, the controller configured to provide the plurality of control signals based on the relative values of the reference voltage and the measurement voltage, wherein the adjustable capacitor is calibrated by holding the plurality of control signals constant after powering up the calibration circuitry.

2. The calibration circuitry according to claim 1, wherein the adjustable capacitor is charged in response to a first clock signal.

3. The calibration circuitry according to claim 2, wherein the adjustable capacitor is discharged in response to a second clock signal.

4. The calibration circuitry according to claim 3, wherein the first and second clock signals are non-overlapping.

5. The calibration circuitry according to claim 4, wherein the controller comprises a logic circuitry.

6. The calibration circuitry according to claim 5, wherein the logic circuitry comprises a finite-state machine configured to provide the plurality of control signals.

7. The calibration circuitry according to claim 6, wherein the finite-state machine uses successive approximation to provide the plurality of control signals.

8. A radio-frequency (RF) apparatus, comprising:

a first integrated circuit, including:
    an adjustable capacitor having a capacitance value adapted to be adjustable in response to a plurality of control signals;
    a voltage generator configured to generate a measurement voltage that depends in part on the capacitance value of the adjustable capacitor; and
a controller configured to receive the measurement voltage and a reference voltage, the controller further configured to provide the plurality of control signals based on the relative values of the measurement voltage and the reference voltage, wherein the adjustable capacitor is calibrated by holding the plurality of control signals constant.

9. The radio-frequency apparatus according to claim 8, wherein the first integrated circuit further comprises radio-frequency receiver circuitry coupled to an analog-to-digital converter circuitry.

10. The radio-frequency apparatus according to claim 9, wherein the adjustable capacitor is calibrated after powering up the first integrated circuit.

11. The radio-frequency apparatus according to claim 10, wherein the adjustable capacitor is calibrated before a reception of a burst by the radio-frequency receiver circuitry.

12. The radio-frequency apparatus according to claim 11, further comprising a second integrated circuit coupled to the first integrated circuit, the second integrated circuit comprising digital signal processing circuitry configured to accept a digital output signal of the analog-to-digital converter circuitry.

13. The radio-frequency apparatus according to claim 8, wherein the adjustable capacitor comprises a plurality of switchable capacitors configured to adjust the capacitance value of the adjustable capacitor in response to the plurality of control signals, and wherein the plurality of switchable capacitors are coupled in parallel with one another.

14. The radio-frequency apparatus according to claim 13, wherein each switchable capacitor in the plurality of switchable capacitors comprises a capacitor coupled to a switch.

15. The radio-frequency apparatus according to claim 14, wherein each switch in the plurality of switchable capacitors responds to a respective signal in the plurality of control signals.

16. The radio-frequency apparatus according to claim 15, wherein the adjustable capacitor is charged in response to a first clock signal and discharged in response to a second clock signal, and wherein the first and second clock signals are non-overlapping.

17. The radio-frequency apparatus according to claim 16, wherein the adjustable capacitor further comprises a fixed capacitor coupled in parallel with the plurality of switchable capacitors.

18. The radio-frequency apparatus according to claim 17, wherein the controller comprises a finite-state machine configured to generate the plurality of control signals.

19. The radio-frequency apparatus according to claim 18, wherein the finite-state machine uses successive approximation to generate the plurality of control signals.

20. The radio-frequency apparatus according to claim 8, wherein the first integrated circuit further comprises radio-frequency receiver circuitry coupled to the analog-to-digital converter circuitry, the radio-frequency receiver circuitry comprising a cascade coupling of a low-noise amplifier and a mixer.

21. The radio-frequency apparatus according to claim 20, wherein the adjustable capacitor is calibrated after powering up the radio-frequency circuitry within the first integrated circuit.

22. The radio-frequency apparatus according to claim 21, wherein the adjustable capacitor is calibrated before a reception of a burst by the radio-frequency receiver circuitry.

23. The radio-frequency apparatus according to claim 22, further comprising a second integrated circuit coupled to the first integrated circuit, the second integrated circuit comprising digital signal processing circuitry configured to accept a digital output signal of the analog-to-digital converter circuitry.

24. A method of calibrating circuitry within a first integrated circuit, comprising:

adjusting a capacitance value of an adjustable capacitor included within the first integrated circuit, the capacitance value of the adjustable capacitor configured to be adjustable in response to a plurality of control signals;

generating a measurement voltage, a voltage value of the measurement voltage being dependent in part on the capacitance value of the adjustable capacitor;

supplying to the adjustable capacitor the plurality of control signals generated by a controller, the controller configured to receive the measurement voltage and a reference voltage and to provide the plurality of control signals based on the relative values of the measurement voltage and the reference voltage; and calibrating the adjustable capacitor by holding constant the plurality of control signals.

25. The method according to claim 24, wherein adjusting the capacitance value of the adjustable capacitor comprises using a plurality of switchable capacitors configured to adjust the capacitance value of the adjustable capacitor in response to the plurality of control signals; and wherein the plurality of switchable capacitors are coupled in parallel with one another, and wherein each switchable capacitor in the plurality of switchable capacitors comprises a capacitor coupled to a switch, and wherein each switch is configured to respond to a respective signal in the plurality of control signals.

26. The method according to claim 25, wherein generating the measurement voltage further comprises:
   charging the adjustable capacitor in response to a first clock signal; and
   discharging the adjustable capacitor in response to a second clock signal,
   wherein the first and second clock signals are non-overlapping.

27. The method according to claim 26, wherein the adjustable capacitor further comprises a fixed capacitor coupled in parallel with the plurality of switchable capacitors.

28. The method according to claim 27, further comprising providing within the controller a finite-state machine configured to generate the plurality of control signals by using successive approximation.

29. The method according to claim 28, further comprising receiving radio-frequency signals by using a radio-frequency receiver circuitry, the radio-frequency circuitry included in the first integrated circuit and coupled to an analog-to-digital converter circuitry.

30. The method according to claim 29, further comprising calibrating the adjustable capacitor after powering up the first integrated circuit.

31. The method according to claim 30, further comprising calibrating the adjustable capacitor before a reception of a burst by the radio-frequency receiver circuitry.

32. The method according to claim 31, further comprising providing a second integrated circuit coupled to the first integrated circuit, the second integrated circuit comprising digital signal processing circuitry configured to accept a digital output signal of the analog-to-digital converter circuitry.

* * * * *